US012739907B2

(12) United States Patent
Zhang

(10) Patent No.: US 12,739,907 B2
(45) Date of Patent: Sep. 15, 2026

(54) METHOD AND DEVICE FOR DUAL-CONNECTIVITY IN WIRELESS COMMUNICATIONS

(71) Applicant: Apogee Networks, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 474 days.

(21) Appl. No.: 18/107,523

(22) Filed: Feb. 9, 2023

(65) Prior Publication Data

US 2023/0189363 A1 Jun. 15, 2023

Related U.S. Application Data

(63) Continuation of application No. PCT/CN2021/114938, filed on Aug. 27, 2021.

(30) Foreign Application Priority Data

Aug. 27, 2020 (CN) ......................... 202010875894.4
Sep. 4, 2020 (CN) ......................... 202010922959.6

(51) Int. Cl.
*H04W 74/0833* (2024.01)
*H04W 74/0836* (2024.01)
(Continued)

(52) U.S. Cl.
CPC ....... *H04W 76/15* (2018.02); *H04W 74/0833* (2013.01); *H04W 76/20* (2018.02); *H04W 74/0836* (2024.01)

(58) Field of Classification Search
None
See application file for complete search history.

(56) References Cited

U.S. PATENT DOCUMENTS 9,258,750 B2 2/2016 Li et al.
11,546,817 B2 1/2023 Wu
(Continued)

FOREIGN PATENT DOCUMENTS

CN 110198545 A 9/2019
CN 110431873 A 11/2019

OTHER PUBLICATIONS

ISR received in application No. PCT/CN2021/114938 dated Dec. 7, 2021.

(Continued)

*Primary Examiner* — Khaled M Kassim
*Assistant Examiner* — Shima Wasel
(74) *Attorney, Agent, or Firm* — Volpe Koenig

(57) ABSTRACT

The present disclosure disclosed a method and a device used in a communication node for wireless communications. A communication node receives a first signaling; when the first cell is in a first state, as a response to the first condition being fulfilled, the node applies a first sub-configuration to the first target cell and transmits a second signaling, and does not transmit a first message on the first target cell; when the first cell is in a second state, as a response to the first condition being fulfilled, the node applies the first configuration to the first target cell and starts a first timer, and transmits a second signaling, transmits a first message on the first target cell, and receives a second message, and, as a response to receiving the second message, stops the first timer; the first signaling comprises an RRC reconfiguration message.

20 Claims, 9 Drawing Sheets

(51) Int. Cl.
*H04W 76/15* (2018.01)
*H04W 76/20* (2018.01)

(56) References Cited

U.S. PATENT DOCUMENTS

| | | | | |
|---|---|---|---|---|
| 2014/0192775 | A1 | 7/2014 | Li et al. | |
| 2017/0353987 | A1 | 12/2017 | Wu | |
| 2023/0189363 | A1* | 6/2023 | Zhang | H04W 76/15 370/329 |
| 2023/0232494 | A1* | 7/2023 | Wang | H04W 76/15 370/329 |
| 2024/0349134 | A1* | 10/2024 | Futaki | H04W 36/0061 |
| 2025/0024342 | A1* | 1/2025 | Futaki | H04W 36/00838 |

OTHER PUBLICATIONS

Vivo UE behavior when SCG is deactivated 3GPP TSG-RAN WG2 Meeting #114 electronic R2-2105628 May 11, 2021.

Nokia, Nokia Shanghai Bell Deactivation of SCG 3GPP TSG-RAN WG2 Meeting #115 Electronic R2-2107983 Aug. 6, 2021.

Intel Corporation Rel-17 Conditional PSCell Addition 3GPP TSG-RAN WG2 Meeting #111-e R2-2007237 Aug. 7, 2020.

First Office Action of Chinese patent application No. CN202010875894.4 dated Jan. 6, 2024.

First Search Report of Chinese patent application No. CN202010875894.4 dated Jan. 5, 2024.

NSN, Nokia Corporation "SCG Cell scheduling and activation" 3GPP TSG-RAN WG2 Meeting #85bis R2-141181 Apr. 4, 2014.

Third Generation Partnership Project, "Technical Specification Group Radio Access Network; NR; Multiplexing and channel coding (Release 16)," 3GPP TS 38.212 V16.2.0 (Jun. 2020).

Third Generation Partnership Project, "Technical Specification Group Radio Access Network; NR; Physical layer procedures for control (Release 16)," 3GPP TS 38.213 V16.2.0 (Jun. 2020).

Third Generation Partnership Project, "Technical Specification Group Radio Access Network; NR; Physical layer procedures for data (Release 16)," 3GPP TS 38.214 V16.2.0 (Jun. 2020).

Third Generation Partnership Project, "Technical Specification Group Radio Access Network; NR; Medium Access Control (MAC) protocol specification (Release 16)," 3GPP TS 38.321 V16.1.0 (Jul. 2020).

Third Generation Partnership Project, "Technical Specification Group Radio Access Network; NR; Radio Resource Control (RRC) protocol specification (Release 16)," 3GPP TS 38.331 V16.1.0 (Jul. 2020).

* cited by examiner

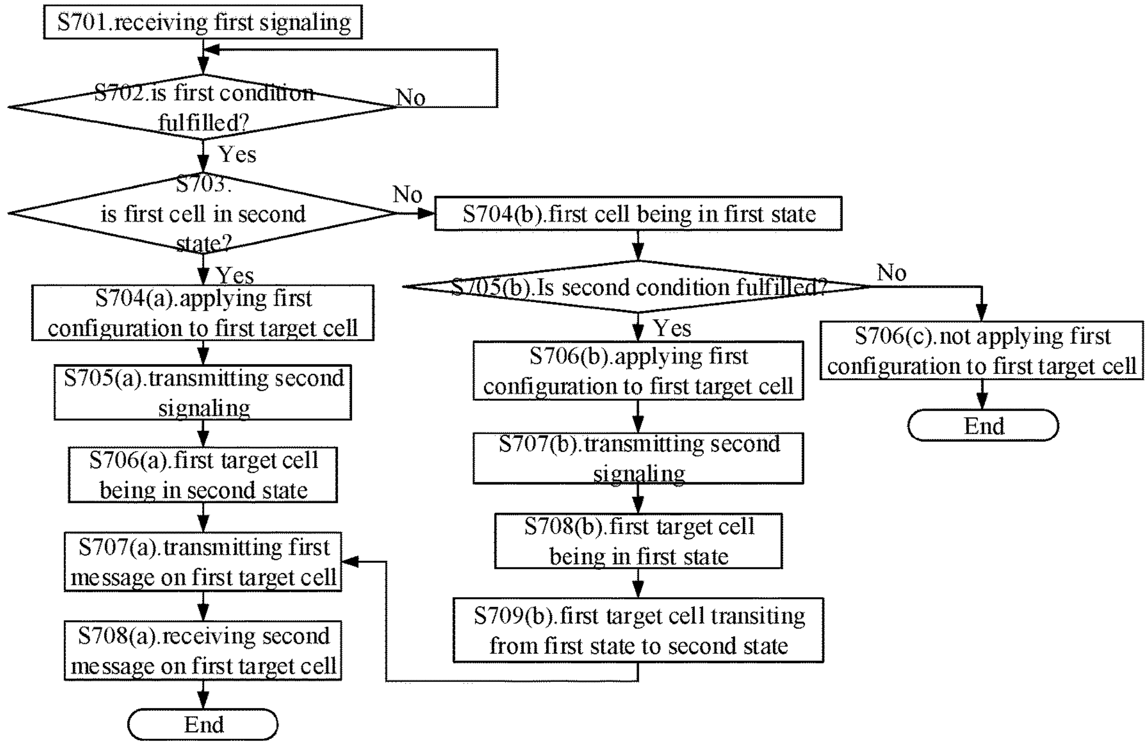

FIG. 7B

F8 optional

Start first timer

Stop first timer

T8.1 T8.2 T8.3 T8.4 T8.5 T8.6 T8.7 T8.8 T8.9 Time

First cell enters into first state

First target cell fulfills first condition

Apply first sub-configuration to first target cell

Application of first sub-configuration is completed

First target cell enters into second state

Apply second sub-configuration to first target cell

Initiate random-access procedure in first target cell

Complete random-access procedure in first target cell

Application of second sub-configuration is completed

FIG. 8A

First field in second signaling —used to indicate→ whether second condition is fulfilled

FIG. 8B

METHOD AND DEVICE FOR DUAL-CONNECTIVITY IN WIRELESS COMMUNICATIONS

CROSS REFERENCE TO RELATED APPLICATIONS

This application is the continuation of the International patent application No. PCT/CN2021/114938, filed on Aug. 27, 2021, which claims the priority benefit of Chinese Patent Application No. 202010875894.4, filed on Aug. 27, 2020; and claims the priority benefit of Chinese Patent Application No. 202010922959.6, filed on Sep. 4, 2020, the full disclosure of which is incorporated herein by reference.

BACKGROUND

Technical Field

The present disclosure relates to transmission methods and devices in wireless communication systems, and in particular to a method and device of dual-connectivity transmission.

Related Art

Targeting the Work Item (WI) of "Multi-Radio Dual-Connectivity (MR-DC) Enhancements", the Release 17 provides support for effective Secondary Cell Group (SCG) Activation/De-activation mechanism and seeks enhancements in the Conditional PSCell Change (CPC) scenario.

SUMMARY

The 3rd Generation Partnership Project (3GPP) has still not agreed upon a clear definition about whether CPC and SCG Activation/De-activation can be implemented simultaneously. The support for synchronous configurations of CPC and SCG Activation/De-activation are beneficial to guaranteeing the quality of a DC link when a User Equipment (UE) is transiting from SCG De-activation status to SCG Activation status, but when configuring CPC and SCG Activation/De-activation mechanisms at the same time, it will be necessary to optimize the current design.

To address the above problem, a scheme is proposed by the present disclosure. According to the above description, though only the scenario of dual-connectivity is stated above as an example, the present disclosure is also applicable to other scenarios like single-connectivity, where similar technical effects will be achieved. Additionally, the adoption of a unified solution for various scenarios contributes to the reduction of hardcore complexity and costs.

In one embodiment, interpretations of the terminology in the present disclosure are given referring to definitions in TS36 series of 3GPP specifications.

In one embodiment, interpretations of the terminology in the present disclosure are given referring to definitions in TS38 series of 3GPP specifications.

In one embodiment, interpretations of the terminology in the present disclosure are given referring to definitions in TS37 series of 3GPP specifications.

In one embodiment, interpretations of the terminology in the present disclosure are given referring to definitions in the specification protocols of the Institute of Electrical and Electronics Engineers (IEEE).

It should be noted that the embodiments of any node of the present disclosure and the characteristics in the embodiments may be applied to any other node if no conflict is incurred, and vice versa. In the case of no conflict, the embodiments of the present disclosure and the characteristics in the embodiments may be combined with each other arbitrarily.

The present disclosure provides a method in a first node for wireless communication, comprising:

- receiving a first signaling, the first signaling comprising a first configuration and a first condition for a first target cell, the first target cell being a cell other than a first cell and a second cell; determining through channel measurement that the first target cell fulfills the first condition; when the first cell is in a first state, as a response to the first condition being fulfilled, applying a first sub-configuration to the first target cell; when the first cell is in a second state, as a response to the first condition being fulfilled, applying the first configuration to the first target cell and starting a first timer;
- transmitting a second signaling; when the first cell is in the first state, not transmitting a first message on the first target cell as a response to the first condition being fulfilled; when the first cell is in the second state, transmitting a first message on the first target cell as a response to the first condition being fulfilled;
- receiving a second message on the first target cell when the first cell is in the second state, the first message being used to trigger the second message, and, as a response to reception of the second message, stopping the first timer;
- herein, the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, a problem to be solved in the present disclosure includes how to perform CPC and SCG Activation/De-activation simultaneously.

In one embodiment, a problem to be solved in the present disclosure includes whether there is need to activate an SCG which is still in De-activation status during completion of CPC configuration, provided that CPC and SCG Activation/De-activation can be performed simultaneously.

In one embodiment, characteristics of the above method include allowing the UE to perform CPC in the SCG De-activation status.

In one embodiment, characteristics of the above method include that when conditions for CPC can be fulfilled, if the UE is in the SCG De-activation status, CPC configuration will be applied in such status.

In one embodiment, characteristics of the above method include applying part of CPC configuration when UE is performing CPC in the SCG De-activation status.

In one embodiment, characteristics of the above method include not implementing random-access procedure when UE is performing CPC in the SCG De-activation status.

In one embodiment, characteristics of the above method include applying a first sub-configuration, which is a subset of the first configuration, when UE is performing CPC in the SCG De-activation status.

In one embodiment, characteristics of the above method include letting an SCG stay in De-activation status when UE is performing CPC in the SCG De-activation status.

In one embodiment, an advantage of the above method includes that when conditions for CPC can be fulfilled, if the SCG is in De-activation status, there will be no need for activating the SCG while performing CPC, thus reducing power consumption.

According to one aspect of the present disclosure, the method herein is characterized in comprising:

applying a second sub-configuration to the first target cell upon a transition from the first state to the second state of the first target cell, the first configuration comprising the second sub-configuration.

According to one aspect of the present disclosure, the method herein is characterized in comprising:

transmitting the first message on the first target cell upon a transition from the first state to the second state of the first target cell;

receiving a second message as a response to transmission of the first message;

herein, application of the first sub-configuration does not comprise the random-access procedure, while application of the second sub-configuration comprises the random-access procedure.

According to one aspect of the present disclosure, the method herein is characterized in comprising:

starting a first timer as a response to beginning of the application of the first sub-configuration when the first cell is in the first state; suspending the first timer as a response to completing the application of the first sub-configuration; and resuming the first timer as a response to beginning of the application of the second sub-configuration upon a transition from the first state to the second state of the first target cell.

In one embodiment, characteristics of the above method include that the action of starting a first timer depends on whether the first sub-configuration is applied.

In one embodiment, characteristics of the above method include that the action of starting a first timer is unrelated to whether the first cell is in the first state.

According to one aspect of the present disclosure, the method herein is characterized in comprising:

starting the first timer as a response to beginning of the application of the second sub-configuration upon a transition from the first state to the second state of the first target cell.

In one embodiment, characteristics of the above method include that the action of starting a first timer is related to whether the first cell is in the first state.

In one embodiment, characteristics of the above method include that the action of starting a first timer is related to whether the first target cell is in the first state.

In one embodiment, characteristics of the above method include that the action of starting a first timer depends on whether the second sub-configuration is applied.

In one embodiment, characteristics of the above method include that when the first sub-configuration is applied, the first timer is not started.

According to one aspect of the present disclosure, the method herein is characterized in comprising:

receiving a third signaling;

herein, the third signaling is used to determine a transition of a given cell between the first state and the second state.

According to one aspect of the present disclosure, the method herein is characterized in that the first signaling comprises an expiration value of the first timer.

The present disclosure provides a method in a second node for wireless communication, comprising:

receiving a second signaling; when a first cell is in a first state, not receiving a first message on a first target cell as a response to a first condition being fulfilled; when the first cell is in a second state, receiving a first message on the first target cell as a response to the first condition being fulfilled;

transmitting a second message on the first target cell when the first cell is in the second state, the first message being used to trigger the second message;

herein, a first signaling comprises a first configuration and a first condition for the first target cell, the first target cell being a cell other than a first cell and a second cell; it is determined through channel measurement that the first target cell fulfills the first condition; when the first cell is in the first state, as a response to the first condition being fulfilled, the first sub-configuration is applied to the first target cell; when the first cell is in the second state, as a response to the first condition being fulfilled, the first configuration is applied to the first target cell and a first timer is started; as a response to reception of the second message, the first timer is stopped; the first signaling comprises an RRC reconfiguration message; the first configuration and the first condition are associated with the first target cell; the first configuration comprises the first sub-configuration; the second signaling is used to indicate the first target cell; the first message is used for a random-access procedure.

According to one aspect of the present disclosure, the method herein is characterized in that upon a transition from the first state to the second state of the first target cell, a second sub-configuration is applied to the first target cell, the first configuration comprising the second sub-configuration.

According to one aspect of the present disclosure, the method herein is characterized in that comprising:

receiving the first message on the first target cell upon a transition from the first state to the second state of the first target cell;

transmitting a second message as a response to reception of the first message;

herein, application of the first sub-configuration does not comprise the random-access procedure, while application of the second sub-configuration comprises the random-access procedure.

According to one aspect of the present disclosure, the method herein is characterized in that when the first cell is in the first state, as a response to a beginning of application of the first sub-configuration, a first timer is started; and as a response to completing the application of the first sub-configuration, the first timer is suspended; upon a transition from the first state to the second state of the first target cell, the first timer is resumed.

According to one aspect of the present disclosure, the method herein is characterized in that upon a transition from the first state to the second state of the first target cell, the first timer is started.

According to one aspect of the present disclosure, the method herein is characterized in that a third signaling is used to determine a transition of a given cell between the first state and the second state.

According to one aspect of the present disclosure, the method herein is characterized in that the first signaling comprises an expiration value of the first timer.

The present disclosure provides a first node for wireless communication, comprising:

a first receiver, which receives a first signaling, the first signaling comprising a first configuration and a first condition for a first target cell, the first target cell being a cell other than a first cell and a second cell; determines through channel measurement that the first target cell fulfills the first condition; when the first cell is in a first state, as a response to the first condition being fulfilled, applies a first sub-configuration to the first target cell; when the first cell is in a second state, as a response to the first condition being fulfilled, applies the first configuration to the first target cell and a first timer is started;

a first transmitter, which transmits a second signaling; when the first cell is in the first state, as a response to the first condition being fulfilled, does not transmit a first message on the first target cell; when the first cell is in the second state, as a response to the first condition being fulfilled, transmits a first message on the first target cell;

the first receiver, which receives a second message on the first target cell when the first cell is in the second state, the first message being used to trigger the second message, and, as a response to reception of the second message, stops the first timer;

herein, the first signaling comprises an RRC reconfiguration message; the first configuration and the first condition are associated with the first target cell; the first configuration comprises the first sub-configuration; the second signaling is used to indicate the first target cell; the first message is used for a random-access procedure.

The present disclosure provides a second node for wireless communication, comprising:

a second receiver, which receives a second signaling; when a first cell is in a first state, does not receive a first message on a first target cell as a response to a first condition being fulfilled; when the first cell is in a second state, receives a first message on the first target cell as a response to the first condition being fulfilled;

a second transmitter, which transmits a second message on the first target cell when the first cell is in the second state, the first message being used to trigger the second message;

herein, a first signaling comprises a first configuration and a first condition for the first target cell, the first target cell being a cell other than a first cell and a second cell; it is determined through channel measurement that the first target cell fulfills the first condition; when the first cell is in the first state, as a response to the first condition being fulfilled, the first sub-configuration is applied to the first target cell; when the first cell is in the second state, as a response to the first condition being fulfilled, the first configuration is applied to the first target cell and a first timer is started; as a response to reception of the second message, the first timer is stopped; the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, the present disclosure has the following advantages over the prior art:

maintaining the SCG De-activation status during CPC procedure, thus conserving power;

guaranteeing the DC link quality upon a transition from the SCG De-activation status to the SCG Activation status of the UE;

by redesigning a timer T304 or T307, the request for performing CPC in the SCG De-activation status can be met;

by defining a new timer, the request for performing CPC in the SCG De-activation status can be met;

dividing the CPC procedure into two parts, one being implemented in the SCG De-activation status, the other being implemented once the SCG De-activation status is changed to the SCG Activation status.

The present disclosure provides a method in a first node for wireless communication, comprising:

receiving a first signaling, the first signaling comprising a first configuration and a first condition for a first target cell; when a first cell is in a first state, the first condition and a second condition both being fulfilled is used to determine an application of the first configuration to the first target cell; when the first cell is in a second state, the first condition being fulfilled is used to determine an application of the first configuration to the first target cell;

when the first cell is in the first state, as a response to fulfillment of both the first condition and the second condition, dropping transmitting a first message on the first target cell; when the first cell is in the second state, as a response to fulfillment of the first condition, transmitting a first message on the first target cell;

when the first cell is in the second state, receiving a second message on the first target cell, the first message being used to trigger the second message;

herein, the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, a problem to be solved in the present disclosure includes how to perform CPC and SCG Activation/De-activation simultaneously.

In one embodiment, a problem to be solved in the present disclosure includes whether there is need to activate an SCG which is still in De-activation status during completion of CPC configuration, provided that CPC and SCG Activation/De-activation can be performed simultaneously.

In one embodiment, characteristics of the above method include allowing the UE to perform CPC in the SCG De-activation status.

In one embodiment, characteristics of the above method include that when conditions for CPC can be fulfilled, if the UE is in the SCG De-activation status, CPC configuration will be applied in such status.

In one embodiment, characteristics of the above method include that a second condition is used to determine whether the first node can apply CPC configuration when the UE is in the SCG De-activation status.

In one embodiment, an advantage of the above method includes that when conditions for CPC can be fulfilled, if the SCG is in De-activation status, there will be no need for activating the SCG while performing CPC, thus reducing power consumption.

In one embodiment, an advantage of the above method includes that setting a limit on the application of CPC in the SCG De-activation status contributes to avoidance of unnecessary CPC.

In one embodiment, an advantage of the above method includes that when performing CPC in the SCG De-activation status, the UE does not perform random-access procedure.

According to one aspect of the present disclosure, the method herein is characterized in that comprising:

determining a transition of the first target cell from the first state to the second state;

as a response to the action of determining a transition of the first target cell from the first state to the second state, transmitting the first message on the first target cell; and receiving a second message as a response to transmission of the first message.

In one embodiment, characteristics of the above method include that having changed from SCG De-activation status to the SCG Activation status, the UE performs random access.

According to one aspect of the present disclosure, the method herein is characterized in comprising:

as a response to completing the application of the first configuration, transmitting a second signaling;

herein, the second signaling is used to indicate the first target cell.

In one embodiment, characteristics of the above method include that after completing CPC configuration, a CPC complete message is sent to the first target cell.

According to one aspect of the present disclosure, the method herein is characterized in that the first signaling comprises a first field, and the first field indicates that the first configuration being enabled is applied in the first state and is used to determine that the second condition is fulfilled.

In one embodiment, characteristics of the above method include that the first field in the first signaling explicitly indicates whether the second condition is fulfilled.

According to one aspect of the present disclosure, the method herein is characterized in comprising:

receiving a third signaling;

herein, the third signaling indicates a first candidate cell, the first target cell and the first candidate cell being the same is used to determine that the first configuration being enabled is to be applied in the first state; when the first target cell is the same as the first candidate cell, the second condition is fulfilled, when the first target cell is different from the first candidate cell, the second condition is not fulfilled.

In one embodiment, characteristics of the above method include that the third signaling explicitly indicates whether the second condition is fulfilled.

In one embodiment, characteristics of the above method include configuring a subset of a CPC candidate cell set by the third signaling, when the first target cell belongs to the subset, the second condition is fulfilled; otherwise, the second condition is not fulfilled.

According to one aspect of the present disclosure, the method herein is characterized in comprising:

when the first cell is in the first state, at least one of the first condition or the second condition being unfulfilled is used to determine that the first configuration is not applied to the first target cell.

The present disclosure provides a method in a second node for wireless communication, comprising:

when a first cell is in a first state, a first condition and a second condition both being fulfilled is used to determine an application of a first configuration to a first target cell, as a response to fulfillment of both the first condition and the second condition, a first message is not received on the first target cell; when the first cell is in a second state, the first condition being fulfilled is used to determine an application of the first configuration to the first target cell, as a response to fulfillment of the first condition, a first message is received on the first target cell;

when the first cell is in the second state, a second message is transmitted on the first target cell, the first message being used to trigger the second message;

herein, a first signaling comprises the first configuration and the first condition for the first target cell; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

According to one aspect of the present disclosure, the method herein is characterized in comprising:

receiving the first message on the first target cell as a response to a transition from the first state to the second state of the first target cell;

as a response to reception of the first message, transmitting a second message.

According to one aspect of the present disclosure, the method herein is characterized in comprising:

receiving a second signaling as a response to completing the application of the first configuration;

herein, the second signaling is used to indicate the first target cell.

According to one aspect of the present disclosure, the method herein is characterized in that the first signaling comprises a first field, and the first field indicates that the first configuration being enabled is applied in the first state and is used to determine that the second condition is fulfilled.

According to one aspect of the present disclosure, the method herein is characterized in that a third signaling is used to indicate a first candidate cell, the first target cell and the first candidate cell being the same is used to determine that the first configuration being enabled is applied in the first state; when the first target cell is the same as the first candidate cell, the second condition is fulfilled, when the first target cell is different from the first candidate cell, the second condition is not fulfilled.

According to one aspect of the present disclosure, the method herein is characterized in that when the first cell is in the first state, at least one of the first condition or the second condition being unfulfilled is used to determine that the first configuration is not applied to the first target cell.

The present disclosure provides a first node for wireless communication, comprising:

a first receiver, receiving a first signaling, the first signaling comprising a first configuration and a first condition for a first target cell; when a first cell is in a first state, the first condition and a second condition both being fulfilled is used to determine an application of the first configuration to the first target cell; when the first cell is in a second state, the first condition being fulfilled is used to determine an application of the first configuration to the first target cell;

a first transmitter, when the first cell is in the first state, as a response to fulfillment of both the first condition and the second condition, dropping transmitting a first message on the first target cell; when the first cell is in the second state, as a response to fulfillment of the first condition, transmitting a first message on the first target cell;

the first receiver, when the first cell is in the second state, receiving a second message on the first target cell, the first message being used to trigger the second message;

herein, the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

The present disclosure provides a second node for wireless communication, comprising:

a second receiver—when a first cell is in a first state, a first condition and a second condition both being fulfilled is used to determine an application of a first configuration to a first target cell, as a response to fulfillment of both the first condition and the second condition, a first message is not received on the first target cell; when the first cell is in a second state, the first condition being fulfilled is used to determine an application of the first configuration to the first target cell, as a response to fulfillment of the first condition, a first message is received on the first target cell;

a second transmitter—when the first cell is in the second state, a second message is transmitted on the first target cell, the first message being used to trigger the second message;

herein, a first signaling comprises the first configuration and the first condition for the first target cell; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the present disclosure has the following advantages over the prior art:

when fulfilling conditions for CPC, if the SCG is in the De-activation status, there will be no need for activating SCG when performing CPC, thus conserving power;

when performing CPC in the SCG De-activation status, the UE does not perform random-access procedure;

a limit is set on the application of CPC in the SCG De-activation status, thus avoiding unnecessary CPC;

the second condition can be indicated implicitly or explicitly.

BRIEF DESCRIPTION OF THE DRAWINGS

Other features, objects and advantages of the present disclosure will become more apparent from the detailed description of non-restrictive embodiments taken in conjunction with the following drawings:

FIG. 7B illustrates a flowchart of a first cell in different states according to one embodiment of the present disclosure.

FIG. 8A illustrates a schematic diagram of running of a first timer according to another embodiment of the present disclosure.

FIG. 8B illustrates a schematic diagram of a first field in a second signaling being used to indicate whether a second condition is fulfilled according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
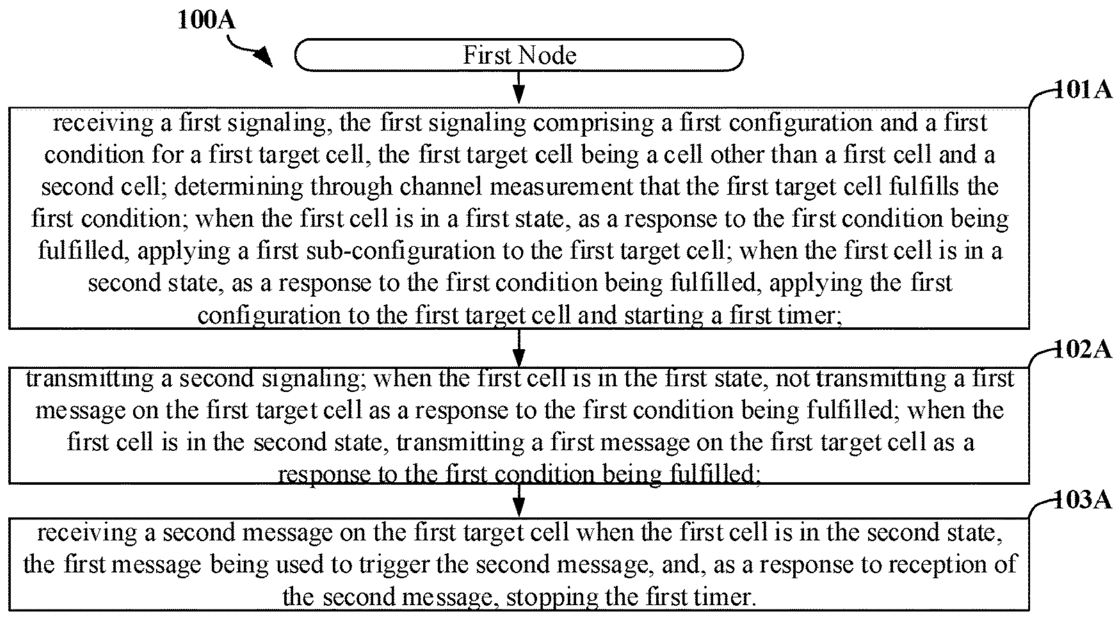
FIG. 1A illustrates a flowchart of transmission of a first signaling, a second signaling, a first message and a second message according to one embodiment of the present disclosure.

Embodiment 1A illustrates a flowchart of transmission of a first signaling, a second signaling, a first message and a second message according to one embodiment of the present disclosure, as shown in FIG. 1A. In FIG. 1A, each box represents a step. Particularly, the sequence of steps marked by these boxes does not necessarily represent specific chronological order of each step.

In Embodiment 1A, the first node in the present disclosure receives a first signaling in step 101A, the first signaling comprising a first configuration and a first condition for a first target cell, the first target cell being a cell other than a first cell and a second cell; determines through channel measurement that the first target cell fulfills the first condition; when the first cell is in a first state, as a response to the first condition being fulfilled, applies a first sub-configuration to the first target cell; when the first cell is in a second state, as a response to the first condition being fulfilled, applies the first configuration to the first target cell and starts a first timer; transmits a second signaling in step 102A; when the first cell is in the first state, does not transmit a first message on the first target cell as a response to the first condition being fulfilled; when the first cell is in the second state, transmits a first message on the first target cell as a response to the first condition being fulfilled; in step 103A, receives a second message on the first target cell when the first cell is in the second state, the first message being used to trigger the second message, and, as a response to reception of the second message, the first timer stops; herein, the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, the first signaling is used for Conditional Reconfiguration.

In one subembodiment, the Conditional Reconfiguration comprises Conditional Handover (CHO).

In one subembodiment, the Conditional Reconfiguration comprises CPC.

In one subembodiment, the Conditional Reconfiguration is used for changing the first cell.

In one subembodiment, the Conditional Reconfiguration is used for a UE-triggered PCell Handover.

In one subembodiment, the Conditional Reconfiguration is used for a UE-triggered PSCell Change.

In one embodiment, a transmitter of the first signaling comprises a maintenance base station for the first cell.

In one embodiment, a transmitter of the first signaling comprises a maintenance base station for the second cell.

In one embodiment, the first signaling originates from a maintenance base station for the first cell.

In one subembodiment, the Conditional Reconfiguration is initiated by a maintenance base station for the first cell.

In one subembodiment, the first signaling is generated by a maintenance base station for the first cell.

In one embodiment, the first signaling originates from a maintenance base station for the second cell.

In one subembodiment, the Conditional Reconfiguration is started by a maintenance base station for the second cell.

In one subembodiment, the first signaling is generated by a maintenance base station for the second cell.

In one embodiment, the first signaling is transmitted via an air interface.

In one embodiment, the first signaling is transmitted via a radio interface.

In one embodiment, the first signaling is transmitted via a higher-layer signaling.

In one embodiment, the first signaling comprises an upper-layer signaling.

In one embodiment, the first signaling comprises all or part of a higher-layer signaling.

In one embodiment, the first signaling comprises an RRC Message.

In one embodiment, the first signaling comprises all or part of IEs in an RRC message.

In one embodiment, the first signaling comprises all or part of fields of an IE in an RRC message.

In one embodiment, the first signaling comprises a Downlink (DL) signaling.

In one embodiment, a Radio Bearer bearing the first signaling comprises Signalling Radio Bearer (SRB) 1.

In one embodiment, a Radio Bearer bearing the first signaling comprises SRB3.

In one embodiment, a logical channel for the first signaling includes a Dedicated Control Channel (DCCH).

In one embodiment, the first signaling comprises an RRC IE, and naming of the RRC IE comprises CondReconfigId.

In one embodiment, the first signaling comprises an RRC IE, and naming of the RRC IE comprises ConditionalReconfigurationId.

In one embodiment, the first signaling comprises an RRC IE, and naming of the RRC IE comprises rrc-TransactionIdentifier.

In one embodiment, the first signaling comprises an RRC IE, and naming of the RRC IE comprises condReconfigToAddModList.

In one embodiment, the first signaling comprises an RRC IE, and naming of the RRC IE comprises conditionalReconfiguration.

In one embodiment, the first signaling comprises an RRC IE, and naming of the RRC IE comprises condReconfigurationToAddModList.

In one embodiment, the first signaling comprises an RRC field, and naming of the RRC field comprises attemptCondReconfig.

In one embodiment, the first signaling comprises an RRC field, and naming of the RRC field comprises attemptCondReconf.

In one embodiment, the first signaling comprises an RRC field, and naming of the RRC field comprises condReconfigToRemoveList.

In one embodiment, the first signaling comprises an RRC field, and naming of the RRC field comprises condReconfigurationToRemoveList.

In one embodiment, the first signaling comprises a RRCReconfiguration message.

In one embodiment, the first signaling comprises a RRCConnectionReconfiguration message.

In one embodiment, the first signaling comprises a DLInformationTransferMRDC message.

In one embodiment, the first signaling comprises a CellGroupConfig IE.

In one embodiment, the first signaling comprises a reconfigurationWithSync field.

In one embodiment, the first signaling comprises a DLInformationTransferMRDC message, the DLInformationTransferMRDC message comprising a RRCReconfiguration message.

In one embodiment, the first signaling originates from a maintenance base station for the first cell, the maintenance base station for the first cell transmits the first signaling to a maintenance base station for the second cell, and then the maintenance base station for the second cell forwards the first signaling to the first node.

In one subembodiment, the first signaling is received on an SRB1.

In one subembodiment, the first signaling comprises a DLInformationTransferMRDC message, the DLInformationTransferMRDC message carrying a RRCReconfiguration message.

In one embodiment, the first signaling originates from a maintenance base station for the second cell, the maintenance base station for the second cell transmits the first signaling to a maintenance base station for the first cell, and then the maintenance base station for the first cell forwards the first signaling to the first node.

In one subembodiment, the first signaling is received on an SRB3.

In one subembodiment, the first signaling comprises a DLInformationTransferMRDC message, the DLInformationTransferMRDC message carrying a RRCReconfiguration message.

In one embodiment, the phrase of the first signaling comprising a first configuration and a first condition for a first target cell comprises: the first signaling comprises the first configuration and the first condition, and the first configuration and the first condition are associated with the first target cell.

In one embodiment, the phrase of the first signaling comprising a first configuration and a first condition for a first target cell comprises: the first configuration and the first condition for the first target cell are two different fields or IEs in the first signaling.

In one embodiment, the first configuration comprises RRC reconfiguration.

In one embodiment, the first configuration comprises synchronous reconfiguration.

In one embodiment, the first configuration comprises downlink (DL) synchronous configuration.

In one embodiment, the first configuration comprises uplink (UL) synchronous configuration.

In one embodiment, the first configuration comprises measurement reconfiguration.

In one embodiment, the first configuration comprises time-frequency resource configuration.

In one embodiment, the first configuration comprises random-access configuration.

In one embodiment, the first configuration comprises conditionalReconfiguration.

In one embodiment, the first configuration comprises a condReconfigToRemoveList or a condReconfigurationToRemoveList.

In one embodiment, the first configuration comprises a condReconfigToAddModList or a condReconfigurationToAddModList.

In one embodiment, the first configuration comprises condRRCReconfig or condReconfigurationToApply.

In one embodiment, the first configuration comprises RRCReconfiguration or

RRCConnectionReconfiguration.

In one embodiment, the first configuration comprises a RRCReconfiguration message, the RRCReconfiguration message comprising reconfigurationWithSync.

In one embodiment, the first configuration comprises a RRCConnectionReconfiguration message, the RRCConnectionReconfiguration message comprising mobilityControlInfo or MobilityControlInfoSCG.

In one embodiment, the first configuration comprises a first field.

In one subembodiment, the first field comprises reconfigurationWithSync.

In one subembodiment, the first field comprises a CellGroupConfig IE.

In one subembodiment, the first field comprises a ServingCellConfigCommon IE.

In one subembodiment, the first field comprises a RACH-ConfigDedicated IE.

In one subembodiment, the first field comprises a spCellConfigCommon field.

In one subembodiment, the first field comprises a newUE-Identity field.

In one subembodiment, the first field comprises a T304.

In one subembodiment, the first field comprises a T307.

In one subembodiment, the first field comprises a rachConfigDedicated field.

In one subembodiment, the first field comprises a physCellId field.

In one subembodiment, the first field comprises a downlinkConfigCommon field.

In one subembodiment, the first field comprises a uplinkConfigCommon field.

In one subembodiment, the first field comprises a ssb-PositionsInBurst field.

In one subembodiment, the first field comprises a ssb-periodicityServingCell.

In one subembodiment, the first field comprises a dmrs-TypeA-Position field.

In one subembodiment, the first field comprises a lte-CRS-ToMatchAround field.

In one subembodiment, the first field comprises a rateMatchPatternToAddModList field.

In one subembodiment, the first field comprises a rateMatchPatternToReleaseList field.

In one subembodiment, the first field comprises a ssb-SubcarrierSpacing field.

In one subembodiment, the first field comprises a tdd-UL-DL-ConfigurationCommon field.

In one subembodiment, the first field comprises a ss-PBCH-BlockPower field.

In one subembodiment, the first field comprises a discoveryBurstWindowLength field.

In one subembodiment, the first field comprises a frequencyInfoDL field.

In one subembodiment, the first field comprises an initialDownlinkBWP field.

In one subembodiment, the first field comprises a frequencyInfoUL field.

In one subembodiment, the first field comprises an initialUplinkBWP field.

In one subembodiment, the first field comprises at least one of a spCellConfigCommon, a newUE-Identity, rachConfigDedicated, a physCellId, downlinkConfigCommon, uplinkConfigCommon, ssb-PositionsInBurst, a ssb-periodicityServingCell, a dmrs-TypeA-Position, lte-CRS-ToMatchAround, a rateMatchPatternToAddModList, a rateMatchPatternToReleaseList, a ssbSubcarrierSpacing, tdd-UL-DL-ConfigurationCommon, ss-PBCH-BlockPower, a discoveryBurstWindowLength, frequencyInfoDL, a initialDownlinkBWP, frequencyInfoUL or a initialUplinkBWP.

In one embodiment, the first configuration comprises a second field.

In one subembodiment, the second field comprises mobilityControlInfo or mobilityControlInfoSCG.

In one subembodiment, the second field comprises a targetPhysCellId.

In one subembodiment, the second field comprises a carrierFreq.

In one subembodiment, the second field comprises a newUE-Identity.

In one subembodiment, the second field comprises a radioResourceConfigCommon.

In one subembodiment, the second field comprises a rach-ConfigDedicated.

In one subembodiment, the second field comprises a ue-IdentitySCG.

In one subembodiment, the second field comprises a rach-ConfigDedicated.

In one subembodiment, the second field comprises a rach-ConfigCommon.

In one subembodiment, the second field comprises a prach-Config.

In one subembodiment, the second field comprises a pdsch-ConfigCommon.

In one subembodiment, the second field comprises a pusch-ConfigCommon.

In one subembodiment, the second field comprises a phich-Config.

In one subembodiment, the second field comprises a pucch-ConfigCommon.

In one subembodiment, the second field comprises at least one of a targetPhysCellId, a carrierFreq, a newUE-Identity, radioResourceConfigCommon, rach-ConfigDedicated, a ue-IdentitySCG, rach-ConfigDedicated, rach-ConfigCommon, prach-Config, pdsch-ConfigCommon, pusch-ConfigCommon, phich-Config or pucch-ConfigCommon.

In one embodiment, the first configuration comprises at least one of the first field or the second field.

In one embodiment, the first sub-configuration comprises part of the first configuration.

In one embodiment, the first sub-configuration comprises all of the first configuration.

In one embodiment, the first condition comprises a condition for implementation of the Conditional Reconfiguration.

In one embodiment, the first condition is used to determine a condition for implementation of the first configuration.

In one embodiment, the first condition is used to determine a condition for implementation of the first sub-configuration.

In one embodiment, the first condition is related to measurement.

In one embodiment, the first condition is unrelated to measurement.

In one embodiment, the first condition comprises at least one of a A3 event or a A5 event.

In one embodiment, the first condition comprises a condExecutionCond or a triggerCondition.

In one embodiment, the first condition comprises a MeasId.

In one embodiment, the first configuration and the first condition are stored in a first variant, the first variant comprising at least one of a VarConditionalReconfig or a VarConditionalReconfiguration.

In one embodiment, the channel measurement comprises at least one of Reference Signal Received Power (RSRP) measurement, or Reference Signal Received Quality (RSRQ) measurement, or Signal to Interference plus Noise Ratio (SINR) measurement, or Channel State Information (CSI) measurement, or DL synchronous measurement.

In one embodiment, the channel measurement comprises a L3 filter.

In one embodiment, the channel measurement is for the first target cell.

In one embodiment, positional information is used to determine that the first target cell fulfills the first condition.

In one subembodiment, the positional information comprises a position of the first node relative to a base station.

In one subembodiment, the positional information is determined according to GNSS.

In one subembodiment, the positional information is determined according to positioning.

In one embodiment, time information is used to determine that the first target cell fulfills the first condition.

In one subembodiment, the time information comprises Ephemeris of the base station.

In one subembodiment, the time information comprises clock information.

In one embodiment, at least one of channel measurement, or positional information or time information is used to determine that the first target cell fulfills the first condition.

In one embodiment, the first cell comprises a primary cell in a first cell group, and the second cell comprises a primary cell in a second cell group.

In one subembodiment, the first cell group comprises a Master Cell Group (MCG), and the second cell group comprises an SCG.

In one subembodiment, the first cell group comprises an SCG, and the second cell group comprises an MCG.

In one subembodiment, the first cell comprises a PSCell, and the second cell comprises a PCell.

In one subembodiment, the first cell comprises a PCell, and the second cell comprises a PSCell.

In one subembodiment, the primary cell comprises a Special Cell (SpCell).

In one subembodiment, the first cell group comprises (a) Secondary Cell(s) (SCell).

In one subembodiment, the first cell group does not comprise SCell(s).

In one subembodiment, the second cell group comprises (a) SCell(s).

In one subembodiment, the second cell group does not comprise SCell(s).

In one embodiment, the phrase of the first target cell being a cell other than a first cell and a second cell comprises that the first target cell is not the first cell, and the first target cell is not the second cell.

In one embodiment, the phrase of the first target cell being a cell other than a first cell and a second cell comprises that the first target cell is identified by a different cell Identifier from those identifying the first cell and the second cell.

In one embodiment, the phrase of the first target cell being a cell other than a first cell and a second cell comprises that a cell identifier of the first target cell is different from not only a cell identifier of the first cell but also a cell identifier of the second cell.

In one embodiment, the first target cell is a candidate cell for the Conditional Reconfiguration.

In one embodiment, the first target cell is a neighboring cell of the first cell.

In one embodiment, the first target cell and the first cell belong to a same base station.

In one embodiment, the first target cell and the first cell belong to different base stations.

In one embodiment, the first target cell and the first cell are intra-frequency cells.

In one embodiment, the first target cell and the first cell are inter-frequency cells.

In one embodiment, the first target cell is determined by a maintenance base station of the first cell.

In one embodiment, the first target cell is determined by a maintenance base station of the second cell.

In one embodiment, the first target cell is indicated by the first signaling.

In one embodiment, the first target cell is determined according to a measurement report.

In one subembodiment, the measurement report is transmitted by the first node to the maintenance base station of the first cell.

In one subembodiment, the measurement report is transmitted by the first node to the maintenance base station of the second cell.

In one embodiment, the first target cell is determined according to at least one of a measurement report, or time, or Ephemeris or positional information.

In one embodiment, a given cell being in a given state means that for the first node, the given cell is in the first state, the given cell comprising either the first cell or the first target cell, and the given state comprising either the first state or the second state.

In one embodiment, a given cell being in a given state means that for the first node, a cell group to which the given cell belongs is in the first state, the given cell comprising either the first cell or the first target cell, and the given state comprising either the first state or the second state.

In one subembodiment, the cell group to which the given cell belongs comprises an MCG.

In one subembodiment, the cell group to which the given cell belongs comprises an SCG.

In one subembodiment, the cell group to which the given cell belongs comprises the given cell.

In one subembodiment, the cell group to which the given cell belongs comprises a SCell.

In one subembodiment, the cell group to which the given cell belongs does not comprise a SCell.

In one subembodiment, the cell group to which the first cell belongs and the cell group to which the given cell belongs are an SCG of the first node.

In one embodiment, before the first sub-configuration is applied, the given cell comprises the first cell; after completing the application of the first sub-configuration, the given cell comprises the first target cell.

In one embodiment, before the first configuration is applied, the given cell comprises the first cell; after completing the application of the first configuration, the given cell comprises the first target cell.

In one embodiment, the phrase that when the first cell is in a first state includes when an SCG is in the first state and when a PSCell in the SCG is the first cell.

In one embodiment, the first state comprises a Dormancy state.

In one subembodiment, the Dormancy state comprises a Deep Dormancy state.

In one subembodiment, the Dormancy state comprises a Discontinuous Reception (DRX) state.

In one subembodiment, the Dormancy state comprises a De-activation state.

In one subembodiment, the Dormancy state comprises an Inactive state.

In one subembodiment, the Dormancy state comprises a suspending state.

In one subsidiary embodiment of the subembodiment, the word suspending means pausing.

In one subsidiary embodiment of the subembodiment, the word suspending means suspense.

In one subembodiment, the Dormancy state comprises an SCG deactivation state.

In one subembodiment, the Dormancy state comprises an SCG inactivation state.

In one subembodiment, the Dormancy state comprises an SCG dormant state.

In one subembodiment, the Dormancy state comprises an SCG suspended state.

In one subembodiment, the Dormancy state comprises an RRC_INACTIVE state.

In one embodiment, the first state comprises a non-dormant state.

In one embodiment, when a given cell is in a first state, the first node does not listen over a Physical Downlink Control Channel (PDCCH) for the given cell.

In one embodiment, when a given cell is in a first state, the first node performs a Radio Link Monitor (RLM) measurement on the given cell.

In one embodiment, the first state comprises no Radio Link Failure (RLF) occurred in a given cell.

In one embodiment, the first state comprises no RLF being detected in an SCG.

In one embodiment, the first state comprises no synchronous reconfiguration failure occurring in an SCG.

In one embodiment, the first state comprises no configuration failure occurring in an SCG.

In one embodiment, the first state comprises no indication from a lower layer about the SRB3 integrity check failure that occurred in an SCG.

In one embodiment, the first state belongs to a CM_CONNECTED state.

In one embodiment, a given cell is RRC_CONNECTED.

In one embodiment, when a given cell is in a first state, a corresponding MCG is RRC_CONNECTED.

In one embodiment, when a given cell of the first node is in a first state, a behavior of the first node consists of several first-type behaviors.

In one subembodiment, the first-type behaviors comprise not listening over a PDCCH for the given cell.

In one subembodiment, the first-type behaviors comprise not performing uplink transmission for the given cell.

In one subembodiment, the first-type behaviors comprise not performing CSI measurement for the given cell.

In one subembodiment, the first-type behaviors comprise not reporting CSI of the given cell.

In one subembodiment, the first-type behaviors comprise keeping RRC configuration for the given cell.

In one subembodiment, the first-type behaviors comprise performing RLM measurement on the given cell.

In one subembodiment, the first-type behaviors comprise performing CSI measurement on the given cell.

In one subembodiment, the first-type behaviors comprise performing Radio Resource Management (RRM) measurement on the given cell.

In one subembodiment, the first-type behaviors comprise suspending an SRB for the given cell.

In one subembodiment, the first-type behaviors comprise suspending a Data Radio Bearer (DRB) for the given cell.

In one subembodiment, the first-type behaviors comprise continuing Beam Management (BM) over the given cell.

In one subembodiment, the first-type behaviors comprise not performing random access in the given cell.

In one subembodiment, the first-type behaviors comprise capability of performing random access in the given cell.

In one subembodiment, the first-type behaviors comprise not transmitting a Sounding Reference Signal (SRS) in the given cell.

In one subembodiment, the first-type behaviors comprise not transmitting an Uplink Shared CHannel (UL-SCH) in the given cell.

In one subembodiment, the first-type behaviors comprise not transmitting a Physical Uplink Control Channel (PUCCH) in the given cell.

In one subembodiment, the several first-type behaviors include X1 first-type behaviors, X1 being a positive integer.

In one subembodiment, the several first-type behaviors include all of the first-type behaviors.

In one subembodiment, the several first-type behaviors include some of the first-type behaviors.

In one embodiment, when a given cell is in a first state, the first node does not monitor a first search space on the given cell; when a given cell is in a second state, the first node monitors a first search space on the given cell.

In one subembodiment, the first search space comprises USS.

In one subembodiment, the first configuration indicates the first search space.

In one subembodiment, the first search space is configured by a higher layer signaling.

In one embodiment, when a given cell is in a first state, the first node does not monitor Downlink Control Information (DCI) of any format in a first format set on the given cell; when a given cell is in a second state, the first node monitors DCI of all formats in a first format set on the given cell.

In one subembodiment, the first format set comprises a UL Grant DCI Format.

In one subembodiment, the first format set comprises a DCI Format 1_1.

In one subembodiment, when the first cell is in the first state, the first node performs the channel measurement on the first cell.

In one embodiment, the first state comprises a Dormancy state, while the second state does not comprise the Dormancy state.

In one embodiment, the phrase of "as a response to fulfillment of the first condition" comprises actions in need of executing after fulfilling the first condition.

In one embodiment, the phrase of "as a response to fulfillment of the first condition" comprises when the first condition is fulfilled.

In one embodiment, applying a given configuration to the first target cell comprises changing a first cell to the first target cell, the given configuration comprising the first sub-configuration, or the second sub-configuration, or a first configuration.

In one embodiment, applying a given configuration to the first target cell comprises changing a PSCell from the first node to a first target node, the given configuration comprising the first sub-configuration, or the second sub-configuration, or a first configuration.

In one embodiment, applying a given configuration to the first target cell comprises performing RRC reconfiguration for the first target cell according to the given configuration, the given configuration comprising the first sub-configuration, or the second sub-configuration, or a first configuration.

In one embodiment, applying a given configuration to the first target cell comprises executing behaviors related to the given configuration for the first target cell, the given configuration comprising the first sub-configuration, or the second sub-configuration, or a first configuration.

In one embodiment, applying a given configuration to the first target cell comprises initiating performance of the conditional reconfiguration, the given configuration comprising the first sub-configuration, or the second sub-configuration, or a first configuration.

In one embodiment, applying a given configuration to the first target cell comprises applying the given configuration of the first target cell that was stored, the given configuration comprising the first sub-configuration, or the second sub-configuration, or a first configuration.

In one embodiment, the phrase of when the first cell is in a second state comprises when an SCG is in the second state and when a PSCell in the SCG is the first cell.

In one embodiment, the second state comprises a non-dormant state.

In one subembodiment, the non-dormant state comprises a connected state.

In one subembodiment, the non-dormant state comprises an active state.

In one subembodiment, the non-dormant state is not a DRX state.

In one subembodiment, the non-dormant state comprises an activated state.

In one subembodiment, the non-dormant state is not a suspending state.

In one subembodiment, the non-dormant state comprises an SCG activation state.

In one subembodiment, the non-dormant state comprises an RRC_CONNECTED state.

In one subembodiment, the non-dormant state comprises an SCG non-dormant state.

In one embodiment, when the given cell is in a second state, the first node transmits an SRS in the given cell.

In one embodiment, when the given cell is in a second state, the first node reports CSI for the given cell.

In one embodiment, when the given cell is in a second state, the first node listens over a PDCCH in the given cell.

In one embodiment, when the given cell is in a second state, the first node listens over a PDCCH for the given cell.

In one embodiment, when the given cell is in a second state, if configured with a PUCCH for the given cell, the first node transmits the PUCCH in the given cell.

In one embodiment, the second state comprises all SRBs and all DRBs of the given cell not being suspended.

In one embodiment, the second state comprises at least one of SRBs and at least one of DRBs of the given cell not being suspended.

In one embodiment, the second state comprises SRB(s) of the given cell being available.

In one embodiment, the second state comprises SRB(s) of the given cell being established.

In one embodiment, the second state comprises SRB(s) of the given cell being resumed.

In one embodiment, the second state comprises DRB(s) of the given cell being resumed.

In one embodiment, the second state comprises a PSCell Change not being ongoing.

In one embodiment, the second state comprises a timer T304 for the given cell not being running.

In one embodiment, the second state comprises a timer T307 for the given cell not being running.

In one embodiment, the second state comprises no RLF being detected in an SCG.

In one embodiment, the second state comprises no synchronous reconfiguration failure occurring in an SCG.

In one embodiment, the second state comprises no configuration failure occurring in an SCG.

In one embodiment, the second state comprises no indication from a lower layer about the SRB3 integrity check failure that occurred in an SCG.

In one embodiment, the action of applying the first configuration to the first target cell comprises performing N1 first-type behavior(s) over the first target cell, N1 being a positive integer.

In one subembodiment, one of the N1 first-type behavior(s) comprises: if the first configuration comprises frequencyInfoDL, it is deemed that the first target cell, i.e., a target SpCell, is a cell on the frequency of an SSB indicated by the frequencyInfoDL, and a physCellId is used to indicate a physical cell Identifier.

In one subembodiment, one of the N1 first-type behavior(s) comprises: if the first configuration does not comprise frequencyInfoDL, it is deemed that the first target cell, i.e., the target SpCell, is a cell on the frequency of an SSB of the first cell, i.e., a source SpCell, and a physCellId is used to indicate a physical cell Identifier.

In one subembodiment, one of the N1 first-type behavior(s) comprises: performing DL synchronization for the first target cell, i.e., starting synchronising to the DL of the target SpCell.

In one subembodiment, one of the N1 first-type behavior(s) comprises: applying dedicated Broadcast Control Channel (BCCH) configuration for the first target cell.

In one subembodiment, one of the N1 first-type behavior(s) comprises: acquiring information of a Master Information Block (MIB) of the first target cell.

In one subembodiment, one of the N1 first-type behavior(s) comprises: reconfiguring a MAC entity of a cell group to which the first target cell belongs.

In one subsidiary embodiment of the above subembodiment, a cell group to which the first target cell belongs comprises an SCG.

In one subsidiary embodiment of the above subembodiment, a cell group to which the first target cell belongs comprises the first target cell.

In one subsidiary embodiment of the above subembodiment, a cell group to which the first target cell belongs comprises the first target cell and a positive integer number of SCell(s).

In one subembodiment, one of the N1 first-type behavior(s) comprises: if configured with SCell(s), it is deemed that in the first signaling each of the SCell(s) comprised by the cell group to which the first target cell belongs that is not contained in the SCellsToAddModList is in a deactivated state.

In one subembodiment, one of the N1 first-type behavior(s) comprises: it is deemed that the cell group to which the first target cell belongs is in a deactivated state.

In one subembodiment, one of the N1 first-type behavior(s) comprises: it is deemed that the first target cell is in a deactivated state.

In one subembodiment, one of the N1 first-type behavior(s) comprises: configuring lower layers according to received spCellConfigCommon.

In one subembodiment, one of the N1 first-type behavior(s) comprises: if received reconfigurationWithSync comprises other field, configuring lower layers according to the other field.

In one subembodiment, one of the N1 first-type behavior(s) comprises: setting contents in the second signaling.

In one subsidiary embodiment of the above subembodiment, the contents in the second signaling comprise a uplinkTxDirectCurrentList.

In one subsidiary embodiment of the above subembodiment, the contents in the second signaling comprise log MeasAvailable.

In one subsidiary embodiment of the above subembodiment, the contents in the second signaling comprise log MeasAvailableBT.

In one subsidiary embodiment of the above subembodiment, the contents in the second signaling comprise log MeasAvailableWLAN.

In one subsidiary embodiment of the above subembodiment, the contents in the second signaling comprise connEstFailInfoAvailable.

In one subsidiary embodiment of the above subembodiment, the contents in the second signaling comprise rlf-InfoAvailable.

In one subembodiment, one of the N1 first-type behavior(s) comprises: starting a random-access procedure on the first target cell.

In one subembodiment, one of the N1 first-type behavior(s) comprises: if the spCellConfig of an SCG comprises reconfigurationWithSync, when the random-access procedure is completed by the target cell to which the first target cell belongs, the first timer is stopped.

In one subembodiment, one of the N1 first-type behavior(s) comprises: applying CSI report configuration, scheduling request configuration and sounding RS configuration which does not require the UE to know SFN of the first target cell.

In one subembodiment, one of the N1 first-type behavior(s) comprises: when acquiring SFN of the first target cell, applying a measurement and radio resource configuration which require the UE to know the SFN of the first target cell.

In one subsidiary embodiment of the above subembodiment, the measurement and radio resource configuration comprise measurement gaps.

In one subsidiary embodiment of the above subembodiment, the measurement and radio resource configuration comprise periodic Channel Quality Indicator (CQI) reports.

In one subsidiary embodiment of the above subembodiment, the measurement and radio resource configuration comprise scheduling request configuration.

In one subsidiary embodiment of the above subembodiment, the measurement and radio resource configuration comprise sounding RS configuration.

In one subembodiment, one of the N1 first-type behavior(s) comprises: removing all entries from VarConditionalReconfig or VarConditionalReconfiguration.

In one subembodiment, one of the N1 first-type behavior(s) comprises: for a reportConfigId associated with a measId in configuration of the first cell, entries matching with the reportConfigId are removed from a reportConfigList in VarMeasConfig.

In one subembodiment, one of the N1 first-type behavior(s) comprises: when an associated measObjectId is only associated with reportConfig and a reportType is set to condTriggerConfig, entries matching with the measObjectId are removed from a measObjectList in VarMeasConfig.

In one embodiment, the action of applying a first subconfiguration to the first target cell comprises performing N2 first-type behavior(s) for the first target cell, N2 being no greater than N1 and N2 being a non-negative integer.

In one subembodiment, N2 is equal to 0.

In one subembodiment, N2 is unequal to 0.

In one subembodiment, N2 is less than N1.

In one subembodiment, N2 is equal to N1.

In one subembodiment, any of the N2 first-type behavior(s) belongs to one of the N1 first-type behavior(s).

In one subembodiment, one of the N2 first-type behavior(s) is one of the N1 first-type behavior(s).

In one embodiment, the action of applying the first configuration to the first target cell and starting a first timer comprises starting the first timer as a response to beginning of the application of the first configuration.

In one embodiment, the action of applying the first configuration to the first target cell and starting a first timer comprises starting the first timer as a response to performing of the conditional reconfiguration.

In one embodiment, the action of applying the first configuration to the first target cell and starting a first timer comprises that the action of applying the first configuration to the first target cell and the action of starting the first timer are performed simultaneously.

In one embodiment, the action of applying the first configuration to the first target cell and starting a first timer comprises that the action of applying the first configuration to the first target cell triggers the action of starting the first timer.

In one embodiment, the action of starting a first timer comprises that the first timer begins time counting.

In one embodiment, the first timer comprises a T304.

In one embodiment, the first timer comprises a T307.

In one embodiment, the second signaling is transmitted according to new configuration.

In one subembodiment, the new configuration comprises the first configuration.

In one subembodiment, the new configuration comprises the first sub-configuration.

In one embodiment, a receiver of the second signaling comprises a maintenance base station for the first cell.

In one embodiment, a receiver of the second signaling comprises a maintenance base station for the second cell.

In one embodiment, the second signaling is received by a maintenance base station for the second cell, and then is forwarded by the maintenance base station for the second cell to a maintenance base station for the first cell.

In one embodiment, the second signaling is received by a maintenance base station for the first cell, and then is forwarded by the maintenance base station for the first cell to a maintenance base station for the second cell.

In one embodiment, the second signaling is transmitted via an air interface.

In one embodiment, the second signaling is transmitted via a radio interface.

In one embodiment, the second signaling is transmitted via a higher-layer signaling.

In one embodiment, the second signaling comprises an upper-layer signaling.

In one embodiment, the second signaling comprises all or part of a higher-layer signaling.

In one embodiment, the second signaling comprises an RRC message.

In one embodiment, the second signaling comprises all or part of IEs in an RRC message.

In one embodiment, the second signaling comprises all or part of fields of an IE in an RRC message.

In one embodiment, the second signaling comprises an Uplink (UL) signaling.

In one embodiment, a Signaling Radio Bearer of the second signaling comprises SRB1.

In one embodiment, a Signaling Radio Bearer of the second signaling comprises SRB3.

In one embodiment, a logical channel bearing the second signaling includes a DCCH.

In one embodiment, the second signaling is used for acknowledgement of the first signaling.

In one embodiment, the second signaling comprises RRCReconfigurationComplete.

In one embodiment, the second signaling comprises RRC-ConnectionReconfigurationComplete.

In one embodiment, the second signaling comprises a ULInformationTransferMRDC message, the ULInformationTransferMRDC message comprising either a RRCReconfigurationComplete message or a RRCConnectionReconfigurationComplete message.

In one embodiment, the phrase that "when the first cell is in the first state, as a response to the first condition being fulfilled, not transmitting a first message on the first target cell" comprises: when the first cell is in the first state, as a response to the first condition being fulfilled, the random-access procedure is not initiated.

In one embodiment, the phrase that "when the first cell is in the first state, as a response to the first condition being fulfilled, not transmitting a first message on the first target cell" comprises: when the first cell is in the first state, as a response to completing the application of the first sub-configuration, a first message is not transmitted on the first target cell.

In one embodiment, the phrase that "when the first cell is in the first state, as a response to the first condition being fulfilled, not transmitting a first message on the first target cell" comprises: when the first cell is in the first state, as a response to completing the application of the first sub-configuration, the random-access procedure is not executed.

In one embodiment, the phrase that "when the first cell is in the first state, as a response to the first condition being fulfilled, not transmitting a first message on the first target cell" comprises: when the first cell is in the first state, as a response to the first condition being fulfilled, the application of the first sub-configuration does not comprise initiating the random-access procedure on the first target cell.

In one embodiment, the first message is transmitted via an air interface.

In one embodiment, the first message is transmitted by an antenna port.

In one embodiment, the first message comprises an uplink signal.

In one embodiment, the first message comprises a baseband signal.

In one embodiment, the first message comprises all or part of a physical layer signal.

In one embodiment, the first message comprises all or part of a MAC signaling.

In one embodiment, the first message comprises all or part of fields in a MAC Control Element (CE).

In one embodiment, the first message comprises all or part of fields in a MAC subheader.

In one embodiment, the first message comprises all or part of fields in a MAC PDU.

In one embodiment, the first message comprises a Cell Radio Network Temporary Identifier (C-RNTI) MAC CE.

In one embodiment, the first message comprises a Common Control Channel (CCCH) SDU.

In one embodiment, the first message comprises all or part of a higher-layer signaling.

In one embodiment, the first message comprises all or part of an upper-layer signaling.

In one embodiment, the first message comprises an RRC message.

In one embodiment, the first message comprises one IE or multiple IEs in an RRC message.

In one embodiment, the first message comprises one or more fields of an IE in an RRC message.

In one embodiment, the first message is used for initiating a random-access procedure.

In one embodiment, the first message comprises a PUSCH.

In one embodiment, the first message does not comprise a PUSCH.

In one embodiment, the first message comprises a Message 1 (Msg1).

In one subembodiment, the Msg1 comprises a Preamble Sequence.

In one subembodiment, resources for the Msg1 are predefined.

In one embodiment, the first message comprises all or part of a Message 3 (Msg3).

In one subembodiment, the Msg3 comprises a PUSCH.

In one subembodiment, the Msg3 comprises a payload.

In one subembodiment, the Msg3 comprises Medium Access Control (MAC) information.

In one subembodiment, the Msg3 comprises RRC information.

In one subembodiment, the Msg3 comprises a RRCResumeRequest1 message.

In one subembodiment, the Msg3 comprises a RRCResumeRequest message.

In one subembodiment, the Msg3 comprises a RRCConnectionResumeRequest message.

In one subembodiment, the Msg3 comprises a Resume ID.

In one subembodiment, the Msg3 comprises a UE identifier.

In one subembodiment, the Msg3 comprises a C-RNTI.

In one subembodiment, the Msg3 comprises a Buffer Status Report (BSR).

In one subembodiment, the Msg3 comprises an indicator for the amount of data.

In one subembodiment, the Msg3 comprises a NAS UE identifier.

In one embodiment, the first message comprises a Message A (MsgA).

In one subembodiment, the MsgA comprises the Msg1 and the Msg3.

In one subembodiment, the MsgA at least comprises the Msg1.

In one subembodiment, the Preamble Sequence of the MsgA is different from the Preamble Sequence of the Msg1.

In one embodiment, the Preamble Sequence of the MsgA is the same as the Preamble Sequence of the Msg1.

In one embodiment, the second message is transmitted via an air interface.

In one embodiment, the second message is transmitted by an antenna port.

In one embodiment, the second message is transmitted on a DL-SCH.

In one embodiment, the second message comprises a second message in a 4-step random access procedure.

In one embodiment, the second message comprises a Message 2 (Msg2).

In one embodiment, the second message comprises a fourth message in a 4-step random access procedure.

In one embodiment, the second message comprises a Message 4 (Msg4).

In one embodiment, the second message comprises a second message in a 2-step random access procedure.

In one embodiment, the second message comprises a Message B (MsgB).

In one embodiment, the second message comprises a downlink signal.

In one embodiment, the second message comprises a sidelink signal.

In one embodiment, the second message comprises all or part of a MAC layer signaling.

In one embodiment, the second message comprises all or part of a MAC PDU.

In one embodiment, the second message comprises all or part of a MAC CE.

In one embodiment, the second message comprises all or part of a MAC Subheader.

In one embodiment, the second message comprises a Random Access Response (RAR).

In one embodiment, the second message is addressed to a RA-RNTI.

In one embodiment, the second message comprises a response for the first message.

In one embodiment, the second message comprises a first RNTI.

In one subembodiment, the first RNTI is dedicated to the first state.

In one subembodiment, the first RNTI is not dedicated to the first state.

In one subembodiment, the first RNTI comprises a Temporary C-RNTI.

In one subembodiment, the first RNTI comprises a C-RNTI.

In one subembodiment, the first RNTI comprises an I-RNTI.

In one subembodiment, the first RNTI comprises a D-RNTI.

In one embodiment, the second message comprises Timing Advance (TA).

In one embodiment, the second message comprises UL Grant.

In one embodiment, the first message comprises the Msg1 and the second message comprises the Msg2.

In one embodiment, the first message comprises the MsgA and the second message comprises the MsgB.

In one embodiment, the first message comprises the Msg1 and the Msg3, and the second message comprises the Msg2 and the Msg4.

In one subembodiment, the first node transmits the Msg1, receives the Msg2, transmits the Msg3, and receives the Msg4.

In one embodiment, the phrase that "when the first cell is in the second state, as a response to fulfillment of the first condition, transmitting a first message on the first target cell" comprises: when the first cell is in the second state, as a response to the fulfillment of the first condition, the random-access procedure is initiated.

In one embodiment, the phrase that "when the first cell is in the second state, as a response to fulfillment of the first condition, transmitting a first message on the first target cell" comprises: when the first cell is in the second state, as a response to completing the application of the first configuration, a first message is transmitted on the first target cell.

In one embodiment, the phrase that "when the first cell is in the second state, as a response to fulfillment of the first condition, transmitting a first message on the first target cell" comprises: when the first cell is in the second state, as a response to completing the application of the first sub-configuration, the random-access procedure is executed.

In one embodiment, the phrase that "when the first cell is in the second state, as a response to fulfillment of the first condition, transmitting a first message on the first target cell" comprises: when the first cell is in the second state, as a response to the fulfillment of the first condition, the application of the first configuration comprises initiating a random-access procedure on the first target cell.

In one embodiment, the phrase of receiving a second message on the first target cell comprises receiving the second message according to configuration of the first target cell.

In one embodiment, the phrase of receiving a second message on the first target cell comprises that the second message is transmitted by the first target cell.

In one embodiment, the phrase of the first message being used to trigger the second message comprises that the second message is a response to the first message.

In one embodiment, the phrase of the first message being used to trigger the second message comprises that transmitting the first message is used to determine reception of the second message.

In one embodiment, the action of stopping the first timer comprises that the first timer no longer counts time.

In one embodiment, the phrase of "as a response to reception of the second message" comprises a time upon which the second message is received.

In one embodiment, the phrase that the first signaling comprises an RRC reconfiguration message comprises that the first signaling is used for RRC connection reconfiguration.

In one embodiment, the phrase that the first signaling comprises an RRC reconfiguration message comprises that the first signaling is the RRC reconfiguration message.

In one embodiment, the phrase that the first signaling comprises an RRC reconfiguration message comprises that the RRC reconfiguration message is all or part of the first signaling.

In one embodiment, the phrase that the first signaling comprises an RRC reconfiguration message comprises that the RRC reconfiguration message is a field or an IE in the first signaling.

In one embodiment, the RRC reconfiguration message comprises a RRCReconfiguration message.

In one embodiment, the RRC reconfiguration message comprises a RRCConnectionReconfiguration message.

In one embodiment, the phrase that the first configuration and the first condition are associated with the first target cell comprises that the first configuration and the first condition are for the first target cell.

In one embodiment, the phrase that the first configuration and the first condition are associated with the first target cell comprises that the first configuration and the first condition are related to the first target cell.

In one embodiment, the phrase that the first configuration and the first condition are associated with the first target cell comprises that the first configuration and the first condition correspond to the first target cell.

In one embodiment, the phrase that the first configuration comprises the first sub-configuration comprises that the first sub-configuration is a subset of the first configuration.

In one embodiment, the phrase that the first configuration comprises the first sub-configuration comprises that the first sub-configuration comprises fewer configurations than the first configuration.

In one embodiment, the phrase that the first configuration comprises the first sub-configuration comprises that the first sub-configuration is a part of the first configuration.

In one embodiment, the phrase that the first configuration comprises the first sub-configuration comprises that the first sub-configuration is an entirety of the first configuration.

In one embodiment, the first sub-configuration is an empty set.

In one embodiment, the first sub-configuration is not an empty set.

In one embodiment, the phrase that the second signaling is used to indicate the first target cell comprises that the second signaling is used for indicating completion of the first sub-configuration for the first target cell.

In one embodiment, the phrase that the second signaling is used to indicate the first target cell comprises that the second signaling is used for indicating completion of the first configuration for the first target cell.

In one embodiment, the phrase that the second signaling is used to indicate the first target cell comprises that the second signaling is used for indicating a change from the first cell to the first target cell.

In one embodiment, the phrase that the second signaling is used to indicate the first target cell comprises that a receiver of the second signaling includes the first target cell.

In one embodiment, the phrase that the first message is used for a random-access procedure comprises that the first message is a message in the random-access procedure.

In one embodiment, the phrase that the first message is used for a random-access procedure comprises that the first message is used for initiating a random-access procedure.

In one embodiment, the phrase that the first message is used for a random-access procedure comprises that the random-access procedure comprises transmitting the first message.

Embodiment 1B

Figure 1B:
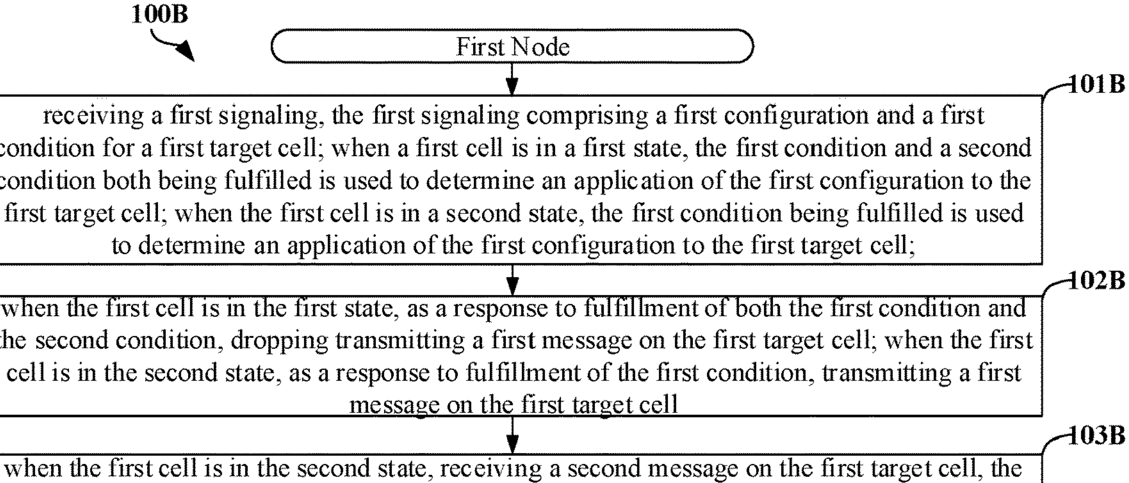
FIG. 1B illustrates a flowchart of transmission of a first signaling, a first message and a second message according to one embodiment of the present disclosure.

Embodiment 1B illustrates a flowchart of transmission of a first signaling, a first message and a second message according to one embodiment of the present disclosure, as shown in 1B. In FIG. 1B, each box represents a step. Particularly, the sequence of steps marked by these boxes does not necessarily represent specific chronological order of each step.

In Embodiment 1B, the first node in the present disclosure receives a first signaling in step 101B, the first signaling comprising a first configuration and a first condition for a first target cell; when a first cell is in a first state, the first condition and a second condition both being fulfilled is used to determine an application of the first configuration to the first target cell; when the first cell is in a second state, the first condition being fulfilled is used to determine an application of the first configuration to the first target cell; in step 102B, when the first cell is in the first state, as a response to fulfillment of both the first condition and the second condition, drops transmitting a first message on the first target cell; when the first cell is in the second state, as a response to fulfillment of the first condition, transmits a first message on the first target cell; in step 103B, when the first cell is in the second state, receives a second message on the first target cell, the first message being used to trigger the second message; herein, the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the first cell comprises a primary cell in a first cell group, and the second cell comprises a primary cell in a second cell group.

In one subembodiment, the first cell group comprises a Master Cell Group (MCG), and the second cell group comprises an SCG.

In one subembodiment, the first cell group comprises an SCG, and the second cell group comprises an MCG.

In one subembodiment, the first cell comprises a PSCell, and the second cell comprises a PCell.

In one subembodiment, the first cell comprises a PCell, and the second cell comprises a PSCell.

In one subembodiment, the primary cell comprises a Special Cell (SpCell).

In one subembodiment, the first cell group comprises (a) Secondary Cell(s) (SCell).

In one subembodiment, the first cell group does not comprise SCell(s).

In one subembodiment, the second cell group comprises (a) SCell(s).

In one subembodiment, the second cell group does not comprise SCell(s).

In one embodiment, the first target cell is a candidate cell for the Conditional Reconfiguration.

In one embodiment, the first target cell is a neighboring cell of the first cell.

In one embodiment, the first target cell is determined by a maintenance base station of the first cell.

In one embodiment, the first target cell is determined by a maintenance base station of the second cell.

In one embodiment, the first target cell is indicated by the first signaling.

In one embodiment, the first target cell is determined according to a measurement report.

In one embodiment, the first target cell and the first cell belong to a same base station.

In one embodiment, the first target cell and the first cell belong to different base stations.

In one embodiment, the first target cell and the first cell are intra-frequency cells.

In one embodiment, the first target cell and the first cell are inter-frequency cells.

In one embodiment, the first target cell and the first cell belong to a same roaming zone.

In one subembodiment, the roaming zone comprises coverage of a Public Land Mobile Network (PLMN).

In one subembodiment, the roaming zone comprises coverages of multiple PLMNs in a PLMN List.

In one subembodiment, the roaming zone comprises coverages of multiple Closed Access Groups (CAG) in a CAG List.

In one subembodiment, the roaming zone comprises a Service Area.

In one subembodiment, the roaming zone comprises a Public Network Integrated NPN (PNI-NPN).

In one subembodiment, the roaming zone comprises Area Restriction.

In one subembodiment, the roaming zone comprises Roaming and Access Restriction.

In one embodiment, the first target cell and the first cell do not belong to a same roaming zone.

In one embodiment, the first target cell and the first cell belong to a same Radio Access Technology (RAT).

In one subembodiment, the RAT comprises Long Term Evolution (LTE).

In one subembodiment, the RAT comprises New Radio (NR).

In one embodiment, the first target cell and the first cell belong to different RATs.

In one embodiment, the first target cell and the first cell share a same PLMN.

In one embodiment, the first target cell and the first cell have different PLMNs.

In one embodiment, the first target cell includes a target PSCell, and the first cell includes a source PSCell.

In one embodiment, the phrase of the first target cell being a cell other than a first cell and a second cell comprises that the first target cell is not the first cell, and the first target cell is not the second cell.

In one embodiment, the phrase of the first target cell being a cell other than a first cell and a second cell comprises that the first target cell is identified by a different cell Identifier from those identifying the first cell and the second cell.

In one embodiment, the phrase of the first target cell being a cell other than a first cell and a second cell comprises that a cell identifier of the first target cell is different from not only a cell identifier of the first cell but also a cell identifier of the second cell.

In one embodiment, the phrase of the second cell being in RRC_Connected state comprises that the second cell is in a CM_CONNECTED state.

In one embodiment, the phrase of the second cell being in RRC_Connected state comprises that the second cell is in an RRC_CONNECTED state.

In one embodiment, the phrase of the second cell being in RRC_Connected state comprises that a control plane in the second cell is kept in an RRC_CONNECTED state.

In one embodiment, the phrase of the second cell being in RRC_Connected state comprises that the first node listens over a PDCCH of the second cell.

In one embodiment, the phrase of the second cell being in RRC_Connected state comprises that an SRB for the second cell is established by the first node, and is not suspended.

In one embodiment, the phrase of the second cell being in RRC_Connected state comprises that the first node maintains normal transmission and reception in the second cell.

In one embodiment, the first signaling is used for Conditional Reconfiguration.

In one subembodiment, the Conditional Reconfiguration comprises Conditional Handover (CHO).

In one subembodiment, the Conditional Reconfiguration comprises CPC.

In one subembodiment, the Conditional Reconfiguration is used for changing the first cell.

In one subembodiment, the Conditional Reconfiguration is used for a UE-triggered PCell Handover.

In one subembodiment, the Conditional Reconfiguration is used for a UE-triggered PSCell Change.

In one embodiment, a transmitter of the first signaling comprises a maintenance base station for the first cell.

In one embodiment, a transmitter of the first signaling comprises a maintenance base station for the second cell.

In one embodiment, the first signaling is transmitted via an air interface.

In one embodiment, the first signaling is transmitted via a radio interface.

In one embodiment, the first signaling originates from a maintenance base station for the first cell.

In one subembodiment, the Conditional Reconfiguration is initiated by a maintenance base station for the first cell.

In one subembodiment, the first signaling is generated by a maintenance base station for the first cell.

In one embodiment, the first signaling originates from a maintenance base station for the second cell.

In one subembodiment, the Conditional Reconfiguration is started by a maintenance base station for the second cell.

In one subembodiment, the first signaling is generated by a maintenance base station for the second cell.

In one embodiment, the first signaling comprises all or part of an upper-layer signaling.

In one embodiment, the first signaling comprises all or part of a higher-layer signaling.

In one embodiment, the first signaling comprises an RRC Message.

In one embodiment, the first signaling comprises all or part of IEs in an RRC message.

In one embodiment, the first signaling comprises all or part of fields of an IE in an RRC message.

In one embodiment, the first signaling comprises a Downlink (DL) signaling.

In one embodiment, a logical channel for the first signaling includes a DCCH.

In one embodiment, the first signaling comprises an RRC IE, and naming of the RRC IE comprises CondReconfigId.

In one embodiment, the first signaling comprises an RRC IE, and naming of the RRC IE comprises ConditionalReconfigurationId.

In one embodiment, the first signaling comprises an RRC IE, and naming of the RRC IE comprises condReconfigToAddModList.

In one embodiment, the first signaling comprises an RRC IE, and naming of the RRC IE comprises conditionalReconfiguration.

In one embodiment, the first signaling comprises an RRC IE, and naming of the RRC IE comprises condReconfigurationToAddModList.

In one embodiment, the first signaling comprises an RRC field, and naming of the RRC field comprises condReconfigToRemoveList.

In one embodiment, the first signaling comprises an RRC field, and naming of the RRC field comprises condReconfigurationToRemoveList.

In one embodiment, the first signaling comprises a RRCReconfiguration message.

In one embodiment, the first signaling comprises a RRCConnectionReconfiguration message.

In one embodiment, the first signaling comprises a DLInformationTransferMRDC message.

In one embodiment, the first signaling comprises a CellGroupConfig IE.

In one embodiment, the first signaling comprises a reconfigurationWithSync field.

In one embodiment, the first signaling comprises a DLInformationTransferMRDC message, the DLInformationTransferMRDC message comprising RRCReconfiguration or RRCConnectionReconfiguration.

In one embodiment, a Radio Bearer bearing the first signaling comprises Signalling Radio Bearer (SRB) 1.

In one embodiment, a Radio Bearer bearing the first signaling comprises SRB3.

In one embodiment, the first signaling originates from a maintenance base station for the first cell, the maintenance base station for the first cell transmits the first signaling to a maintenance base station for the second cell, and then the maintenance base station for the second cell forwards the first signaling to the first node.

In one subembodiment, the first signaling is received on an SRB1.

In one subembodiment, the first signaling comprises a DLInformationTransferMRDC message, the DLInformationTransferMRDC message carrying either a RRCReconfiguration message or a RRCConnectionReconfiguration message.

In one embodiment, the first signaling originates from a maintenance base station for the second cell, the maintenance base station for the second cell transmits the first signaling to a maintenance base station for the first cell, and then the maintenance base station for the first cell forwards the first signaling to the first node.

In one subembodiment, the first signaling is received on an SRB3.

In one subembodiment, the first signaling comprises a DLInformationTransferMRDC message, the DLInformationTransferMRDC message carrying either a RRCReconfiguration message or a RRCConnectionReconfiguration message.

In one embodiment, the phrase of the first signaling comprising a first configuration and a first condition for a first target cell comprises: the first signaling comprises the first configuration and the first condition, and the first configuration and the first condition are associated with the first target cell.

In one embodiment, the phrase of the first signaling comprising a first configuration and a first condition for a first target cell comprises: the first configuration and the first condition for the first target cell are two different fields or IEs in the first signaling.

In one embodiment, the first configuration comprises RRC reconfiguration.

In one embodiment, the first configuration comprises synchronous reconfiguration.

In one embodiment, the first configuration comprises downlink (DL) synchronous configuration.

In one embodiment, the first configuration comprises uplink (UL) synchronous configuration.

In one embodiment, the first configuration comprises measurement reconfiguration.

In one embodiment, the first configuration comprises time-frequency resource configuration.

In one embodiment, the first configuration comprises random-access configuration.

In one embodiment, the first configuration does not comprise random-access configuration.

In one embodiment, the first configuration comprises conditionalReconfiguration.

In one embodiment, the first configuration comprises a condReconfigToRemoveList or a condReconfigurationToRemoveList.

In one embodiment, the first configuration comprises a condReconfigToAddModList or a condReconfigurationToAddModList.

In one embodiment, the first configuration comprises condRRCReconfig or condReconfigurationToApply.

In one embodiment, the first configuration comprises RRCReconfiguration or RRCConnectionReconfiguration.

In one embodiment, the first configuration comprises a RRCReconfiguration message, the RRCReconfiguration message comprising reconfigurationWithSync.

In one embodiment, the first configuration comprises a RRCConnectionReconfiguration message, the RRCConnectionReconfiguration message comprising mobilityControlInfo or MobilityControlInfoSCG.

In one embodiment, the first configuration comprises reconfigurationWithSync.

In one embodiment, the first configuration comprises a CellGroupConfig IE.

In one embodiment, the first configuration comprises a ServingCellConfigCommon IE.

In one embodiment, the first configuration comprises a RACH-ConfigDedicated IE.

In one embodiment, the first configuration comprises a spCellConfigCommon field.

In one embodiment, the first configuration comprises a newUE-Identity field.

In one embodiment, the first configuration comprises a T304.

In one embodiment, the first configuration comprises a T307.

In one embodiment, the first configuration comprises a rach-ConfigDedicated field.

In one embodiment, the first configuration comprises a physCellId field.

In one embodiment, the first configuration comprises a downlinkConfigCommon field.

In one embodiment, the first configuration comprises a uplinkConfigCommon field.

In one embodiment, the first configuration comprises a ssb-PositionsInBurst field.

In one embodiment, the first configuration comprises a ssb-periodicityServingCell.

In one embodiment, the first configuration comprises a dmrs-TypeA-Position field.

In one embodiment, the first configuration comprises a lte-CRS-ToMatchAround field.

In one embodiment, the first configuration comprises a rateMatchPatternToAddModList field.

In one embodiment, the first configuration comprises a rateMatchPatternToReleaseList field.

In one embodiment, the first configuration comprises a ssbSubcarrierSpacing field.

In one embodiment, the first configuration comprises a tdd-UL-DL-ConfigurationCommon field.

In one embodiment, the first configuration comprises a ss-PBCH-BlockPower field.

In one embodiment, the first configuration comprises a discoveryBurstWindowLength field.

In one embodiment, the first configuration comprises a frequencyInfoDL field.

In one embodiment, the first configuration comprises an initialDownlinkBWP field.

In one embodiment, the first configuration comprises a frequencyInfoUL field.

In one embodiment, the first configuration comprises an initialUplinkBWP field.

In one embodiment, the first configuration comprises at least one of spCellConfigCommon, or a newUE-Identity, or rach-ConfigDedicated or a physCellId, downlinkConfigCommon, or uplinkConfigCommon, or ssb-PositionsInBurst, a ssb-periodicityServingCell or a dmrs-TypeA-Position, or lte-CRS-ToMatchAround, a rateMatchPatternToAddModList, a rateMatchPatternToReleaseList, or a ssbSubcarrierSpacing, or tdd-UL-DL-ConfigurationCommon, or ss-PBCH-BlockPower, or a discoveryBurstWindowLength or frequencyInfoDL or an initialDownlinkBWP, or frequencyInfoUL or an initialUplinkBWP.

In one embodiment, the first configuration comprises mobilityControlInfo or mobilityControlInfoSCG.

In one embodiment, the first configuration comprises a targetPhysCellId.

In one embodiment, the first configuration comprises a carrierFreq.

In one embodiment, the first configuration comprises a newUE-Identity.

In one embodiment, the first configuration comprises radioResourceConfigCommon.

In one embodiment, the first configuration comprises rach-ConfigDedicated.

In one embodiment, the first configuration comprises a ue-IdentitySCG.

In one embodiment, the first configuration comprises rach-ConfigDedicated.

In one embodiment, the first configuration comprises rach-ConfigCommon.

In one embodiment, the first configuration comprises prach-Config.

In one embodiment, the first configuration comprises pdsch-ConfigCommon.

In one embodiment, the first configuration comprises pusch-ConfigCommon.

In one embodiment, the first configuration comprises phich-Config.

In one embodiment, the first configuration comprises pucch-ConfigCommon.

In one embodiment, the first configuration comprises at least one of a targetPhysCellId, or a carrierFreq or a newUE-Identity, or radioResourceConfigCommon, or rach-ConfigDedicated, or a ue-IdentitySCG, rach-ConfigDedicated or rach-ConfigCommon, or prach-Config, pdsch-ConfigCommon, or pusch-ConfigCommon, or phich-Config or pucch-ConfigCommon.

In one embodiment, the first condition comprises a condition of performing the Conditional Reconfiguration.

In one embodiment, the first condition is used for determining a condition of performing the first configuration.

In one embodiment, the first condition is related to measurement.

In one embodiment, the first condition is unrelated to measurement.

In one embodiment, the first condition comprises at least one of a A3 event or a A5 event.

In one embodiment, the first condition comprises a condExecutionCond or a triggerCondition.

In one embodiment, the first condition comprises a MeasId.

In one embodiment, the first configuration and the first condition are stored in a first variant, the first variant comprising at least one of VarConditionalReconfig or VarConditionalReconfiguration.

In one embodiment, the phrase that the first signaling comprises an RRC reconfiguration message comprises that the first signaling is used for RRC connection reconfiguration.

In one embodiment, the first signaling comprises an RRC reconfiguration message comprises that the first signaling is the RRC reconfiguration message.

In one embodiment, the first signaling comprises an RRC reconfiguration message comprises that the RRC reconfiguration message is all or part of the first signaling.

In one embodiment, the first signaling comprises an RRC reconfiguration message comprises that the RRC reconfiguration message is a field or an IE in the first signaling.

In one embodiment, the RRC reconfiguration message comprises a RRCReconfiguration message.

In one embodiment, the RRC reconfiguration message comprises a RRCConnectionReconfiguration message.

In one embodiment, the phrase that the first configuration comprises RRC reconfiguration comprises that the first configuration comprises an RRC reconfiguration message.

In one embodiment, the phrase that the first configuration comprises RRC reconfiguration comprises that an RRC reconfiguration message is a field in the first configuration.

In one embodiment, the phrase that the first configuration comprises RRC reconfiguration comprises that the first configuration carries the RRC reconfiguration message.

In one embodiment, the phrase that the first condition is related to channel measurement comprises that it is determined through channel measurement that the first target cell fulfills the first condition.

In one embodiment, the phrase that the first condition is related to channel measurement comprises that the first condition comprises relative magnitude of the channel measurement for the first target cell and a given threshold.

In one embodiment, the phrase that the first condition is related to channel measurement comprises that the channel measurement is used to determine whether the first condition is fulfilled.

In one embodiment, the channel measurement comprises at least one of Reference Signal Received Power (RSRP) measurement, or Reference Signal Received Quality (RSRQ) measurement, or Signal to Interference plus Noise Ratio (SINR) measurement, or Channel State Information (CSI) measurement, or DL synchronous measurement.

In one embodiment, the channel measurement comprises a L3 filter.

In one embodiment, the channel measurement is for the first target cell.

In one embodiment, the first state comprises a Dormancy state.

In one embodiment, the Dormancy state comprises a Deep Dormancy state.

In one embodiment, the Dormancy state comprises a Discontinuous Reception (DRX) state.

In one embodiment, the Dormancy state comprises a De-activation state.

In one embodiment, the Dormancy state comprises an Inactive state.

In one embodiment, the Dormancy state comprises a suspending state.

In one subembodiment, the word suspending means pausing.

In one subembodiment, the word suspending means suspense.

In one embodiment, the Dormancy state comprises an SCG deactivation state.

In one embodiment, the Dormancy state comprises an SCG inactivation state.

In one embodiment, the Dormancy state comprises an SCG dormant state.

In one embodiment, the Dormancy state comprises an SCG suspended state.

In one embodiment, the Dormancy state comprises an RRC_INACTIVE state.

In one embodiment, the second state comprises a non-dormant state.

In one embodiment, the second state comprises a connected state.

In one embodiment, the second state comprises an active state.

In one embodiment, the second state is not a DRX state.

In one embodiment, the second state comprises an activated state.

In one embodiment, the second state is not a suspending state.

In one embodiment, the second state comprises an SCG activation state.

In one embodiment, the second state comprises an RRC_CONNECTED state.

In one embodiment, the second state comprises an SCG non-dormant state.

In one embodiment, the given cell in the present disclosure includes the first cell or the first target cell.

In one embodiment, the given state in the present disclosure includes the first state or the second state.

In one embodiment, a given cell being in a given state means that a first node is in the given state targeting the given cell.

In one embodiment, a given cell being in a given state means that a first node is in the given state targeting a cell group to which the given cell belongs.

In one subembodiment, the cell group to which the given cell belongs comprises an MCG.

In one subembodiment, the cell group to which the given cell belongs comprises an SCG.

In one subembodiment, the cell group to which the given cell belongs comprises the given cell.

In one subembodiment, the cell group to which the given cell belongs comprises a SCell.

In one subembodiment, the cell group to which the given cell belongs does not comprise a SCell.

In one subembodiment, the cell group to which the first cell belongs and the cell group to which the first target cell belongs are both an SCG of the first node.

In one embodiment, before application of the first configuration, the given cell includes the first cell; after completing the application of the first configuration, the given cell includes the first target cell.

In one embodiment, the phrase that when the first cell is in a first state includes when an SCG is in the first state and when a PSCell in the SCG comprises the first cell.

In one embodiment, the phrase that when the first cell is in a second state includes when an SCG is in the second state and when a PSCell in the SCG comprises the first cell.

In one embodiment, the phrase that when the first target cell is in a first state includes when an SCG is in the first state and when a PSCell in the SCG comprises the first target cell.

In one embodiment, the phrase that when the first target cell is in a second state includes when an SCG is in the second state and when a PSCell in the SCG comprises the first target cell.

In one embodiment, when a given cell is in a first state, the first node does not listen over a Physical Downlink Control Channel (PDCCH) for the given cell.

In one embodiment, when a given cell is in a first state, the first node performs a Radio Link Monitor (RLM) measurement on the given cell.

In one embodiment, the first state comprises no Radio Link Failure (RLF) occurred in a given cell.

In one embodiment, the first state comprises no RLF being detected in an SCG.

In one embodiment, the first state comprises no synchronous reconfiguration failure occurring in an SCG.

In one embodiment, the first state comprises no configuration failure occurring in an SCG.

In one embodiment, the first state comprises no indication from a lower layer about the SRB3 integrity check failure that occurred in an SCG.

In one embodiment, the first state belongs to a CM_CONNECTED state.

In one embodiment, a given cell is RRC_CONNECTED.

In one embodiment, when a given cell is in a first state, a corresponding MCG is RRC_CONNECTED.

In one embodiment, when a given cell of the first node is in a first state, a behavior of the first node consists of several first-type behaviors.

In one subembodiment, the first-type behaviors comprise not listening over a PDCCH for the given cell.

In one subembodiment, the first-type behaviors comprise not performing uplink transmission for the given cell.

In one subembodiment, the first-type behaviors comprise not performing CSI measurement for the given cell.

In one subembodiment, the first-type behaviors comprise not reporting CSI of the given cell.

In one subembodiment, the first-type behaviors comprise keeping RRC configuration for the given cell.

In one subembodiment, the first-type behaviors comprise performing RLM measurement on the given cell.

In one subembodiment, the first-type behaviors comprise performing CSI measurement on the given cell.

In one subembodiment, the first-type behaviors comprise performing Radio Resource Management (RRM) measurement on the given cell.

In one subembodiment, the first-type behaviors comprise suspending an SRB for the given cell.

In one subembodiment, the first-type behaviors comprise suspending a Data Radio Bearer (DRB) for the given cell.

In one subembodiment, the first-type behaviors comprise continuing Beam Management (BM) over the given cell.

In one subembodiment, the first-type behaviors comprise not performing random access in the given cell.

In one subembodiment, the first-type behaviors comprise capability of performing random access in the given cell.

In one subembodiment, the first-type behaviors comprise not transmitting a Sounding Reference Signal (SRS) in the given cell.

In one subembodiment, the first-type behaviors comprise not transmitting an Uplink Shared CHannel (UL-SCH) in the given cell.

In one subembodiment, the first-type behaviors comprise not transmitting a Physical Uplink Control Channel (PUCCH) in the given cell.

In one subembodiment, the several first-type behaviors include X1 first-type behaviors, X1 being a positive integer.

In one subembodiment, the several first-type behaviors include all of the first-type behaviors.

In one subembodiment, the several first-type behaviors include some of the first-type behaviors.

In one embodiment, when a given cell is in a first state, the first node does not monitor a first search space on the given cell; when a given cell is in a second state, the first node monitors a first search space on the given cell.

In one subembodiment, the first search space comprises USS.

In one subembodiment, the first configuration indicates the first search space.

In one subembodiment, the first search space is configured by a higher layer signaling.

In one embodiment, when a given cell is in a first state, the first node does not monitor Downlink Control Information (DCI) of any format in a first format set on the given cell; when a given cell is in a second state, the first node monitors DCI of all formats in a first format set on the given cell.

In one subembodiment, the first format set comprises a UL Grant DCI Format.

In one subembodiment, the first format set comprises a DCI Format 1_1.

In one subembodiment, when the first cell is in the first state, the first node performs the channel measurement on the first cell.

In one embodiment, when the given cell is in a second state, the first node transmits an SRS in the given cell.

In one embodiment, when the given cell is in a second state, the first node reports CSI for the given cell.

In one embodiment, when the given cell is in a second state, the first node listens over a PDCCH in the given cell.

In one embodiment, when the given cell is in a second state, the first node listens over a PDCCH for the given cell.

In one embodiment, when the given cell is in a second state, if configured with a PUCCH for the given cell, the first node transmits the PUCCH in the given cell.

In one embodiment, the second state comprises all SRBs and all DRBs of the given cell not being suspended.

In one embodiment, the second state comprises at least one of SRBs and at least one of DRBs of the given cell not being suspended.

In one embodiment, the second state comprises SRB(s) of the given cell being available.

In one embodiment, the second state comprises SRB(s) of the given cell being established.

In one embodiment, the second state comprises SRB(s) of the given cell being resumed.

In one embodiment, the second state comprises DRB(s) of the given cell being resumed.

In one embodiment, the second state comprises a PSCell Change not being ongoing.

In one embodiment, the second state comprises a timer T304 for the given cell not being running.

In one embodiment, the second state comprises a timer T307 for the given cell not being running.

In one embodiment, the second state comprises no RLF being detected in an SCG.

In one embodiment, the second state comprises no synchronous reconfiguration failure occurring in an SCG.

In one embodiment, the second state comprises no configuration failure occurring in an SCG.

In one embodiment, the second state comprises no indication from a lower layer about the SRB3 integrity check failure that occurred in an SCG.

In one embodiment, the phrase of the first condition and a second condition both being fulfilled comprises that the first condition and the second condition are fulfilled simultaneously.

In one embodiment, the phrase of the first condition and a second condition both being fulfilled comprises that after fulfillment of the first condition, it is determined that the second condition is fulfilled.

In one subembodiment, when the first condition is not fulfilled, the second condition is not assessed.

In one subembodiment, when the first condition is fulfilled, the second condition is assessed.

In one embodiment, the phrase of the first condition and a second condition both being fulfilled comprises that after fulfillment of the second condition, it is determined that the first condition is fulfilled.

In one subembodiment, when the second condition is not fulfilled, the first condition is not assessed.

In one subembodiment, when the second condition is fulfilled, the first condition is assessed.

In one embodiment, the order of judging the first condition and the second condition is not subject to any restriction.

In one embodiment, when both the first condition and the second condition are fulfilled, the first configuration is applied to the first target cell; when at least one of the first condition or the second condition is not fulfilled, the Conditional Reconfiguration is not performed.

In one embodiment, the phrase that a first condition and a second condition both being fulfilled is used to determine an application of the first configuration to the first target cell comprises: when the first condition and the second condition are both fulfilled, the first configuration is applied to the first target cell.

In one embodiment, the phrase that a first condition and a second condition both being fulfilled is used to determine an application of the first configuration to the first target cell comprises: when the first condition and the second condition are both fulfilled, the Conditional Reconfiguration is performed.

In one embodiment, the second condition comprises that the first configuration being enabled is applied in the first state.

In one subembodiment, when the first configuration being enabled is applied in the first state, the second condition is fulfilled.

In one subembodiment, the second condition being fulfilled comprises that the first configuration being enabled is applied in the first state.

In one subembodiment, when the first configuration not being enabled is applied in the first state, the second condition is not fulfilled.

In one subembodiment, the second condition not being fulfilled comprises that the first condition not being enabled is applied in the first state.

In one subembodiment, the phrase that the first configuration being enabled is applied in the first state comprises allowing performance of the Conditional Reconfiguration in the first state.

In one subembodiment, the phrase that the first configuration being enabled is applied in the first state comprises allowing application of the first configuration for the first target cell in the first state.

In one subembodiment, it is explicitly indicated that the first configuration being enabled is applied in the first state.

In one subsidiary embodiment of the above subembodiment, it is indicated by an RRC signaling that the first configuration being enabled is applied in the first state.

In one subsidiary embodiment of the above subembodiment, it is indicated by an RRC signaling that the first configuration not being enabled is applied in the first state.

In one subsidiary embodiment of the above subembodiment, it is indicated by a MAC layer signaling that the first configuration being enabled is applied in the first state.

In one subsidiary embodiment of the above subembodiment, it is indicated by a MAC layer signaling that the first configuration not being enabled is applied in the first state.

In one subsidiary embodiment of the above subembodiment, it is indicated by a physical layer signaling that the first configuration being enabled is applied in the first state.

In one subsidiary embodiment of the above subembodiment, it is indicated by a physical layer signaling that the first configuration not being enabled is applied in the first state.

In one subembodiment, it is implicitly indicated that the first configuration being enabled is applied in the first state.

In one subsidiary embodiment of the above subembodiment, it is determined by an SRB type that the first configuration being enabled is applied in the first state.

In one subsidiary embodiment of the above subembodiment, it is determined by a transmitter of the first signaling that the first configuration being enabled is applied in the first state.

In one subsidiary embodiment of the above subembodiment, it is determined according to whether there is a change of key that the first configuration being enabled is applied in the first state.

In one subsidiary embodiment of the above subembodiment, it is determined by an initiator of the first configuration that the first configuration being enabled is applied in the first state, the initiator of the first configuration comprising a maintenance base station for the first cell or a maintenance base station for the second cell.

In one subsidiary embodiment of the above subembodiment, the first signaling being received through an SRB1 is used to determine that the second condition is fulfilled.

In one subsidiary embodiment of the above subembodiment, the first signaling being received through an SRB3 is used to determine that the second condition is not fulfilled.

In one subsidiary embodiment of the above subembodiment, the first signaling being received through a MN is used to determine that the second condition is fulfilled.

In one subsidiary embodiment of the above subembodiment, the first signaling being received through a SN is used to determine that the second condition is not fulfilled.

In one embodiment, the action of applying the first configuration to the first target cell comprises performing the Conditional Reconfiguration.

In one embodiment, the action of applying the first configuration to the first target cell comprises changing the first cell to the first target cell.

In one embodiment, the action of applying the first configuration to the first target cell comprises departing from the first cell and synchronizing to the first target cell.

In one embodiment, the action of applying the first configuration to the first target cell comprises establishing a connection to the first target cell.

In one embodiment, the action of applying the first configuration to the first target cell comprises performing RRC reconfiguration on the first target cell according to the first configuration.

In one embodiment, the action of applying the first configuration to the first target cell comprises determining the usage of all configurations in the first configuration.

In one embodiment, the action of applying the first configuration to the first target cell comprises determining the usage of some configurations in the first configuration.

In one embodiment, the action of applying the first configuration to the first target cell comprises starting to perform RRC connection reconfiguration.

In one embodiment, the phrase that the first condition being fulfilled is used to determine an application of the first configuration to the first target cell comprises: when the first condition is fulfilled, the first configuration is applied to the first target cell.

In one embodiment, the phrase that the first condition being fulfilled is used to determine an application of the first configuration to the first target cell comprises: when the first condition is fulfilled, the Conditional Reconfiguration is performed.

In one embodiment, the phrase of "as a response to fulfillment of both the first condition and the second condition" comprises a time when the first condition and the second condition are both fulfilled.

In one embodiment, the phrase of "as a response to fulfillment of both the first condition and the second condition" comprises an action subsequent to the fulfillment of both the first condition and the second condition.

In one embodiment, the phrase of "as a response to fulfillment of both the first condition and the second condition" comprises a time when the first configuration is applied to the first target cell.

In one embodiment, the action of dropping transmitting a first message on the first target cell comprises not transmitting the first message on the first target cell.

In one embodiment, the action of dropping transmitting a first message on the first target cell comprises not performing random-access procedure for the first target cell.

In one embodiment, the action of dropping transmitting a first message on the first target cell comprises that the first message is not transmitted on the first target cell.

In one embodiment, when the first cell is in the first state, as a response to fulfillment of both the first condition and the second condition, transmission of a first message will be dropped on the first target cell no matter whether random access is configured or not.

In one embodiment, the first message is transmitted via an air interface.

In one embodiment, the first message is transmitted by an antenna port.

In one embodiment, the first message comprises an uplink signal.

In one embodiment, the first message comprises a baseband signal.

In one embodiment, the first message comprises all or part of a physical layer signal.

In one embodiment, the first message comprises all or part of a MAC signaling.

In one embodiment, the first message comprises all or part of fields in a MAC Control Element (CE).

In one embodiment, the first message comprises all or part of fields in a MAC subheader.

In one embodiment, the first message comprises all or part of fields in a MAC PDU.

In one embodiment, the first message comprises a Cell Radio Network Temporary Identifier (C-RNTI) MAC CE.

In one embodiment, the first message comprises a Common Control Channel (CCCH) SDU.

In one embodiment, the first message comprises all or part of a higher-layer signaling.

In one embodiment, the first message comprises all or part of an upper-layer signaling.

In one embodiment, the first message comprises an RRC message.

In one embodiment, the first message is used for initiating a random-access procedure.

In one embodiment, the first message comprises a PUSCH.

In one embodiment, the first message does not comprise a PUSCH.

In one embodiment, the first message comprises a Message 1 (Msg1).

In one subembodiment, the Msg1 comprises a Preamble Sequence.

In one subembodiment, resources for the Msg1 are predefined.

In one embodiment, the first message comprises all or part of a Message 3 (Msg3).

In one subembodiment, the Msg3 comprises a PUSCH.

In one subembodiment, the Msg3 comprises a payload.

In one subembodiment, the Msg3 comprises Medium Access Control (MAC) information.

In one subembodiment, the Msg3 comprises RRC information.

In one subembodiment, the Msg3 comprises a UE identifier.

In one subembodiment, the Msg3 comprises a C-RNTI.

In one subembodiment, the Msg3 comprises a NAS UE identifier.

In one embodiment, the first message comprises a Message A (MsgA).

In one subembodiment, the MsgA comprises the Msg1 and the Msg3.

In one subembodiment, the MsgA at least comprises the Msg1.

In one subembodiment, the Preamble Sequence of the MsgA is different from the Preamble Sequence of the Msg1.

In one embodiment, the Preamble Sequence of the MsgA is the same as the Preamble Sequence of the Msg1.

In one embodiment, the phrase that the first message is used for a random-access procedure comprises that the first message is a message in the random-access procedure.

In one embodiment, the phrase that the first message is used for a random-access procedure comprises that the first message is used for initiating a random-access procedure.

In one embodiment, the phrase that the first message is used for a random-access procedure comprises that the random-access procedure comprises transmitting the first message.

In one embodiment, the phrase of "as a response to fulfillment of the first condition" comprises when the first condition is fulfilled.

In one embodiment, the phrase of "as a response to fulfillment of the first condition" comprises after determining that the first condition is fulfilled.

In one embodiment, the phrase of "as a response to fulfillment of the first condition" comprises when the first configuration is applied to the first target cell.

In one embodiment, the phrase of transmitting a first message on the first target cell comprises initiating a random-access procedure for the first target cell.

In one embodiment, the phrase of transmitting a first message on the first target cell comprises that a receiver of the first message comprises a maintenance base station for the first target cell.

In one embodiment, the phrase of transmitting a first message on the first target cell comprises that the first message is transmitted on a PRACH of the first target cell.

In one embodiment, the phrase of transmitting a first message on the first target cell comprises starting synchronizing to the uplink (UL) of the first target cell.

In one embodiment, the phrase of receiving a second message on the first target cell comprises receiving the second message according to configuration of the first target cell.

In one embodiment, the phrase of receiving a second message on the first target cell comprises that the second message is transmitted by the first target cell.

In one embodiment, when the first cell is in the second state, as a response to transmission of the first message, a second message is received on the first target cell.

In one embodiment, the second message is transmitted via an air interface.

In one embodiment, the second message is transmitted by an antenna port.

In one embodiment, the second message is transmitted on a DL-SCH.

In one embodiment, the second message comprises a second message in a 4-step random access procedure.

In one embodiment, the second message comprises a Message 2 (Msg2).

In one embodiment, the second message comprises a fourth message in a 4-step random access procedure.

In one embodiment, the second message comprises a Message 4 (Msg4).

In one embodiment, the second message comprises a second message in a 2-step random access procedure.

In one embodiment, the second message comprises a Message B (MsgB).

In one embodiment, the second message comprises a downlink signal.

In one embodiment, the second message comprises all or part of a MAC layer signaling.

In one embodiment, the second message comprises all or part of a MAC PDU.

In one embodiment, the second message comprises all or part of a MAC CE.

In one embodiment, the second message comprises all or part of a MAC Subheader.

In one embodiment, the second message comprises a Random Access Response (RAR).

In one embodiment, the second message is addressed to a RA-RNTI.

In one embodiment, the second message comprises a response for the first message.

In one embodiment, the second message comprises a first RNTI.

In one subembodiment, the first RNTI is dedicated to the first state.

In one subembodiment, the first RNTI is not dedicated to the first state.

In one subembodiment, the first RNTI comprises a Temporary C-RNTI.

In one subembodiment, the first RNTI comprises a C-RNTI.

In one subembodiment, the first RNTI comprises an I-RNTI.

In one subembodiment, the first RNTI comprises a D-RNTI.

In one embodiment, the second message comprises Timing Advance (TA).

In one embodiment, the second message comprises UL Grant.

In one embodiment, the phrase of the first message being used to trigger the second message comprises that the second message is a response to the first message.

In one embodiment, the phrase of the first message being used to trigger the second message comprises that transmitting the first message is used to determine reception of the second message.

In one embodiment, the first message comprises the Msg1 and the second message comprises the Msg2.

In one embodiment, the first message comprises the MsgA and the second message comprises the MsgB.

In one embodiment, the first message comprises the Msg1 and the Msg3, and the second message comprises the Msg2 and the Msg4.

In one subembodiment, the first node transmits the Msg1, receives the Msg2, transmits the Msg3, and receives the Msg4.

In one embodiment, when a first cell is in a first state, and both the first condition and the second condition are fulfilled, it is determined that the first configuration is applied to the first target cell.

In one embodiment, when the first cell is in a second state, and the first condition is fulfilled, it is determined that the first configuration is applied to the first target cell.

In one embodiment, when the first cell is in the first state, the action of applying the first configuration to the first target cell does not comprise transmitting the first message on the first target cell.

In one embodiment, when the first cell is in the second state, the action of applying the first configuration to the first target cell comprises transmitting the first message on the first target cell.

In one embodiment, the first signaling comprises a first configuration set and a first condition set for a first target cell set; the first target cell set comprises K1 first-type target cells, and the first target cell is one of the K1 first-type target cells, the first configuration set comprises K1 first-type configurations, and the first configuration is one of the K1 first-type configurations, the first condition set comprises K1 first-type conditions, and the first condition is one of the K1 first-type conditions, K1 being a positive integer; the K1 first-type configurations and the K1 first-type conditions are respectively associated with the K1 first-type target cells.

In one embodiment, when the first condition and the second condition are both fulfilled, it is determined that the first configuration is applied to the first target cell, if the first cell is in the first state, during the application procedure of the first configuration to the first target cell, drop transmitting the first message on the first target cell.

In one embodiment, when the first condition is fulfilled, it is determined that the first configuration is applied to the first target cell, if the first cell is in the second state, transmit the first message on the first target cell.

Embodiment 2

Figure 2:
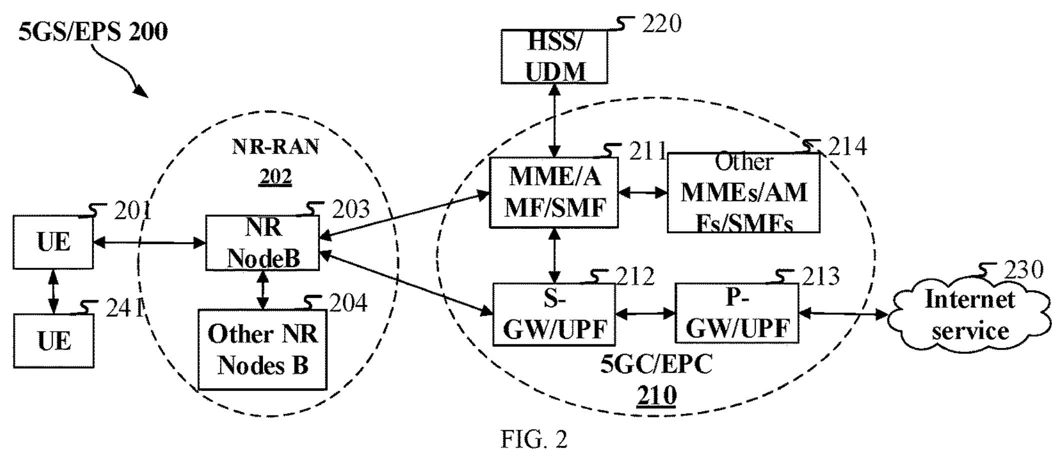
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System/Evolved Packet System (5GS/EPS) 200 or other appropriate terms, which may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communications units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE201 corresponds to the first node in the present disclosure.

In one embodiment, the UE201 supports transmissions in Non-Terrestrial Network (NTN).

In one embodiment, the UE201 supports transmissions in networks with large delay difference.

In one embodiment, the UE201 supports transmissions in Terrestrial Network (TN).

In one embodiment, the UE201 is a UE.

In one embodiment, the UE201 is an aircraft.

In one embodiment, the UE201 is a vehicle-mounted terminal.

In one embodiment, the UE201 is a relay.

In one embodiment, the UE201 is a ship.

In one embodiment, the UE201 is an IoT terminal.

In one embodiment, the UE201 is an IIoT terminal.

In one embodiment, the UE201 is a device supporting transmissions with low latency and high reliability.

In one embodiment, the gNB203 corresponds to the second node in the present disclosure.

In one embodiment, the gNB203 corresponds to the third node in the present disclosure.

In one embodiment, the gNB203 supports transmissions in Non-Terrestrial Network (NTN).

In one embodiment, the gNB203 supports transmissions in networks with large delay difference.

In one embodiment, the gNB203 supports transmissions in Terrestrial Network (TN).

In one embodiment, the gNB203 is a Macro Cellular base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large delay difference.

In one embodiment, the gNB203 is a flight platform.

In one embodiment, the gNB203 is satellite equipment.

In one embodiment, the gNB203 is a UE.

In one embodiment, the gNB203 is a gateway.

In one embodiment, the gNB204 corresponds to the fourth node in the present disclosure.

Embodiment 3

Figure 3:
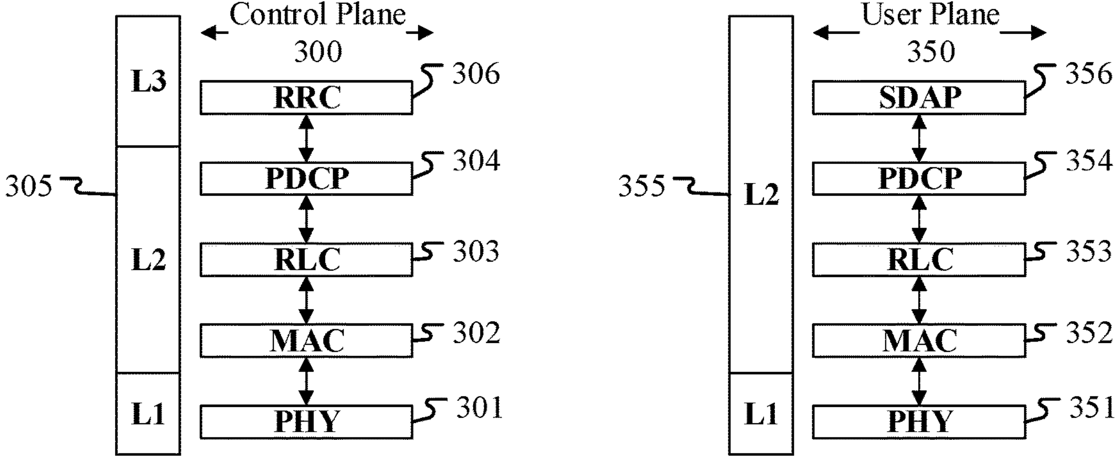
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, comprising a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the radio protocol architecture in FIG. 3 is applicable to the fourth node in the present disclosure.

In one embodiment, the first signaling in the present disclosure is generated by the RRC306.

In one embodiment, the first signaling in the present disclosure is generated by the MAC302 or the MAC352.

In one embodiment, the first signaling in the present disclosure is generated by the PHY301 or the PHY351.

In one embodiment, the second signaling in the present disclosure is generated by the RRC306.

In one embodiment, the second signaling in the present disclosure is generated by the MAC302 or the MAC352.

In one embodiment, the second signaling in the present disclosure is generated by the PHY301 or the PHY351.

In one embodiment, the third signaling in the present disclosure is generated by the RRC306.

In one embodiment, the third signaling in the present disclosure is generated by the MAC302 or the MAC352.

In one embodiment, the third signaling in the present disclosure is generated by the PHY301 or the PHY351.

In one embodiment, the first message in the present disclosure is generated by the RRC306.

In one embodiment, the first message in the present disclosure is generated by the MAC302 or the MAC352.

In one embodiment, the first message in the present disclosure is generated by the PHY301 or the PHY351.

In one embodiment, the second message in the present disclosure is generated by the RRC306.

In one embodiment, the second message in the present disclosure is generated by the MAC302 or the MAC352.

In one embodiment, the second message in the present disclosure is generated by the PHY301 or the PHY351.

Embodiment 4

Figure 4:
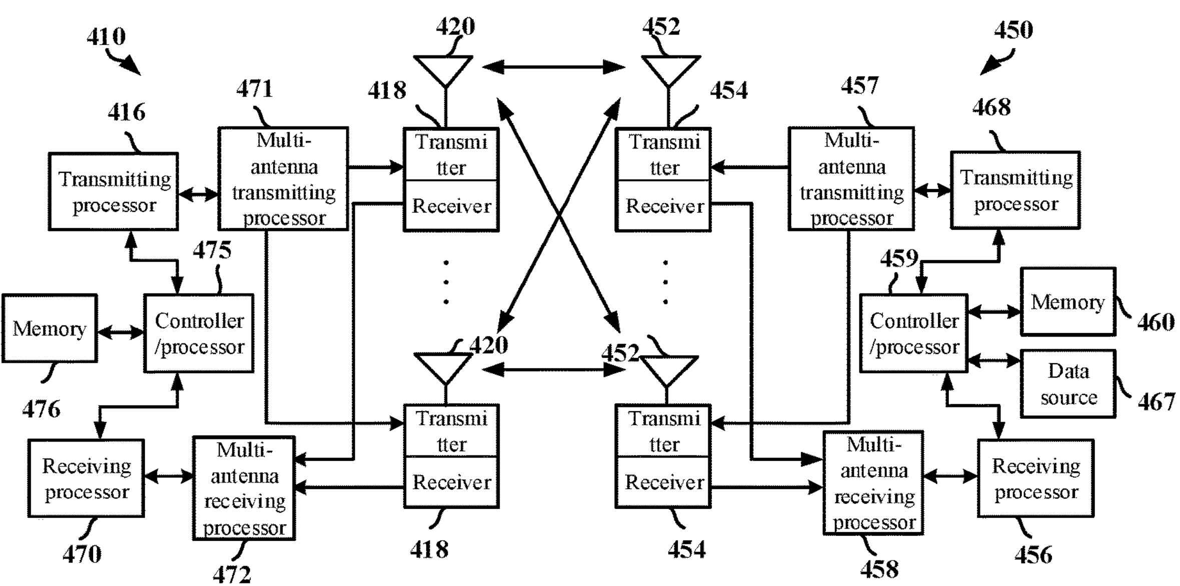
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, characterized in that the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling, the first signaling comprising a first configuration and a first condition for a first target cell, the first target cell being a cell other than a first cell and a second cell; determines through channel measurement that the first target cell fulfills the first condition; when the first cell is in a first state, as a response to the first condition being fulfilled, applies a first sub-configuration to the first target cell; when the first cell is in a second state, as a response to the first condition being fulfilled, applies the first configuration to the first target cell and starts a first timer; transmits a second signaling; when the first cell is in the first state, as a response to the first condition being fulfilled, does not transmit a first message on the first target cell; when the first cell is in the second state, as a response to the first condition being fulfilled, transmits a first message on the first target cell; receives a second message on the first target cell when the first cell is in the second state, the first message being used to trigger the second message, and, as a response to reception of the second message, stops the first timer; herein, the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, the first communication device 450 comprises a memory that stores a computer readable instruction program. The computer readable instruction program generates actions when executed by at least one processor. The actions include: receiving a first signaling, the first signaling comprising a first configuration and a first condition for a first target cell, the first target cell being a cell other than a first cell and a second cell; determining through channel measurement that the first target cell fulfills the first condition; when the first cell is in a first state, as a response to the first condition being fulfilled, a first sub-configuration is applied to the first target cell; when the first cell is in a second state, as a response to the first condition being fulfilled, the first configuration is applied to the first target cell and a first timer is started; transmitting a second signaling; when the first cell is in the first state, as a response to the first condition being fulfilled, not transmitting a first message on the first target cell; when the first cell is in the second state, as a response to the first condition being fulfilled, transmitting a first message on the first target cell; receiving a second message on the first target cell when the first cell is in the second state, the first message being used to trigger the second message, and, as a response to reception of the second message, stopping the first timer; herein, the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, the second communication device 410 comprises at least one processor and at least one memory. The at least one memory comprises computer program codes. The at least one memory and the computer program codes are configured to be used in collaboration with the at least one processor. The second communication device 410 at least receives a second signaling; when a first cell is in a first state, does not receive a first message on a first target cell as a response to a first condition being fulfilled; when the first cell is in a second state, receives a first message on the first target cell as a response to the first condition being fulfilled; transmits a second message on the first target cell when the first cell is in the second state, the first message being used to trigger the second message; herein, a first signaling comprises a first configuration and a first condition for the first target cell, the first target cell being a cell other than a first cell and a second cell; it is determined through channel measurement that the first target cell fulfills the first condition; when the first cell is in the first state, as a response to the first condition being fulfilled, the first sub-configuration is applied to the first target cell; when the first cell is in the second state, as a response to the first condition being fulfilled, the first configuration is applied to the first target cell and a first timer is started; as a response to reception of the second message, the first timer is stopped; the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, the second communication device 410 comprises a memory that stores a computer readable instruction program. The computer readable instruction program generates actions when executed by at least one processor. The actions include: receiving a second signaling; when a first cell is in a first state, not receiving a first message on a first target cell as a response to a first condition being fulfilled; when the first cell is in a second state, receiving a first message on the first target cell as a response to the first condition being fulfilled; transmitting a second message on the first target cell when the first cell is in the second state, the first message being used to trigger the second message; herein, a first signaling comprises a first configuration and a first condition for the first target cell, the first target cell being a cell other than a first cell and a second cell; it is determined through channel measurement that the first target cell fulfills the first condition; when the first cell is in the first state, as a response to the first condition being fulfilled, the first sub-configuration is applied to the first target cell; when the first cell is in the second state, as a response to the first condition being fulfilled, the first configuration is applied to the first target cell and a first timer is started; as a response to reception of the second message, the first timer is stopped; the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling, the first signaling comprising a first configuration and a first condition for a first target cell; when a first cell is in a first state, the first condition and a second condition both being fulfilled is used to determine an application of the first configuration to the first target cell; when the first cell is in a second state, the first condition being fulfilled is used to determine an application of the first configuration to the first target cell; when the first cell is in the first state, as a response to fulfillment of both the first condition and the second condition, drops transmitting a first message on the first target cell; when the first cell is in the second state, as a response to fulfillment of the first condition, transmits a first message on the first target cell; when the first cell is in the second state, receives a second message on the first target cell, the first message being used to trigger the second message; herein, the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the first communication device 450 comprises a memory that stores a computer readable instruction program. The computer readable instruction program generates actions when executed by at least one processor. The actions include: receiving a first signaling, the first signaling comprising a first configuration and a first condition for a first target cell; when a first cell is in a first state, the first condition and a second condition both being fulfilled is used to determine an application of the first configuration to the first target cell; when the first cell is in a second state, the first condition being fulfilled is used to determine an application of the first configuration to the first target cell; when the first cell is in the first state, as a response to fulfillment of both the first condition and the second condition, dropping transmitting a first message on the first target cell; when the first cell is in the second state, as a response to fulfillment of the first condition, transmitting a first message on the first target cell; when the first cell is in the second state, receiving a second message on the first target cell, the first message being used to trigger the second message; herein, the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the second communication device 410 comprises at least one processor and at least one memory. The at least one memory comprises computer program codes. The at least one memory and the computer program codes are configured to be used in collaboration with the at least one processor. The second communication device 410 at least: when a first cell is in a first state, a first condition and a second condition both being fulfilled is used to determine an application of a first configuration to a first target cell, as a response to fulfillment of both the first condition and the second condition, a first message is not received on the first target cell; when the first cell is in a second state, the first condition being fulfilled is used to determine an application of the first configuration to the first target cell, as a response to fulfillment of the first condition, a first message is received on the first target cell; when the first cell is in the second state, a second message is transmitted on the first target cell, the first message being used to trigger the second message; herein, a first signaling comprises the first configuration and the first condition for the first target cell; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the second communication device 410 comprises a memory that stores a computer readable instruction program. The computer readable instruction program generates actions when executed by at least one processor. The actions include: when a first cell is in a first state, a first condition and a second condition both being fulfilled is used to determine an application of a first configuration to a first target cell, as a response to fulfillment of both the first condition and the second condition, not receiving a first message on the first target cell; when the first cell is in a second state, the first condition being fulfilled is used to determine an application of the first configuration to the first target cell, as a response to fulfillment of the first condition, receiving a first message on the first target cell; when the first cell is in the second state, transmitting a second message on the first target cell, the first message being used to trigger the second message; herein, a first signaling comprises the first configuration and the first condition for the first target cell; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the antenna 452, the receiver 454, the receiving processor 456, and the controller/processor 459 are used for receiving a first signaling; and at least one of the antenna 420, the transmitter 418, the transmitting processor 416 or the controller/processor 475 is used for transmitting the first signaling.

In one embodiment, the antenna 452, the transmitter 454, the transmitting processor 468, and the controller/processor 459 are used for transmitting a second signaling; and at least one of the antenna 420, the receiver 418, the receiving processor 470 or the controller/processor 475 is used for receiving the second signaling.

In one embodiment, the antenna 452, the transmitter 454, the transmitting processor 468, and the controller/processor 459 are used for transmitting a first message; and at least one of the antenna 420, the receiver 418, the receiving processor 470 or the controller/processor 475 is used for receiving the first message.

In one embodiment, the antenna 452, the receiver 454, the receiving processor 456, and the controller/processor 459 are used for receiving a second message; and at least one of the antenna 420, the transmitter 418, the transmitting processor 416 or the controller/processor 475 is used for transmitting the second message.

In one embodiment, the antenna 452, the receiver 454, the receiving processor 456, and the controller/processor 459 are used for receiving a third signaling; and at least one of the antenna 420, the transmitter 418, the transmitting processor 416 or the controller/processor 475 is used for transmitting the third signaling.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the second communication device 410 corresponds to the fourth node in the present disclosure.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5A

Figure 5A:
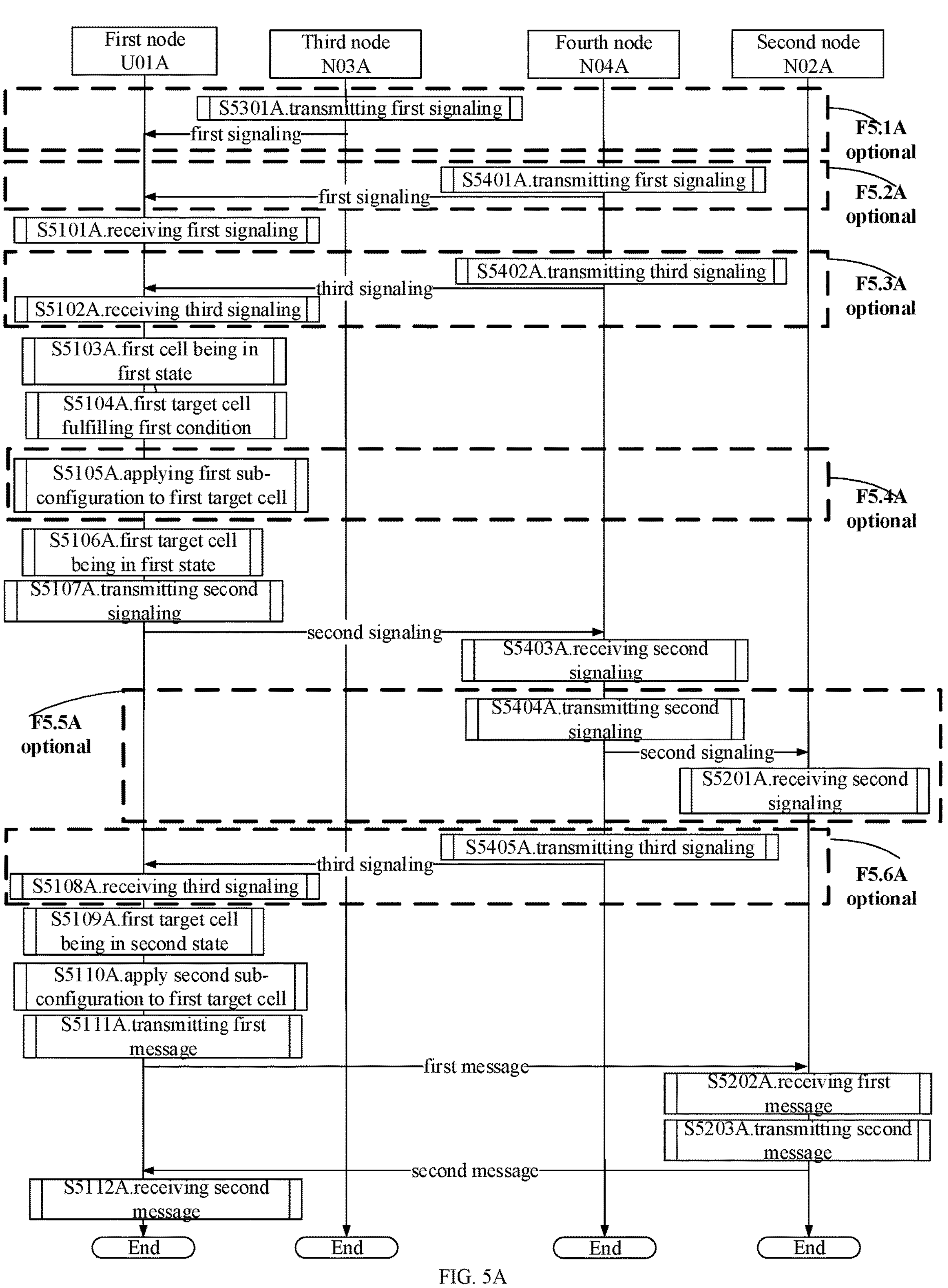
FIG. 5A illustrates a flowchart of radio signal transmission according to one embodiment of the present disclosure.

Embodiment 5A illustrates a flowchart of radio signal transmission according to one embodiment of the present disclosure, as shown in FIG. 5A. It should be particularly noted that the sequence presented herein does not restrict orders of signal transmissions or implementations in the present disclosure.

The first node U01A receives a first signaling in step S5101A; and receives a third signaling in step S5102A; in step S5103A, a first cell is in a first state; determines by channel measurement that a first target cell fulfills a first condition in step S5104A; in step S5105A, as a response to the first condition being fulfilled, applies a first sub-configuration to the first target cell; in step S5106A, the first target cell is in the first state; transmits a second signaling in step S5107A; when the first cell is in the first state, as a response to the first condition being fulfilled, does not transmit a first message on the first target cell; receives the third signaling in step S5108A; in step S5109A, the first target cell is in a second state; in step S5110A, when the first target cell transits from the first state to the second state, applies a second sub-configuration to the first target cell; in step S5111A, transmits a first message on the first target cell; in step S5112A, as a response to the action of transmitting a first message, receives a second message.

The second node N02A receives the second signaling in step S5201A; receives the first message in step S5202A; and transmits the second message in step S5203A.

The third N03A transmits the first signaling in step S5301A.

The fourth N04A transmits the first signaling in step S5401A; transmits the third signaling in step S5402A; and receives the second signaling in step S5403A; transmits the second signaling in step S5404A; and transmits the third signaling in step S5405A.

In Embodiment 5A, the first signaling comprises a first configuration and a first condition for a first target cell, the first target cell being a cell other than a first cell and a second cell; the first signaling comprises an RRC reconfiguration message; the first configuration and the first condition are associated with the first target cell; the first configuration comprises the first sub-configuration; the second signaling is used to indicate the first target cell; the first message is used for a random-access procedure; the first configuration comprises the second sub-configuration; the application of the first sub-configuration does not comprise the random-access procedure, while the application of the second sub-configuration comprises the random-access procedure; the third signaling is used to determine a transition of a given cell between the first state and the second state.

In one embodiment, the first node U01A comprises the UE201 in the present disclosure.

In one embodiment, the first node U01A stays connected to the third node N03A and the fourth node N04A through Dual Connectivity.

In one subembodiment, the Dual Connectivity comprises Multi-Radio Dual Connectivity (MR-DC).

In one subembodiment, the Dual Connectivity comprises NR-NR Dual Connectivity (NR DC).

In one subembodiment, the Dual Connectivity comprises Intra-E-UTRA DC.

In one subembodiment, the Dual Connectivity comprises NR-E-UTRA Dual Connectivity (NE-DC).

In one subembodiment, the Dual Connectivity comprises NG-RAN E-UTRA-NR Dual Connectivity (NGEN-DC).

In one subembodiment, the Dual Connectivity comprises E-UTRA-NR Dual Connectivity (EN DC).

In one subembodiment, the third node N03A comprises a Master Node, while the fourth node N04A comprises a Secondary Node.

In one subembodiment, the third node N03A comprises a Master eNodeB (MeNB), while the fourth node N04A comprises a SgNB.

In one subembodiment, the third node N03A comprises a Centralized Unit (CU), while the fourth node N04A comprises a DU.

In one subembodiment, the third node N03A comprises a node in an MCG, while the fourth node N04A comprises a node in an SCG.

In one subembodiment, the third node N03A comprises a Secondary Node, while the fourth node N04A comprises a Master Node.

In one subembodiment, the third node N03A comprises a Secondary eNodeB (SgNB), while the fourth node N04A comprises a MeNB.

In one subembodiment, the third node N03A comprises a Distributed Unit (DU), while the fourth node N04A comprises a CU.

In one subembodiment, the third node N03A comprises a node in an SCG, while the fourth node N04A comprises a node in an MCG.

In one subembodiment, the third node N03A comprises a maintenance base station for a PCell, while the fourth node N04A comprises a maintenance base station for a PSCell.

In one subembodiment, the third node N03A comprises a maintenance base station for a PSCell, while the fourth node N04A comprises a maintenance base station for a PCell.

In one subembodiment, a link between the third node N03A and the fourth node N04A is a non-ideal backhaul or an ideal backhaul.

In one subembodiment, the third node N03A and the fourth node N04A are connected via optical fibers.

In one subembodiment, the third node N03A and the fourth node N04A are connected via wireless connection.

In one subembodiment, the third node N03A and the fourth node N04A are connected via wired connection.

In one subembodiment, the third node N03A and the fourth node N04A are connected via multi-hop connection.

In one subembodiment, the third node N03A and the fourth node N04A are connected via at least one of an Xn interface, an Xn-C interface or an X2-C interface.

In one subembodiment, the first node U01A and the fourth node N04A are connected via a Uu interface.

In one subembodiment, the first node U01A and the third node N03A are connected via a Uu interface.

In one embodiment, the second node N02A comprises the gNB203 in the present disclosure.

In one embodiment, the third node N03A comprises the gNB203 in the present disclosure.

In one embodiment, the fourth node N04A comprises the gNB203 in the present disclosure.

In one embodiment, the second node N02A comprises the maintenance base station for the first target cell.

In one embodiment, the third node N03A comprises the maintenance base station for the first cell.

In one embodiment, the fourth node N04A comprises the maintenance base station for the second cell.

In one embodiment, the second node N02A and the third node N03A are the same.

In one embodiment, the second node N02A and the third node N03A are different.

In one embodiment, the action of applying a second sub-configuration to the first target cell comprises performing N3 first-type behavior(s) on the first target cell, N3 being a non-negative integer no greater than N1.

In one subembodiment, N3 is equal to 0.

In one subembodiment, N3 is unequal to 0.

In one subembodiment, N3 is less than N1.

In one subembodiment, N3 is equal to N1.

In one subembodiment, any behavior of the N3 first-type behavior(s) belongs to one of the N1 first-type behavior(s).

In one subembodiment, a behavior of the N3 first-type behavior(s) is one of the N1 first-type behavior(s).

In one embodiment, a total of the N2 first-type behavior(s) and the N3 first-type behavior(s) make up the N1 first-type behavior(s).

In one embodiment, a sum of N2 and N3 is equal to N1.

In one embodiment, any behavior of the N2 first-type behavior(s) is different from any behavior of the N3 first-type behavior(s).

In one embodiment, a behavior of the N2 first-type behavior(s) is the same as one of the N3 first-type behavior (s).

In one embodiment, N2 is equal to 0, and N3 is equal to N1.

In one embodiment, N3 is equal to 0, and N2 is equal to N1.

In one embodiment, neither of N2 and N3 is equal to 0.

In one embodiment, the application of a first sub-configuration comprises performing DL synchronizing, and the application of a second sub-configuration comprises performing UL synchronizing.

In one embodiment, the application of a first sub-configuration comprises performing DL synchronizing, and the application of a second sub-configuration comprises performing random access.

In one embodiment, when the first cell is in the first state, the first sub-configuration is applied; when the first target cell is in the second state, the second sub-configuration is applied.

In one embodiment, after completing the application of the first sub-configuration, the first cell is changed to the first target cell.

In one embodiment, the phrase that "the first configuration comprises the second sub-configuration" comprises that the second sub-configuration is a subset of the first configuration.

In one embodiment, the phrase that "the first configuration comprises the second sub-configuration" comprises that the second sub-configuration comprises fewer configurations than the first configuration.

In one embodiment, the phrase that "the first configuration comprises the second sub-configuration" comprises that the second sub-configuration is a part of the first configuration.

In one embodiment, the phrase that "the first configuration comprises the second sub-configuration" comprises that the second sub-configuration is an entirety of the first configuration.

In one embodiment, the first sub-configuration comprises an empty set.

In one subembodiment, when the first cell is in a first state, as a response to the first condition being fulfilled, the first configuration is not applied.

In one subembodiment, when the first target cell is transiting from the first state to the second state, the first configuration is not applied.

In one subembodiment, when the first cell is not in a first state, as a response to the first condition being fulfilled, the first configuration is not applied.

In one embodiment, the first sub-configuration does not comprise an empty set.

In one embodiment, the phrase that "the application of the first sub-configuration does not comprise the random-access procedure, while the application of the second sub-configuration comprises the random-access procedure" comprises: the random-access procedure is not performed during the application of the first sub-configuration, but instead, is performed during the application of the second sub-configuration.

In one embodiment, the phrase that "the application of the first sub-configuration does not comprise the random-access procedure, while the application of the second sub-configuration comprises the random-access procedure" comprises: when an SCG is in the first state, the random-access procedure is not performed; when an SCG is in the second state, the random-access procedure is performed.

In one embodiment, upon a transition of the first target cell from the first state to the second state, the first target cell is in the second state.

In one embodiment, the phrase of a transition of the first target cell from the first state to the second state comprises that the first cell is changed to the first target cell, and the first target cell transits from the first state to the second state for the first node U01A.

In one embodiment, the phrase of a transition of the first target cell from the first state to the second state comprises that a cell group to which the first target cell belongs transits from the first state to the second state.

In one embodiment, the phrase that "the third signaling is used to determine a transition of a given cell between the first state and the second state" comprises that the third signaling is used to indicate a transition of the given cell from the first state to the second state.

In one embodiment, the phrase that "the third signaling is used to determine a transition of a given cell between the first state and the second state" comprises that the third signaling is used to indicate a transition of the given cell from the second state to the first state.

In one embodiment, the phrase that "the third signaling is used to determine a transition of a given cell between the first state and the second state" comprises that upon reception of the third signaling, the first node U01A transits from the first state to the second state for the given cell.

In one embodiment, the phrase that "the third signaling is used to determine a transition of a given cell between the first state and the second state" comprises that the third signaling is used to determine that the given cell is in the first state or the second state.

In one embodiment, the phrase that "the third signaling is used to determine a transition of a given cell between the first state and the second state" comprises that the third signaling indicates that the given cell enters into the first state.

In one embodiment, the phrase that "the third signaling is used to determine a transition of a given cell between the first state and the second state" comprises that the third signaling indicates that the given cell enters into the second state.

In one embodiment, a transmitter of the third signaling comprises the third node N03A.

In one embodiment, a transmitter of the third signaling comprises the fourth node N04A.

In one embodiment, the given cell comprises a PSCell currently maintained by a receiver of the third signaling.

In one embodiment, the given cell comprises an SCG currently maintained by a receiver of the third signaling.

In one embodiment, the given cell comprises the first cell.

In one embodiment, the given cell comprises the first target cell.

In one embodiment, the third signaling is transmitted via an air interface.

In one embodiment, the third signaling is transmitted via a radio interface.

In one embodiment, the third signaling is transmitted via a higher-layer signaling.

In one embodiment, the third signaling comprises an upper-layer signaling.

In one embodiment, the third signaling comprises all or part of a higher-layer signaling.

In one embodiment, the third signaling comprises an RRC Message.

In one embodiment, the third signaling comprises all or part of IEs in an RRC message.

In one embodiment, the third signaling comprises all or part of fields of an IE in an RRC message.

In one embodiment, the third signaling comprises a DL signaling.

In one embodiment, a Radio Bearer bearing the third signaling comprises SRB1.

In one embodiment, a Radio Bearer bearing the third signaling comprises SRB3.

In one embodiment, a logical channel for the third signaling includes a DCCH.

In one embodiment, the third signaling is used to determine a transition of a cell group to which the given cell belongs between the first state and the second state.

In one embodiment, the third signaling comprises a RRCReconfiguration message.

In one embodiment, the third signaling comprises a RRC-ConnectionReconfiguration message.

In one embodiment, the third signaling comprises a MAC layer signaling.

In one embodiment, the third signaling comprises a MAC CE.

In one embodiment, the third signaling comprises a MAC Subheader.

In one embodiment, the third signaling comprises one or more fields in a MAC CE.

In one embodiment, the third signaling comprises one or more fields in a MAC Subheader.

In one embodiment, the third signaling comprises a physical layer signaling.

In one embodiment, the third signaling comprises DCI.

In one embodiment, the third signaling comprises a first indication, the first indication being used to determine that the first cell is in the first state or the second state.

In one subembodiment, the first indication comprises 1 bit.

In one subembodiment, the first indication comprises K1 bits, K1 being an integer greater than 1.

In one subembodiment, the first indication is a field in the third signaling.

In one subembodiment, the first indication is an IE in the third signaling.

In one subembodiment, the first indication comprises a first bitmap, and the first bitmap is used for indicating a state of a given cell; the first bitmap comprises Q1 bits, the Q1 bits respectively corresponding to Q1 cells, with the given cell being one of the Q1 cells; Q1 is a positive integer; one of the Q1 bits which is set to zero (0) or one (1) is used to determine that the cell enters into the first state or the second state.

In one subembodiment, the first indication being set to a true value is used to determine that the first cell enters into the first state, and the first indication being set to a false value is used to determine that the first cell enters into the second state.

In one subsidiary embodiment of the above subembodiment, the true value includes 1 or true.

In one subsidiary embodiment of the above subembodiment, the false value includes false or 0.

In one subembodiment, the third signaling comprises the first indication being used to determine a transition of a given cell between the first state and the second state.

In one embodiment, the first node U01A determines a transition of a given cell between the first state and the second state.

In one subembodiment, the first node U01A decides on a transition of a given cell between the first state and the second state according to an amount of data.

In one subsidiary embodiment of the above subembodiment, the amount of data comprises uplink data amount.

In one subsidiary embodiment of the above subembodiment, the amount of data comprises downlink data amount.

In one subsidiary embodiment of the above subembodiment, the amount of data being lower than a given threshold is used to decide on making the given cell enter into the first state, the given threshold being configurable.

In one subsidiary embodiment of the above subembodiment, the amount of data being higher than a given threshold is used to decide on making the given cell enter into the second state, the given threshold being configurable.

In one subembodiment, the first node U01A decides on a transition of a given cell between the first state and the second state according to link quality.

In one subsidiary embodiment of the above subembodiment, the link quality comprises MCG link quality.

In one subsidiary embodiment of the above subembodiment, the link quality comprises SCG link quality.

In one subsidiary embodiment of the above subembodiment, when the MCG link quality is lower than a given level, the given cell is transited from the first state to the second state, the given level being configurable.

In one subsidiary embodiment of the above subembodiment, when the MCG link quality is higher than a given level, the given cell is transited from the second state to the first state, the given level being configurable.

In one subsidiary embodiment of the above subembodiment, when the SCG link quality is lower than a given level, the given cell is transited from the second state to the first state, the given level being configurable.

In one subsidiary embodiment of the above subembodiment, when the SCG link quality is higher than a given level, the given cell is transited from the first state to the second state, the given level being configurable.

In one embodiment, the first target cell transiting from the first state to the second state is triggered by the third signaling.

In one embodiment, when the first node U01A receives the third signaling, which indicates the first target cell entering into the second state, the first target cell transits from the first state to the second state.

In one embodiment, the first target cell transiting from the first state to the second state is triggered by the first node U01A.

In one embodiment, the dotted-line framed box F5.1A is optional.

In one embodiment, the dotted-line framed box F5.2A is optional.

In one embodiment, either of the dotted-line framed box F5.1A and the dotted-line framed box F5.2A exists.

In one embodiment, the dotted-line framed box F5.3A is optional.

In one subembodiment, when the dotted-line framed box F5.3A exists, the third signaling is used to determine a transition of a given cell between the first state and the second state.

In one subembodiment, when the dotted-line framed box F5.3A does not exist, the first node U01A determines a transition of a given cell between the first state and the second state.

In one embodiment, the dotted-line framed box F5.4A is optional.

In one subembodiment, the dotted-line framed box F5.4A exists.

In one subembodiment, the dotted-line framed box F5.4A does not exist.

In one subembodiment, the first sub-configuration is not an empty set.

In one subembodiment, the first sub-configuration is an empty set.

In one embodiment, the dotted-line framed box F5.5A is optional.

In one subembodiment, the dotted-line framed box F5.5A exists.

In one subsidiary embodiment of the above subembodiment, the second node N02A receives the second signaling.

In one subsidiary embodiment of the above subembodiment, the second signaling is transmitted by the first node U01A to the fourth node N04A, and the fourth node N04A forwards the second signaling to the second node N02A.

In one subsidiary embodiment of the above subembodiment, the second signaling is forwarded via an Xn interface, or an Xn-C interface or an X2-C interface.

In one subsidiary embodiment of the above subembodiment, the second signaling is transmitted by an SRB1.

In one subsidiary embodiment of the above subembodiment, the second signaling comprises a ULInformationTransferMRDC message.

In one subembodiment, the dotted-line framed box F5.5A does not exist.

In one subsidiary embodiment of the above subembodiment, the second node N02A does not receive the second signaling.

In one subsidiary embodiment of the above subembodiment, a receiver of the second signaling comprises the fourth node N04A.

In one subsidiary embodiment of the above subembodiment, the second signaling is transmitted by an SRB1.

In one subsidiary embodiment of the above subembodiment, the second signaling comprises a RRCReconfigurationComplete mess age.

In one subsidiary embodiment of the above subembodiment, the second signaling comprises RRCConnectionReconfigurationComplete.

In one embodiment, the dotted-line framed box F5.6A is optional.

In one subembodiment, when the dotted-line framed box F5.6A exists, the third signaling is used to determine a transition of a given cell between the first state and the second state.

In one subembodiment, when the dotted-line framed box F5.6A does not exist, the first node U01A determines a transition of a given cell between the first state and the second state.

Embodiment 5B

Figure 5B:
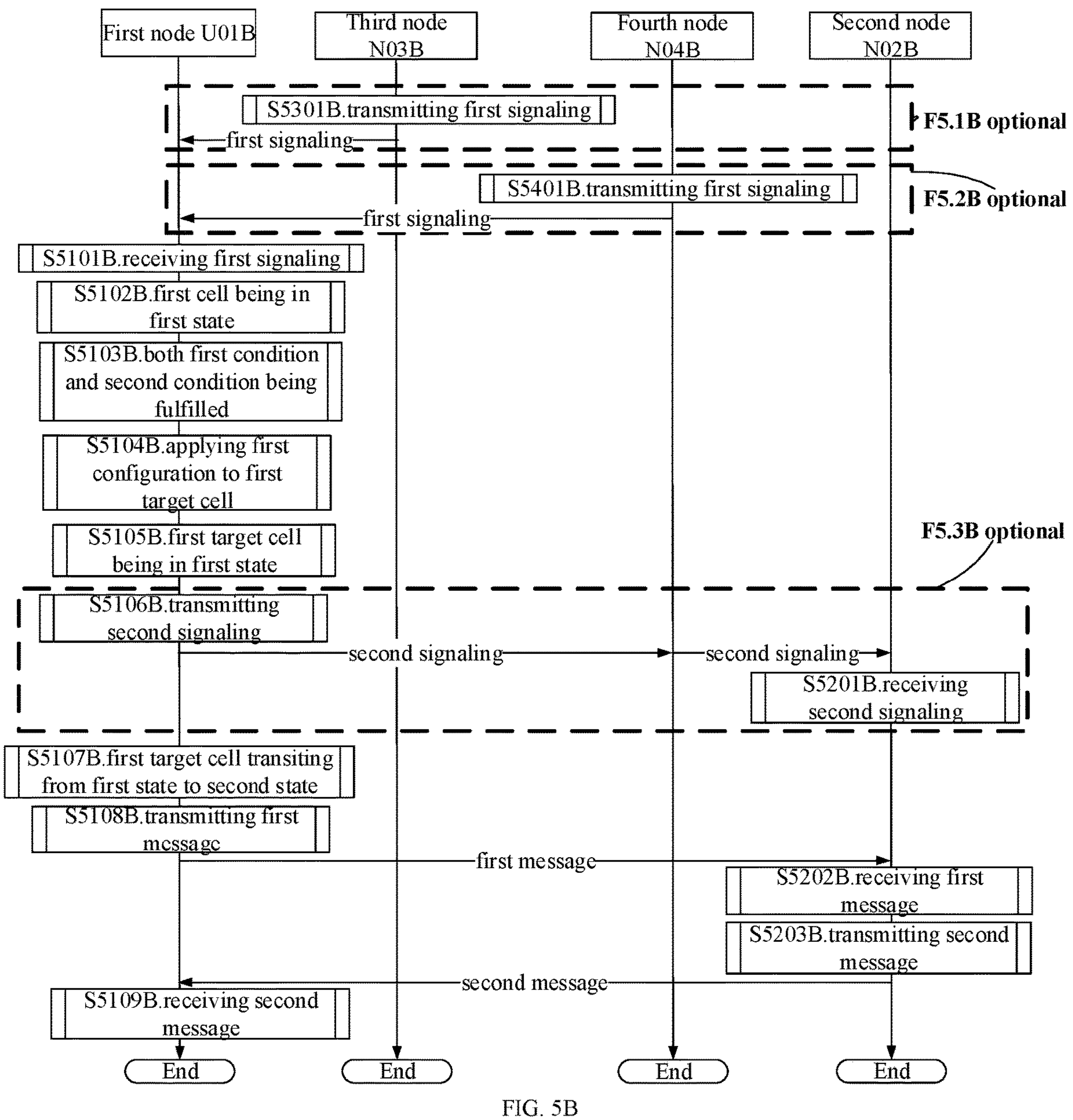
FIG. 5B illustrates a flowchart of radio signal transmission according to one embodiment of the present disclosure.

Embodiment 5B illustrates a flowchart of radio signal transmission according to one embodiment of the present disclosure, as shown in FIG. 5B. It should be particularly noted that the sequence presented herein does not restrict orders of signal transmissions or implementations in the present disclosure.

The first node U01B receives a first signaling in step S5101B; in step S5102B, a first cell is in a first state; in step S5103B, a first condition and a second condition are fulfilled; in step S5104B, the first condition and a second condition both being fulfilled is used to determine an application of the first configuration to the first target cell, and as a response to the fulfillment of the first condition and the second condition, drops transmitting a first message on the first target cell; in step S5105B, the first target cell is in the first state; as a response to completing the application of the first configuration, transmits a second signaling in step S5106B; in step S5107B, determines a transition from the first state to the second state of the first target cell; in step S5108B, as a response to the action of determining a transition from the first state to the second state of the first target cell, transmits the first message on the first target cell; and receives a second message as a response to transmission of the first message in step S5109B.

The second node N02B receives the second signaling in step S5201B; receives the first message in step S5202B; and transmits the second message in step S5203B.

The third node N03B transmits the first signaling in step S5301B.

The fourth node N04B transmits the first signaling in step S5401B.

In Embodiment 5B, the first signaling comprises a first configuration and a first condition for a first target cell; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure; the second signaling is used to indicate the first target cell; when the first cell is in the first state, at least one of the first condition or the second condition being unfulfilled is used to determine that the first configuration is not applied to the first target cell.

In one embodiment, the first node U01B comprises the UE201 in the present disclosure.

In one embodiment, the second node N02B comprises a maintenance base station for the first target cell.

In one embodiment, the third node N03B comprises a maintenance base station for the first cell.

In one embodiment, the fourth node N04B comprises a maintenance base station for the second cell.

In one embodiment, the second node N02B, the third node N03B and the fourth node N04B respectively comprise the gNB203 in the present disclosure.

In one embodiment, the second node N02B comprises the gNB203 in the present disclosure, and the fourth node N04B comprises the gNB204 in the present disclosure.

In one embodiment, the third node N03B comprises the gNB203 in the present disclosure, and the fourth node N04B comprises the gNB204 in the present disclosure.

In one embodiment, the second node N02B and the third node N03B are the same.

In one embodiment, the second node N02B and the third node N03B are different.

In one embodiment, the first node U01B stays connected to the third node N03B and the fourth node N04B through Dual Connectivity.

In one subembodiment, the Dual Connectivity comprises Multi-Radio Dual Connectivity (MR-DC), or NR-NR Dual Connectivity (NR DC), or Intra-E-UTRA DC or NR-E-UTRA Dual Connectivity (NE-DC), or NG-RAN E-UTRA-NR Dual Connectivity (NGEN-DC), or E-UTRA-NR Dual Connectivity (EN DC).

In one subembodiment, a link between the third node N03B and the fourth node N04B is a non-ideal backhaul or an ideal backhaul.

In one subembodiment, the third node N03B and the fourth node N04B are connected via wireless connection or wired connection.

In one subembodiment, the third node N03B and the fourth node N04B are connected via at least one of an Xn interface, an Xn-C interface or an X2-C interface.

In one subembodiment, the first node U01B and the fourth node N04B are connected via a Uu interface.

In one subembodiment, the first node U01B and the third node N03B are connected via a Uu interface.

In one embodiment, the third node N03B comprises a Master Node (MN), and the fourth node N04B comprises a Secondary Node (SN).

In one subembodiment, the Master Node comprises a Master eNodeB (MeNB), or a Centralized Unit (CU) or a node in an MCG, or a maintenance base station for a PCell.

In one subembodiment, the Secondary Node comprises a Secondary eNodeB (SgNB), or a Distributed Unit (DU) or a node in an SCG, or a maintenance base station for a PSCell.

In one embodiment, the third node N03B comprises a Secondary Node, while the fourth node N04B comprises a Master Node.

In one embodiment, after a transition from the first state to the second state of the first target cell, the first target cell is in the second state.

In one embodiment, the action of determining a transition of the first target cell from the first state to the second state comprises: the first target cell transiting from the first state to the second state for the first node U01B.

In one embodiment, the action of determining a transition of the first target cell from the first state to the second state comprises: receiving a downlink signaling from the second cell, the downlink signaling indicating that the first target cell transits from the first state to the second state.

In one subembodiment, the downlink signaling comprises an RRC message.

In one subembodiment, the downlink signaling comprises a MAC CE.

In one subembodiment, the downlink signaling comprises a piece of DCI.

In one embodiment, the action of determining a transition of the first target cell from the first state to the second state comprises: determining that the first target cell transits from the first state to the second state according to the current buffer status.

In one subembodiment, the buffer status comprises a BSR.

In one subembodiment, the buffer status comprises an uplink buffer status.

In one subembodiment, the buffer status comprises a downlink buffer status.

In one subembodiment, when the buffer status is larger than a given threshold, it is determined that the first target cell transits from the first state to the second state.

In one subembodiment, the first node U01B determines according to the current buffer status that the first target cell transits from the first state to the second state.

In one subembodiment, a maintenance base station for the second cell determines according to the current buffer status that the first target cell transits from the first state to the second state.

In one embodiment, the action of determining a transition of the first target cell from the first state to the second state comprises: determining that the first target cell transits from the first state to the second state according to indication by a higher-layer signaling.

In one subembodiment, the higher-layer signaling comprises a MAC Subheader.

In one subembodiment, the higher-layer signaling comprises a MAC CE.

In one embodiment, the action of determining a transition of the first target cell from the first state to the second state comprises: when the first target cell transits from the first state to the second state.

In one embodiment, the phrase of as a response to transmission of the first message comprises: upon transmission of the first message.

In one embodiment, the phrase of as a response to transmission of the first message comprises: as an action following the transmission of the first message.

In one embodiment, the phrase of as a response to completing the application of the first configuration comprises: upon completion of the application of the first configuration.

In one embodiment, the phrase of as a response to completing the application of the first configuration comprises: when the application of the first configuration is completed.

In one embodiment, the second signaling is transmitted targeting the action of applying the first configuration.

In one embodiment, the phrase that the second signaling is used to indicate the first target cell comprises: the second signaling is used for determining that application of the first configuration for the first target cell is completed.

In one embodiment, the phrase that the second signaling is used to indicate the first target cell comprises that a final receiver of the second signaling comprises a maintenance base station for the first target cell.

In one embodiment, a receiver of the second signaling comprises a maintenance base station for the first target cell.

In one embodiment, the second signaling is received by a maintenance base station for the second cell, and the maintenance base station for the second cell forwards the second signaling to a maintenance base station for the first target cell.

In one embodiment, the second signaling is transmitted via an air interface.

In one embodiment, the second signaling is transmitted via a radio interface.

In one embodiment, the second signaling is transmitted via a higher-layer signaling.

In one embodiment, the second signaling comprises an upper-layer signaling.

In one embodiment, the second signaling comprises all or part of a higher-layer signaling.

In one embodiment, the second signaling comprises an RRC message.

In one embodiment, the second signaling comprises all or part of IEs in an RRC message.

In one embodiment, the second signaling comprises all or part of fields of an IE in an RRC message.

In one embodiment, the second signaling comprises an Uplink (UL) signaling.

In one embodiment, a Signaling Radio Bearer of the second signaling comprises SRB1.

In one embodiment, a Signaling Radio Bearer of the second signaling comprises SRB3.

In one embodiment, a logical channel bearing the second signaling includes a DCCH.

In one embodiment, the second signaling is used for acknowledgement of the first signaling.

In one embodiment, the second signaling comprises a RRCReconfigurationComplete message.

In one embodiment, the second signaling comprises a RRCConnectionReconfigurationComplete message.

In one embodiment, the second signaling comprises a ULInformationTransferMRDC message, the ULInformationTransferMRDC message comprising a RRCReconfigurationComplete message or a RRCConnectionReconfigurationComplete message.

In one embodiment, when the first cell is in the first state, as a response to completing the application of the first configuration, a second signaling is transmitted.

In one embodiment, when the first cell is in the second state, as a response to completing the application of the first configuration, a second signaling is transmitted.

In one embodiment, the phrase that at least one of the first condition or the second condition being unfulfilled comprises that the first condition is fulfilled, and the second condition is unfulfilled.

In one embodiment, the phrase that at least one of the first condition or the second condition being unfulfilled comprises that the first condition is unfulfilled, and the second condition is fulfilled.

In one embodiment, the phrase that at least one of the first condition or the second condition being unfulfilled comprises that neither of the first condition and the second condition is fulfilled.

In one embodiment, the phrase that the first configuration is not applied to the first target cell comprises: continuing to determine whether the first condition is fulfilled.

In one embodiment, the phrase that the first configuration is not applied to the first target cell comprises: dropping application of the first configuration.

In one embodiment, the phrase that the first configuration is not applied to the first target cell comprises: not applying any configuration in the first configuration.

In one embodiment, the phrase that the first configuration is not applied to the first target cell comprises: not applying part of configurations in the first configuration.

In one embodiment, the phrase that the first configuration is not applied to the first target cell comprises: releasing the first configuration for the first target cell.

In one embodiment, the phrase that the first configuration is not applied to the first target cell comprises: removing the first configuration for the first target cell from VarConditionalReconfig or VarConditionalReconfiguration.

In one embodiment, the phrase that the first configuration is not applied to the first target cell comprises: stopping assessment on the first condition for the first target cell.

In one embodiment, the second condition is in effect for the first state.

In one embodiment, when at least one of the first condition or the second condition is unfulfilled, the application of the first configuration to the first target cell is dropped.

In one embodiment, a transmitter of the first signaling comprises the third node N03B, and the first signaling is received through an SRB3, the first signaling comprising a RRCReconfiguration message or a RRCConnectionReconfiguration message; when the first cell is in the first state, a receiver of the second signaling comprises the fourth node N04B, and the second signaling is transmitted through an SRB1, the second signaling comprising ULInformationTransferMRDC, the ULInformationTransferMRDC comprising a RRCReconfigurationComplete message or a RRCConnectionReconfigurationComplete message, and the second signaling is transmitted by the fourth node N04B to the second node N02B.

In one embodiment, a transmitter of the first signaling comprises the third node N03B, and an initiator of the first signaling comprises the fourth node N04B, and the first signaling is received through a split SRB1, the first signaling comprising a RRCReconfiguration message or a RRCConnectionReconfiguration message; when the first cell is in the first state, a receiver of the second signaling comprises the fourth node N04B, and the second signaling is transmitted through an SRB1, the second signaling comprising ULInformationTransferMRDC, the ULInformationTransferMRDC comprising a RRCReconfigurationComplete message or a RRCConnectionReconfigurationComplete message, and the second signaling is transmitted by the fourth node N04B to the second node N02B.

In one embodiment, a transmitter of the first signaling comprises the fourth node N04B, and the first signaling is received through an SRB1, the first signaling comprising a RRCReconfiguration message or a RRCConnectionReconfiguration message; when the first cell is in the first state, a receiver of the second signaling comprises the fourth node N04B, and the second signaling is transmitted through an SRB1, the second signaling comprising a RRCReconfigurationComplete message or a RRCConnectionReconfigurationComplete message.

In one embodiment, a transmitter of the first signaling comprises the fourth node N04B, and the first signaling is received through an SRB1, the first signaling comprising a RRCReconfiguration message or a RRCConnectionReconfiguration message; when the first cell is in the first state, a receiver of the second signaling comprises the fourth node N04B, and the second signaling is transmitted through an SRB1, the second signaling comprising ULInformationTransferMRDC, the ULInformationTransferMRDC comprising a RRCReconfigurationComplete message or a RRCConnectionReconfigurationComplete message, and the second signaling is transmitted by the fourth node N04B to the second node N02B.

In one embodiment, when the first cell is in the first state, a receiver of the second signaling comprises the fourth node N04B, and the second signaling is transmitted through an SRB1, the second signaling comprising ULInformationTransferMRDC, the ULInformationTransferMRDC comprising a RRCReconfigurationComplete message or a RRCConnectionReconfigurationComplete message, and the second signaling is transmitted by the fourth node N04B to the second node N02B.

In one embodiment, when the first cell is in the first state, and the first condition and the second condition are both fulfilled, as a response to the application of the first configuration to the first target cell, when the first target cell is in the first state, transmission of the second signaling is dropped.

In one embodiment, when the first cell is in the second state, there is no need for judgement about the second condition.

In one embodiment, the dotted-line framed box F5.1B is optional.

In one embodiment, the dotted-line framed box F5.2B is optional.

In one embodiment, the dotted-line framed box F5.3B is optional.

In one subembodiment, the second signaling is transmitted.

In one subembodiment, the second signaling is not transmitted.

In one embodiment, either of the dotted-line framed box F5.1B and the dotted-line framed box F5.2B exists.

In one embodiment, both the dotted-line framed box F5.1B and the dotted-line framed box F5.2B exist.

Embodiment 6A

Figure 6A:
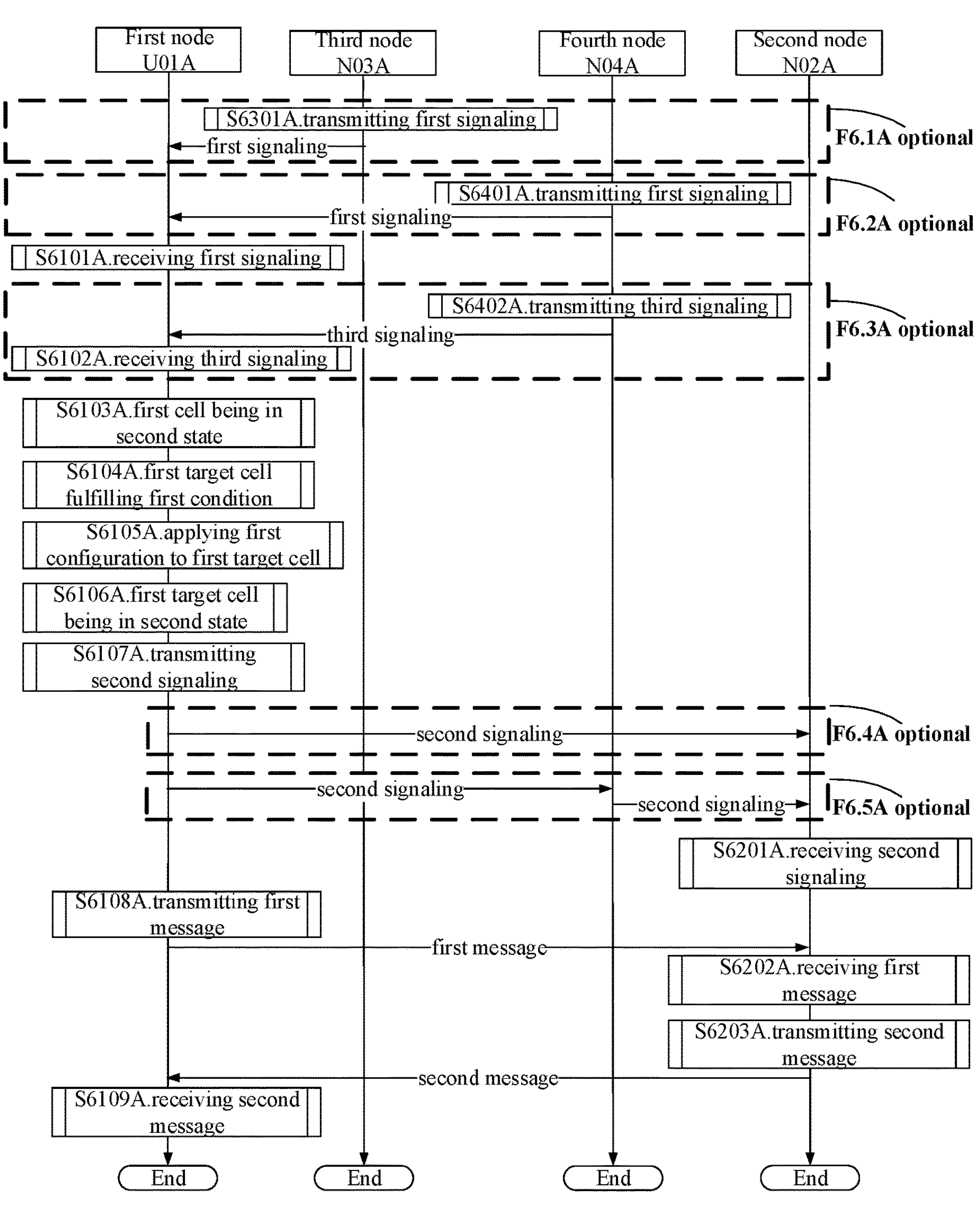
FIG. 6A illustrates a flowchart of radio signal transmission according to another embodiment of the present disclosure.

Embodiment 6A illustrates a flowchart of radio signal transmission according to another embodiment of the present disclosure, as shown in FIG. 6A. It should be particularly noted that the sequence presented herein does not restrict orders of signal transmissions or implementations in the present disclosure.

The first node U01A receives a first signaling in step S6101A; and receives a third signaling in step S6102A; in step S6103A, a first cell is in a second state; in step S6104A, determines through channel measurement that a first target cell fulfills a first condition; in step S6105A, as a response to the first condition being fulfilled, applies a first configuration to the first target cell; in step S6106A, the first target cell is in the second state; transmits a second signaling in step S6107A; as a response to the first condition being fulfilled, transmits a first message on the first target cell in step S6108A; and receives a second message on the first target cell in step S6109A.

The second node N02A receives the second signaling in step S6201A; receives the first message in step S6202A; and transmits the second message in step S6203A.

The third node N03A transmits the first signaling in step S6301A.

The fourth node N04A transmits the first signaling in step S6401A; and transmits the third signaling in step S6402A.

In Embodiment 6A, the first signaling comprises a first configuration and a first condition for a first target cell, the first target cell being a cell other than a first cell and a second cell; the first message is used to trigger the second message; the first signaling comprises an RRC reconfiguration message; the first configuration and the first condition are associated with the first target cell; the first configuration comprises the first sub-configuration; the second signaling is used to indicate the first target cell; the first message is used for a random-access procedure; the third signaling is used to determine a transition of a given cell between the first state and the second state.

In one embodiment, a receiver of the second signaling comprises the fourth node N04A, and the fourth node N04A forwards the second signaling to the second node N02A.

In one subembodiment, the second signaling is transmitted through an SRB1.

In one subembodiment, the second signaling comprises a ULInformationTransferMRDC message.

In one embodiment, a receiver of the second signaling comprises the second node N02A.

In one subembodiment, the second signaling is transmitted through an SRB3.

In one subembodiment, the second signaling comprises a RRCReconfigurationComplete message.

In one subembodiment, the second signaling comprises a RRCConnectionReconfigurationComplete message.

In one embodiment, the dotted-line framed box F6.1A is optional.

In one embodiment, the dotted-line framed box F6.2A is optional.

In one embodiment, the dotted-line framed box F6.3A is optional.

In one embodiment, the dotted-line framed box F6.4A is optional.

In one embodiment, the dotted-line framed box F6.5A is optional.

In one embodiment, either of the dotted-line framed box F6.1A and the dotted-line framed box F6.2A exists.

In one embodiment, the dotted-line framed box F6.3A exists.

In one embodiment, the dotted-line framed box F6.3A does not exist.

In one embodiment, either of the dotted-line framed box F6.4A and the dotted-line framed box F6.5A exists.

In one subembodiment, when the first node U01A is configured with an SRB3, the dotted-line framed box F6.4A exists, while the dotted-line framed box F6.5A does not exist.

In one subembodiment, when the first node U01A is not configured with an SRB3, the dotted-line framed box F6.5A exists, while the dotted-line framed box F6.4A does not exist.

Embodiment 6B

Figure 6B:
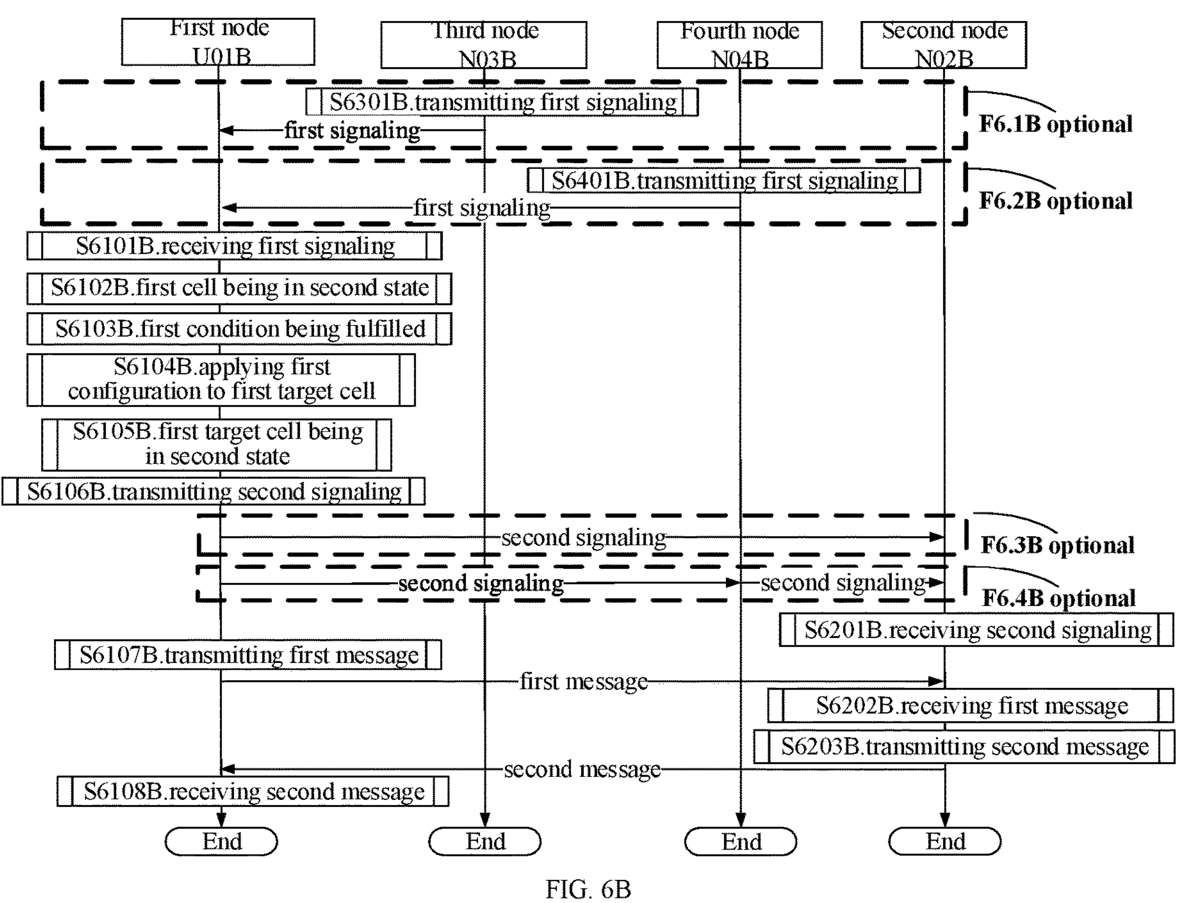
FIG. 6B illustrates a flowchart of radio signal transmission according to another embodiment of the present disclosure.

Embodiment 6B illustrates a flowchart of radio signal transmission according to another embodiment of the present disclosure, as shown in FIG. 6B. It should be particularly noted that the sequence presented herein does not restrict orders of signal transmissions or implementations in the present disclosure.

The first node U01B receives a first signaling in step S6101B; in step S6102B, a first node is in a second state; in step S6103B, a first condition is fulfilled; in step S6104B, the first condition being fulfilled is used to determine an application of a first configuration to the first target cell; in step S6105B, the first target cell is in the second state; in step S6106B, transmits a second signaling as a response to completing the application of the first configuration; and in step S6107B, transmits a first message on the first target cell as a response to the first condition being fulfilled; and in step S6108B, receives a second message on the first target cell.

The second node N02B receives the second signaling in step S6201B; receives the first message in step S6202B; and transmits the second message in step S6203B.

The third node N03B transmits the first signaling in step S6301B.

The fourth node N04B transmits the first signaling in step S6401B.

In Embodiment 6B, the first signaling comprises the first configuration and the first condition; the first message is used to trigger the second message; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure; the second signaling is used to indicate the first target cell.

In one embodiment, a transmitter of the first signaling comprises the third node N03B, and the first signaling is received through an SRB3, the first signaling comprising a RRCReconfiguration message or a RRCConnectionReconfiguration message; when the first cell is in the second state, a receiver of the second signaling comprises the second node N02B, and the second signaling is transmitted through an SRB3, the second signaling comprising a RRCReconfigurationComplete message or a RRCConnectionReconfigurationComplete message.

In one embodiment, a transmitter of the first signaling comprises the third node N03B, and an initiator of the first signaling comprises the fourth node N04B, and the first signaling is received through a split SRB1, the first signaling comprising a RRCReconfiguration message or a RRCConnectionReconfiguration message; when the first cell is in the second state, a receiver of the second signaling comprises the second node N02B, and the second signaling is transmitted through a split SRB1, the second signaling comprising ULInformationTransferMRDC, the ULInformationTransferMRDC comprising a RRCReconfigurationComplete message or a RRCConnectionReconfigurationComplete message.

In one embodiment, a transmitter of the first signaling comprises the fourth node N04B, and the first signaling is received through an SRB1, the first signaling comprising a RRCReconfiguration message or a RRCConnectionReconfiguration message; when the first cell is in the second state, a receiver of the second signaling comprises the fourth node N04B, and the second signaling is transmitted through an SRB1, the second signaling comprising a RRCReconfigurationComplete message or a RRCConnectionReconfigurationComplete message.

In one embodiment, a transmitter of the first signaling comprises the fourth node N04B, and the first signaling is received through an SRB1, the first signaling comprising a RRCReconfiguration message or a RRCConnectionReconfiguration message; when the first cell is in the second state, a receiver of the second signaling comprises the fourth node N04B, and the second signaling is transmitted through an SRB1, the second signaling comprising ULInformationTransferMRDC, the ULInformationTransferMRDC comprising a RRCReconfigurationComplete message or a RRCConnectionReconfigurationComplete message, and the second signaling is transmitted by the fourth node N04B to the second node N02B.

In one embodiment, a transmitter of the first signaling comprises the fourth node N04B, and an initiator of the first signaling comprises the third node N03B, and the first signaling is received through an SRB1, the first signaling comprising a RRCReconfiguration message or a RRCConnectionReconfiguration message; when the first cell is in the second state, a receiver of the second signaling comprises the fourth node N04B, and the second signaling is transmitted through an SRB1, the second signaling comprising ULInformationTransferMRDC, the ULInformationTransferMRDC comprising a RRCReconfigurationComplete message or a RRCConnectionReconfigurationComplete message, and the second signaling is transmitted by the fourth node N04B to the second node N02B.

In one embodiment, the dotted-line framed box F6.1B is optional.

In one embodiment, the dotted-line framed box F6.2B is optional.

In one embodiment, the dotted-line framed box F6.3B is optional.

In one embodiment, the dotted-line framed box F6.4B is optional.

In one embodiment, either of the dotted-line framed box F6.1B and the dotted-line framed box F6.2B exists.

In one embodiment, both of the dotted-line framed box F6.1B and the dotted-line framed box F6.2B exist.

In one embodiment, either of the dotted-line framed box F6.3B and the dotted-line framed box F6.4B exists.

In one embodiment, both of the dotted-line framed box F6.1B and the dotted-line framed box F6.3B exist.

In one embodiment, both of the dotted-line framed box F6.2B and the dotted-line framed box F6.4B exist.

Embodiment 7A

Figure 7A:
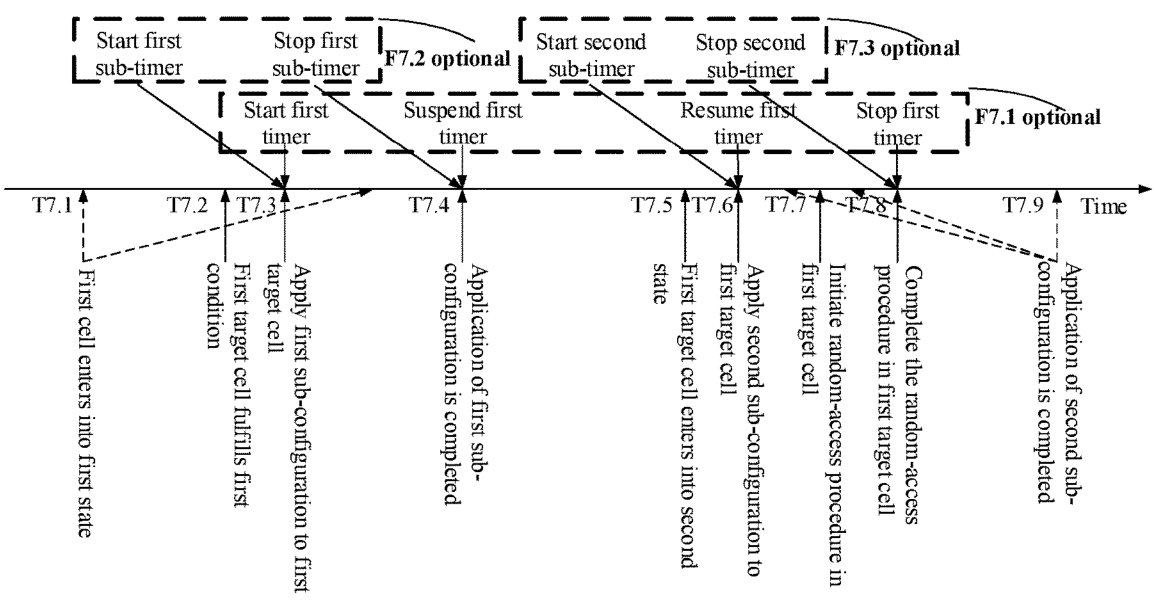
FIG. 7A illustrates a schematic diagram of running of a first timer according to one embodiment of the present disclosure.

Embodiment 7A illustrates a schematic diagram of running of a first timer according to one embodiment of the present disclosure, as shown in FIG. 7A. In FIG. 7A, the horizontal axis represents time. T7.1, T7.2, T7.3, T7.4, T7.5, T7.6, T7.7, T7.8 and T7.9 are 9 times; at the T7.1 or between the T7.3 and the T7.4, a first cell enters into a first state; at the T7.2, a first target cell fulfills a first condition; at the T7.3, a first sub-configuration is applied to a first target cell; at the T7.4, the application of the first sub-configuration is completed; at the T7.5, the first target cell enters into a second state; at the T7.6, a second sub-configuration is applied to the first target cell; at the T7.7, random-access procedure is initiated in the first target cell; at the T7.8, the random-access procedure is completed in the first target cell; between the T7.6 and the T7.7, or between the T7.7 and the T7.8, or at the T7.9, the application of the second sub-configuration is completed.

In Embodiment 7A, when the first cell is in the first state, as a response to a beginning of application of the first sub-configuration, a first timer is started; as a response to completing the application of the first sub-configuration, the first timer is suspended; upon a transition of the first target cell from the first state to the second state, the first timer is resumed.

In one embodiment, the 9 times in the present disclosure are in an ascending order chronologically.

In one embodiment, the 9 times in the present disclosure are not in an ascending order chronologically.

In one embodiment, two adjacent times among the 9 times in the present disclosure can be temporally equal.

In one embodiment, the time in the present disclosure includes a specific instance of time.

In one embodiment, the time in the present disclosure includes a time interval, which comprises multiple instances of time.

In one embodiment, the first node in the present disclosure receives a first signaling, the first signaling comprising an expiration value of a first timer; when the first cell is in a first state, as a response to the first condition being fulfilled, applies a first sub-configuration to the first target cell, and as a response to the beginning of application of the first sub-configuration, starts the first timer; as a response to completing the application of the first sub-configuration, suspends the first timer; upon a transition of the first target cell from the first state to the second state, applies a second sub-configuration to the first target cell, resumes the first timer, and transmits the first message on the first target cell; as a response to transmitting the first message, receives a second message.

In one subembodiment, the phrase of the first signaling comprising an expiration value of a first timer comprises that the expiration value of the first timer is configured through the first signaling.

In one subembodiment, the phrase of the first signaling comprising an expiration value of a first timer comprises that the expiration value of the first timer is a field in the first signaling.

In one subembodiment, the phrase of the first signaling comprising an expiration value of a first timer comprises that the first signaling indicates the expiration value of the first timer.

In one subembodiment, start the first timer at the T7.3, and suspend the first timer at the T7.4, resume the first timer at the T7.6 and stop the first timer at the T7.8.

In one subembodiment, the first timer comprises the T304.

In one subembodiment, the first timer comprises the T307.

In one subembodiment, as a response to reception of the second message, the first timer is stopped.

In one subembodiment, as a response to completing the random-access procedure in the first target cell, the first timer is stopped.

In one subsidiary embodiment of the above subembodiment, the phrase that as a response to completing the application of the first sub-configuration in the first target cell comprises: a success completion of the random access on the first target cell, the first target cell comprising a corresponding SpCell.

In one subsidiary embodiment of the above subembodiment, the phrase that as a response to completing the application of the first sub-configuration in the first target cell comprises: receiving the second message.

In one subsidiary embodiment of the above subembodiment, the phrase that as a response to completing the application of the first sub-configuration in the first target cell comprises: receiving the second message, and the second message carrying a C-RNTI.

In one subsidiary embodiment of the above subembodiment, the phrase that as a response to completing the application of the first sub-configuration in the first target cell comprises: receiving the second message, an RAR of the second message comprising a MAC subPDU which only comprises a RAPID.

In one subembodiment, as a response to beginning of application of the second sub-configuration, a first timer is resumed.

In one embodiment, the expiration value comprises a maximum running time of a given timer, the given timer comprising the first timer, or the first sub-timer or the second sub-timer.

In one embodiment, the expiration value comprises a maximum running time allowable for a given timer, the given timer comprising the first timer, or the first sub-timer or the second sub-timer.

In one embodiment, when the running time of a given timer reaches the expiration value, the given timer is deemed as expired, the given timer comprising the first timer, or the first sub-timer or the second sub-timer.

In one embodiment, the first node in the present disclosure receives a first signaling, the first signaling comprising an expiration value of a first sub-timer; when the first cell is in a first state, as a response to the first condition being fulfilled, applies a first sub-configuration to the first target cell, and as a response to the beginning of the application of the first sub-configuration, starts the first sub-timer; as a response to completing the application of the first sub-configuration, stops the first sub-timer.

In one subembodiment, the phrase of the first signaling comprising an expiration value of a first sub-timer comprises that the expiration value of the first sub-timer is configured through the first signaling.

In one subembodiment, the phrase of the first signaling comprising an expiration value of a first sub-timer comprises that the expiration value of the first sub-timer is a field in the first signaling.

In one subembodiment, the phrase of the first signaling comprising an expiration value of a first sub-timer comprises that the first signaling indicates the expiration value of the first sub-timer.

In one subembodiment, the first sub-timer is started at the T7.3, and the first sub-timer is stopped at the T7.4.

In one subembodiment, the expiration value of the first sub-timer is smaller than T304.

In one subembodiment, the expiration value of the first sub-timer is no smaller than T304.

In one subembodiment, the expiration value of the first sub-timer is smaller than T307.

In one subembodiment, the expiration value of the first sub-timer is no smaller than T307.

In one subembodiment, the first sub-timer comprises a timer Txyz.

In one subsidiary embodiment of the above subembodiment, the xyz comprises a positive integer.

In one subsidiary embodiment of the above subembodiment, the xyz comprises positive integers no less than 100 and no greater than 999.

In one embodiment, the first node in the present disclosure receives a first signaling, the first signaling comprising an expiration value of a second sub-timer; when the first target cell transits from the first state to the second state, applies a second sub-configuration to the first target cell, and starts the second sub-timer; transmits the first message on the first target cell; and as a response to transmitting the first message, receives a second message.

In one subembodiment, the phrase of the first signaling comprising an expiration value of a second sub-timer comprises that the expiration value of the second sub-timer is configured through the first signaling.

In one subembodiment, the phrase of the first signaling comprising an expiration value of a second sub-timer comprises that the expiration value of the second sub-timer is a field in the first signaling.

In one subembodiment, the phrase of the first signaling comprising an expiration value of a second sub-timer comprises that the first signaling indicates the expiration value of the second sub-timer.

In one subembodiment, the second sub-timer is started at the T7.6, and the second sub-timer is stopped at the T7.8.

In one subembodiment, as a response to the beginning of application of the second sub-configuration, the second sub-timer is started.

In one subembodiment, as a response to reception of the second message, the second sub-timer is stopped.

In one subembodiment, as a response to completing the random-access procedure in the first target cell, the second sub-timer is stopped.

In one subembodiment, the second sub-timer comprises Tabc.

In one subsidiary embodiment of the above subembodiment, the abc comprises a positive integer.

In one subsidiary embodiment of the above subembodiment, the abc comprises positive integers no less than 100 and no greater than 999.

In one embodiment, when the random-access procedure is completed in the first target cell, the first timer is stopped.

In one embodiment, when the random-access procedure is completed in the first target cell, the first timer is stopped.

In one embodiment, the dotted-line framed box F7.1 is optional.

In one embodiment, the dotted-line framed box F7.2 is optional.

In one embodiment, the dotted-line framed box F7.3 is optional.

In one embodiment, the dotted-line framed box F7.1 exists, while neither the dotted-line framed box F7.2 nor the dotted-line framed box F7.3 exists.

In one embodiment, the dotted-line framed box F7.1 and the dotted-line framed box F7.2 both exist, while the dotted-line framed box F7.3 does not exist.

In one embodiment, the dotted-line framed box F7.1 does not exist, while the dotted-line framed box F7.2 and the dotted-line framed box F7.3 both exist.

In one embodiment, neither the dotted-line framed box F7.1 nor the dotted-line framed box F7.2 exists, while the dotted-line framed box F7.3 exists.

In one embodiment, the first sub-timer and the second sub-timer are configured simultaneously.

In one embodiment, the first sub-timer and the second sub-timer are not configured simultaneously.

In one embodiment, the first sub-timer and the second sub-timer are not configured simultaneously as the first timer.

In one embodiment, the first sub-timer and the first timer are configured simultaneously.

In one subembodiment, when the first sub-timer is expired, the first timer is stopped.

In one subembodiment, stopping the first sub-timer does not affect time-counting of the first timer.

In one embodiment, the action of initiating a given timer means that the given timer starts time-counting from zero, the given timer comprising the first timer, or the first sub-timer or the second sub-timer.

In one embodiment, the action of suspending the first timer refers to a time duration during which the first timer is suspended.

In one embodiment, the action of suspending the first timer means that time counting by the first timer remains unchanged before the first timer is resumed or stopped.

In one embodiment, the action of resuming the first timer means that the first timer continues to count time from the end of suspension.

In one embodiment, the first timer can be resumed from suspension.

In one embodiment, stopping a given timer means that the given timer won't continue time counting, the given timer comprising the first timer, or the first sub-timer or the second sub-timer.

In one embodiment, when a given timer is expired, execute a first action, the given timer comprising the first timer, or the first sub-timer or the second sub-timer.

In one subembodiment, the first action comprises determining failure of the conditional reconfiguration.

In one subembodiment, the first action comprises determining occurrence of a Handover Failure (HOF).

In one subembodiment, the first action comprises initiating a RRC reestablishment.

In one subembodiment, the first action comprises initiating a procedure of SCG Failure Information.

In one subembodiment, the first action comprises initiating a Failure Information procedure provided with configuration of Dual Active Protocol Stack (DAPS) and no RLF occurring in the first cell.

In one subembodiment, the given timer being expired means that the running time of the given timer has reached the expiration value of the given timer.

In one embodiment, the meaning of the initiating includes starting.

In one embodiment, the meaning of the initiating includes beginning to execute.

In one embodiment, the meaning of the initiating includes initiate.

Embodiment 7B

Embodiment 7B illustrates a flowchart of a first cell in different states according to one embodiment of the present disclosure. It should be particularly noted that the sequence presented herein does not restrict orders of signal transmissions or implementations in the present disclosure.

In Embodiment 7B, the first node in the present disclosure receives a first signaling in step S701; determines in step S702 whether a first condition is fulfilled, when the first condition is fulfilled, enter into step S703, when the first condition is unfulfilled, go back to the step S702; in step S703, determines whether a first cell is in a second state, when the first cell is in the second state, enter into step S704(*a*), when the first cell is not in the second state, enter into step S704(*b*); when the first cell is in the second state, in step S704(*a*), as a response to the first condition being fulfilled, applies a first configuration to a first target cell and in step S705(*a*), as a response to completing application of the first configuration, transmits a second signaling, in step S706(*a*), the first target cell is in a second state, and in step S707(*a*), transmits a first message on the first target cell, and in step S708(*a*), as a response to transmission of the first message, receives a second message on the first target cell; in step S704(*b*), the first cell is in a first state; when the first cell is in a first state, determines in step S705(*b*) whether a second condition is fulfilled, when the second condition is fulfilled, enter into step S706(*b*), when the second condition is unfulfilled, enter into step S706(*c*); in step S706(*b*), as a response to fulfillment of both the first condition and the second condition, applies a first configuration to a first target cell; and in step S707(*b*), transmits a second signaling; in step S708(*b*), a first cell is in a first state, and in step S709(*b*), a first target cell transmits from a first state to a second state, as a response to the action of determining a transition of the first target cell from the first state to the second state, enter into step S707(*a*); and in step S706(*c*), does not apply the first configuration to the first target cell.

In Embodiment 7, the first signaling comprises a first configuration and a first condition for a first target cell; the first message is used to trigger the second message; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure; the second signaling is used to indicate the first target cell.

In one embodiment, the sequential orders of the step S702 and the step S705(*b*) are not limited by this Embodiment.

In one embodiment, the sequential orders of the steps S705(*a*) and S707(*a*) are not limited by this Embodiment.

Embodiment 8A

Embodiment 8A illustrates a schematic diagram of running of a first timer according to another embodiment of the present disclosure, as shown in FIG. 8A. In FIG. 8A, the horizontal axis represents time. T8.1, T8.2, T8.3, T8.4, T8.5, T8.6, T8.7, T8.8 and T8.9 are 9 times in chronologically ascending order; at the T8.1 or between the T8.3 and the T8.4, a first cell enters into a first state; at the T8.2, a first target cell fulfills a first condition; at the T8.3, a first sub-configuration is applied to a first target cell; at the T8.4, the application of the first sub-configuration is completed; at the T8.5, the first target cell enters into a second state; at the T8.6, a second sub-configuration is applied to the first target cell; at the T8.7, random-access procedure is initiated in the first target cell; at the T8.8, the random-access procedure is completed in the first target cell; between the T8.6 and the T8.7, or between the T8.7 and the T8.8, or at the T8.9, the application of the second sub-configuration is completed.

In Embodiment 8A, when the first target cell transits from the first state to the second state, start the first timer.

In one embodiment, the first node in the present disclosure receives a first signaling, the first signaling comprising an expiration value of a first timer; when the first cell is in a first state, as a response to the first condition being fulfilled, applies a first sub-configuration to the first target cell; upon a transition of the first target cell from the first state to the second state, applies a second sub-configuration to the first target cell and starts the first timer, transmits the first message on the first target cell, and, as a response to transmission of the first message, receives a second message.

In one subembodiment, start the second sub-timer at the T8.6, and stop the first timer at the T8.8.

In one subembodiment, as a response to the beginning of application of the second sub-configuration, the first timer is started.

In one subembodiment, as a response to reception of the second message, the first timer is stopped.

In one subembodiment, as a response to completing the random-access procedure in the first target cell, the first timer is stopped.

In one embodiment, if the first sub-configuration is not an empty set, the first configuration comprises the first sub-configuration and the second sub-configuration.

In one embodiment, if the first sub-configuration is not an empty set, when the first target cell is in the first state, the Condition Reconfiguration is performed as a response to the first condition being fulfilled.

In one embodiment, if the first sub-configuration is an empty set, the second sub-configuration comprises the first configuration.

In one embodiment, if the first sub-configuration is an empty set, the first configuration comprises the second sub-configuration.

In one embodiment, if the first sub-configuration is an empty set, when the first target cell is in the first state, the Condition Reconfiguration is not performed as a response to the first condition being fulfilled.

In one embodiment, the first timer is started after being delayed by a first time length, the first time length relating to the time during which the first target cell transits from the first state to the second state.

In one embodiment, the dotted-line framed box F8 is optional.

In one embodiment, the dotted-line framed box F8 exists.

In one embodiment, the dotted-line framed box F8 does not exist.

In one embodiment, if the first sub-configuration is not an empty set, the dotted-line framed box F8 exists.

In one embodiment, if the first sub-configuration is an empty set, the dotted-line framed box F8 does not exist.

Embodiment 8B

Embodiment 8B illustrates a schematic diagram of a first field in a second signaling being used to indicate whether a second condition is fulfilled according to one embodiment of the present disclosure, as shown in FIG. 8B.

In Embodiment 8B, the first signaling comprises a first field, the first field indicating that the first configuration being enabled is applied in the first state to determine that the second condition is fulfilled.

In one embodiment, the first signaling comprises a first field, the first field indicating that the first configuration set being enabled is applied in the first state to determine that the second condition is fulfilled.

In one embodiment, the phrase that the first signaling comprises a first field comprises that the first field is a field in the first signaling.

In one embodiment, the phrase that the first signaling comprises a first field comprises that the first field is an IE in the first signaling.

In one embodiment, the phrase that the first signaling comprises a first field comprises that the first signaling indicates the first field.

In one embodiment, the first field comprises a field in RRCReconfiguration or RRCConnectionReconfiguration.

In one embodiment, the first field comprises a field in ConditionalReconfiguration.

In one embodiment, the first field comprises a field in a condReconfigToAddModList or a condReconfigurationToAddModList.

In one embodiment, the first field is configured synchronously with the first configuration and the first condition.

In one embodiment, the first field is configured in a same IE as the first configuration and the first condition.

In one embodiment, the first field is not configured synchronously with the first configuration and the first condition.

In one embodiment, the first field is configured in a different IE from the first configuration and the first condition.

In one embodiment, the first field is effective for the first target cell.

In one embodiment, the first field is effective for the first target cell set.

In one embodiment, the first field is effective for the functionality of the Conditional Reconfiguration.

In one embodiment, the phrase of the first field indicating that the first configuration being enabled is applied in the first state comprises: there is an indication by the first field in the first signaling that the first configuration being enabled is applied in the first state.

In one embodiment, there isn't an indication by the first field in the first signaling that the first configuration not being enabled is applied in the first state.

In one embodiment, the phrase of the first field indicating that the first configuration being enabled is applied in the first state comprises: the first field in the first signaling being set to a true value indicates that the first configuration being enabled is applied in the first state.

In one subembodiment, the true value includes 1.

In one subembodiment, the true value includes true.

In one embodiment, the first field in the first signaling being set to a false value indicates that the first configuration not being enabled is applied in the first state.

In one subembodiment, the false value includes 0.

In one subembodiment, the false value includes false.

In one embodiment, the meaning of enabling comprises allowing.

In one embodiment, the meaning of enabling comprises enable.

In one embodiment, the meaning of enabling comprises effectuating.

In one embodiment, the phrase that the first field indicating that the first configuration being enabled is applied in the first state to determine that the second condition is fulfilled comprises: when the first field indicates that the first configuration being enabled is applied in the first state, the second condition is fulfilled.

In one embodiment, the phrase that the first field indicating that the first configuration being enabled is applied in the first state to determine that the second condition is fulfilled comprises: when the first field indicates that the first configuration not being enabled is applied in the first state, the second condition is unfulfilled.

In one embodiment, the phrase that the first configuration being enabled is applied in the first state comprises: allowing the application of the first configuration in the first state.

In one embodiment, the phrase that the first configuration being enabled is applied in the first state comprises: when the first cell is in the first state for the first node, the first cell is enabled to perform the Conditional Reconfiguration.

Embodiment 9A

Figure 9A:
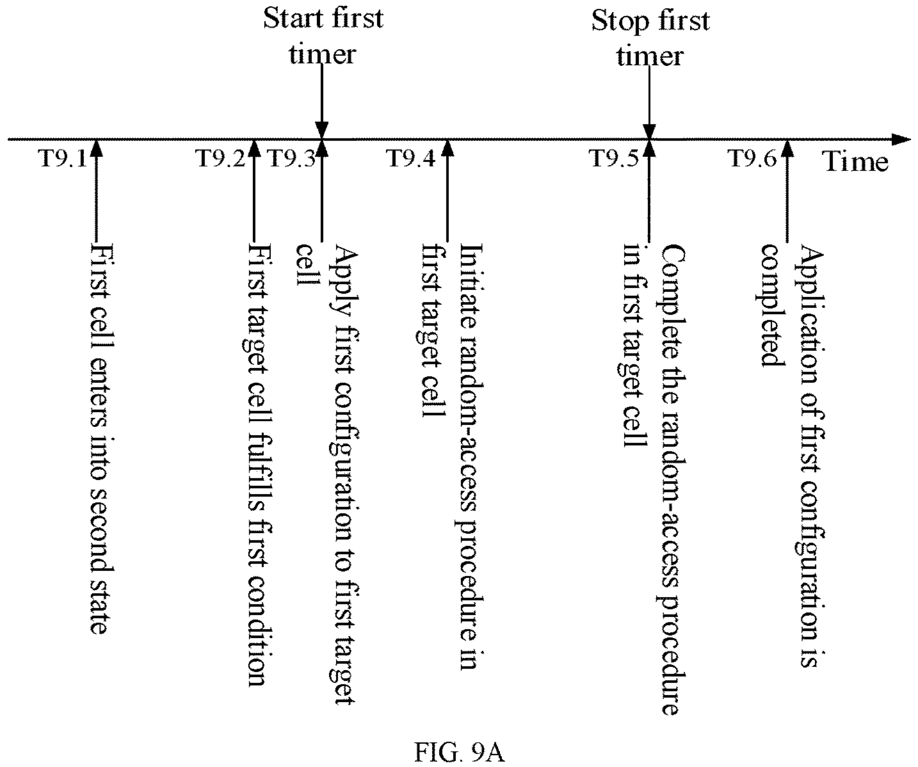
FIG. 9A illustrates a schematic diagram of running of a first timer according to another embodiment of the present disclosure.

Embodiment 9A illustrates a schematic diagram of running of a first timer according to another embodiment of the present disclosure, as shown in FIG. 9A. In FIG. 9A, the horizontal axis represents time. T9.1, T9.2, T9.3, T9.4, T9.5 and T9.6 are 6 times in a chronologically ascending order; at the T9.1, a first cell enters into a second state; at the T9.2, a first target cell fulfills a first condition; at the T9.3, a first configuration is applied to a first target cell; at the T9.4, a random-access procedure is initiated in the first target cell; at the T9.5, the random-access procedure in the first target cell is completed; at the T9.6, the application of the first configuration is completed.

In Embodiment 9A, the first node in the present disclosure receives a first signaling, the first signaling comprising an expiration value of a first timer; when the first cell is in the second state, as a response to the first condition being fulfilled, applies the first configuration to the first target cell and starts a first timer; when the first cell is in the second state, receives a second message on the first target cell, and as a response to reception of the second message, stops the first timer.

In one embodiment, the phrase of as a response to reception of the second message comprises when a random-access procedure is completed in the first target cell.

Embodiment 9B

Figure 9B:
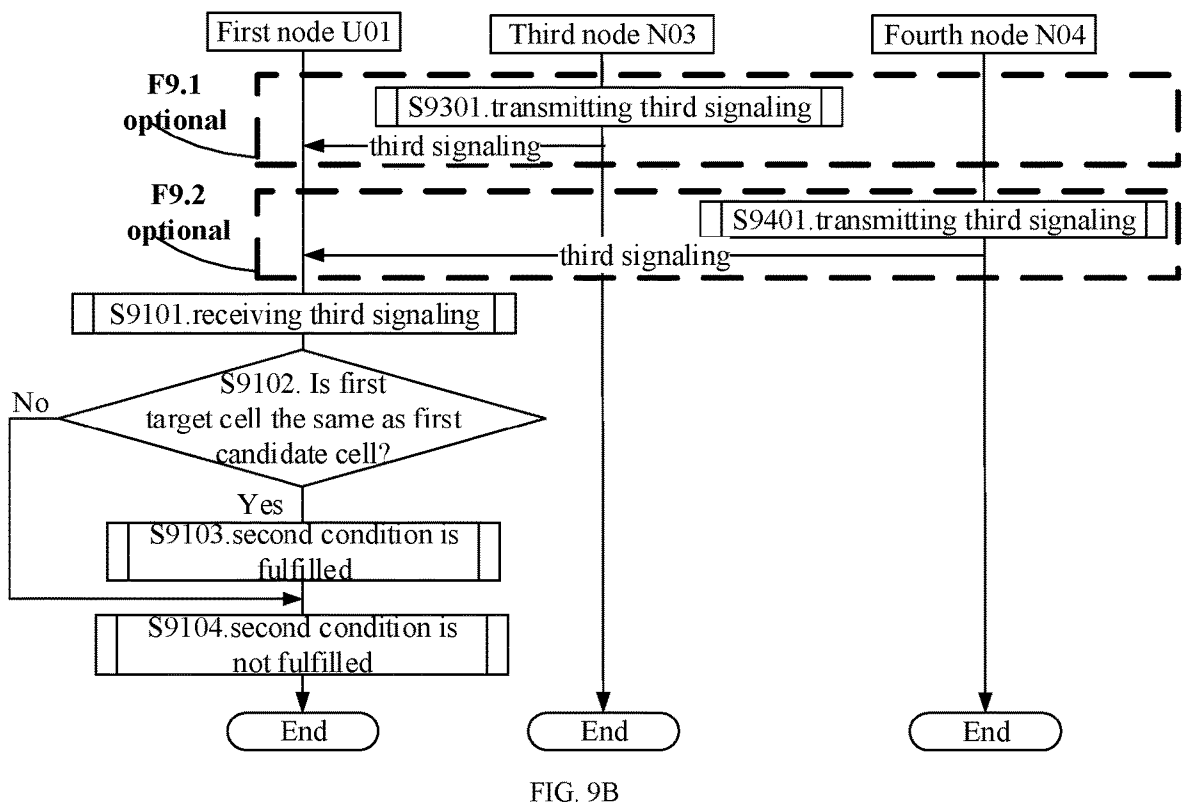
FIG. 9B illustrates a schematic diagram of a third signaling being used to determine whether a second condition is fulfilled according to one embodiment of the present disclosure.

Embodiment 9B illustrates a schematic diagram of a third signaling being used to determine whether a second condition is fulfilled according to one embodiment of the present disclosure, as shown in FIG. 9B.

A first node U01 receives a third signaling in step S9101; and determines whether a first target cell and a first candidate cell are the same in step S9102; in step S9103, when the first target cell and the first candidate cell are the same, determines that the second condition is fulfilled; in step S9104, when the first target cell and the first candidate cell are different, determines that the second condition is not fulfilled.

A third node N03 transmits the third signaling in step S9301.

A fourth node N04 transmits the third signaling in step S9401.

In Embodiment 9B, the third signaling indicates a first candidate cell, and the first target cell and the first candidate cell being the same is used to determine that the first configuration is enabled to be applied in the first state.

In one embodiment, the first target cell and the first candidate cell being different is used to determine that the first configuration is not enabled to be applied in the first state.

In one embodiment, the phrase that "when the first target cell is the same as the first candidate cell, the second condition is fulfilled" comprises that when the third signaling comprises the first target cell, the second condition is fulfilled.

In one embodiment, the phrase that "when the first target cell is different from the first candidate cell, the second condition is not fulfilled" comprises that when the third signaling does not comprise the first target cell, the second condition is not fulfilled.

In one embodiment, the third signaling is transmitted via an air interface.

In one embodiment, the third signaling is transmitted via a radio interface.

In one embodiment, the third signaling is transmitted via a higher-layer signaling.

In one embodiment, the third signaling comprises an upper-layer signaling.

In one embodiment, the third signaling comprises all or part of a higher-layer signaling.

In one embodiment, the third signaling comprises an RRC Message.

In one embodiment, the third signaling comprises all or part of IEs in an RRC message.

In one embodiment, the third signaling comprises all or part of fields of an IE in an RRC message.

In one embodiment, the third signaling comprises a DL signaling.

In one embodiment, a Radio Bearer bearing the third signaling comprises SRB1.

In one embodiment, a Radio Bearer bearing the third signaling comprises SRB3.

In one embodiment, a logical channel for the third signaling includes a DCCH.

In one embodiment, the third signaling is used for acknowledgement of the first signaling.

In one embodiment, the third signaling comprises a field or an IE in a RRCReconfiguration message or a RRCConnectionReconfiguration message.

In one embodiment, the third signaling and the downlink signaling in the present disclosure belong to a same RRC message.

In one embodiment, the third signaling and the downlink signaling in the present disclosure belong to different RRC messages.

In one embodiment, the third signaling is received when the first cell is in the second state.

In one embodiment, the third signaling is in effect for the first cell being in the second state, but has no effect for the first cell being in the first state.

In one embodiment, the third signaling indicates that a first candidate cell is used for indicating that the first candidate configuration being enabled is applied in the first state for the first candidate cell.

In one embodiment, the third signaling comprises a first candidate cell set, and the first candidate cell set comprises K2 first-type candidate cell(s), with the first candidate cell being one of the K2 first-type candidate cell(s), K2 being a positive integer.

In one subembodiment, the first target cell being the same as one of the K2 first-type candidate cell(s) is used to determine that the first configuration being enabled is applied in the first state.

In one subembodiment, the first target cell being the same as one of the K2 first-type candidate cell(s) is used to determine that the first configuration being enabled is applied in the first state.

In one embodiment, the first target cell and the first candidate cell are the same.

In one embodiment, the first target cell and the first candidate cell are different.

In one embodiment, the third signaling is the same as the first signaling.

In one embodiment, the third signaling is different from the first signaling.

In one embodiment, the third signaling and the first signaling belong to different fields or IEs in a same RRC message.

In one embodiment, the phrase that the third signaling indicates a first candidate cell comprises that the first candidate cell is a field in the third signaling.

In one embodiment, the phrase that the third signaling indicates a first candidate cell comprises that the third signaling comprising a Cell Identity (Cell ID) of the first candidate cell is used to determine that the third signaling indicates the first candidate cell.

In one subembodiment, the Cell ID comprises Cell Identity.

In one subembodiment, the Cell ID comprises Physical Cell Identity (PCI).

In one subembodiment, the Cell ID comprises CellIdentity.

In one subembodiment, the Cell ID comprises Cell Global Identifier (CGI).

In one subembodiment, the Cell ID comprises E-UTRAN Cell Global Identifier (ECGI).

In one embodiment, the phrase that the first target cell and the first candidate cell are the same comprises: a Cell ID of the first target cell is equal to that of the first candidate cell.

In one embodiment, the phrase that the first target cell and the first candidate cell are the same comprises: the first target cell and the first candidate cell indicate a same cell.

In one embodiment, the phrase that the first target cell and the first candidate cell are different comprises: a Cell ID of the first target cell is unequal to that of the first candidate cell.

In one embodiment, the phrase that the first target cell and the first candidate cell are different comprises: the first target cell and the first candidate cell indicate different cells.

In one embodiment, the dotted-line framed box F9.1 is optional.

In one embodiment, the dotted-line framed box F9.2 is optional.

In one embodiment, at least one of the dotted-line framed box F9.1 or the dotted-line framed box F9.2 exists.

Embodiment 10A

Figure 10A:
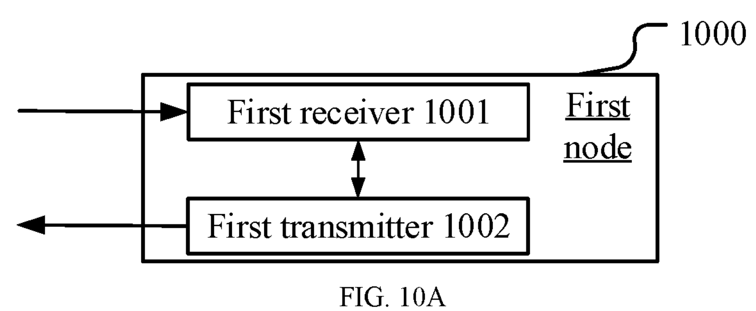
FIG. 10A illustrates a structure block diagram of a processing device in a first node according to one embodiment of the present disclosure.

Embodiment 10A illustrates a structure block diagram of a processing device in a first node according to one embodiment of the present disclosure; as shown in FIG. 10A. In FIG. 10A, a first node's processing device 1000 comprises a first receiver 1001 and a first transmitter 1002.

The first receiver 1001 receives a first signaling, the first signaling comprising a first configuration and a first condition for a first target cell, the first target cell being a cell other than a first cell and a second cell; determines through channel measurement that the first target cell fulfills the first condition; when the first cell is in a first state, as a response to the first condition being fulfilled, applies a first sub-configuration to the first target cell; when the first cell is in a second state, as a response to the first condition being fulfilled, applies the first configuration to the first target cell and starts a first timer.

The first transmitter 1002 transmits a second signaling; when the first cell is in the first state, as a response to the first condition being fulfilled, does not transmit a first message on the first target cell; when the first cell is in the second state, as a response to the first condition being fulfilled, transmits a first message on the first target cell.

The first receiver 1001 receives a second message on the first target cell when the first cell is in the second state, the first message being used to trigger the second message, and, as a response to reception of the second message, stops the first timer.

In Embodiment 10, the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, the first receiver 1001 applies a second sub-configuration to the first target cell upon a transition from the first state to the second state of the first target cell, the first configuration comprising the second sub-configuration.

In one embodiment, the first transmitter 1002 transmits the first message on the first target cell upon a transition from the first state to the second state of the first target cell; the first receiver 1001 receives a second message as a response to transmission of the first message; herein, application of the first sub-configuration does not comprise the random-access procedure, while application of the second sub-configuration comprises the random-access procedure.

In one embodiment, the first receiver 1001 starts a first timer as a response to the beginning of the application of the first sub-configuration when the first cell is in the first state; suspends the first timer as a response to completing the application of the first sub-configuration; and resumes the first timer as a response to the application of the second sub-configuration upon a transition from the first state to the second state of the first target cell.

In one embodiment, the first receiver 1001 starts the first timer when the first target cell transits from the first state to the second state.

In one embodiment, the first receiver 1001 receives a third signaling; herein, the third signaling is used to determine a transition of a given cell between the first state and the second state.

In one embodiment, the first signaling comprises an expiration value of the first timer.

In one embodiment, the first receiver 1001 comprises the antenna 452, the receiver 454, the multi-antenna receiving processor 458, the receiving processor 456, and the controller/processor 459, the memory 460 and the data source 467 in FIG. 4 of the present disclosure.

In one embodiment, the first receiver 1001 comprises the antenna 452, the receiver 454, the multi-antenna receiving processor 458, and the receiving processor 456 in FIG. 4 of the present disclosure.

In one embodiment, the first receiver 1001 comprises the antenna 452, the receiver 454 and the receiving processor 456 in FIG. 4 of the present disclosure.

In one embodiment, the first transmitter 1002 comprises the antenna 452, the transmitter 454, the multi-antenna transmitting processor 457, the transmitting processor 468, and the controller/processor 459, the memory 460 and the data source 467 in FIG. 4 of the present disclosure.

In one embodiment, the first transmitter 1002 comprises the antenna 452, the transmitter 454, the multi-antenna transmitting processor 457, and the transmitting processor 468 in FIG. 4 of the present disclosure.

In one embodiment, the first transmitter 1002 comprises the antenna 452, the transmitter 454 and the transmitting processor 468 in FIG. 4 of the present disclosure.

Embodiment 10B

Figure 10B:
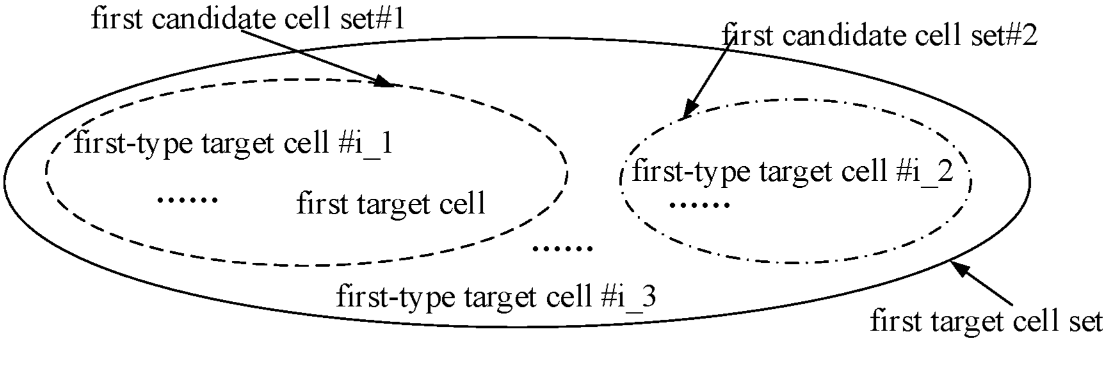
FIG. 10B illustrates a schematic diagram of a relationship between a first candidate cell set and a first target cell set according to one embodiment of the present disclosure.

Embodiment 10B illustrates a schematic diagram of a relationship between a first candidate cell set and a first target cell set according to one embodiment of the present disclosure, as shown in FIG. 10B. In FIG. 10B, the solid-line ellipse represents a first target cell set, the first-type target cell #i_1, the first-type target cell #i_2 and the first-type target cell #i_3 are respectively first-type target cells comprised by the first target cell set; the broken-line ellipse and the dash-dot ellipse respectively represent first candidate cell sets; a first candidate cell set #1 comprises the first-type target cell #i_1 and a first target cell, while a first candidate cell set #2 comprises the first-type target cell #i_2; the ellipsis indicates other first-type target cell(s).

In one embodiment, the third signaling indicates a first candidate cell set being used to indicate that K2 first-type candidate configurations respectively being enabled are applied in the first state for the K2 first-type candidate cells, and the K2 first-type candidate configurations are respectively associated with the K2 first-type candidate cells, the first candidate configuration being one of the K2 first-type candidate configurations, K2 being a positive integer.

In one embodiment, K2 is no greater than K1.

In one embodiment, K2 is equal to K1.

In one embodiment, K2 is less than K1.

In one embodiment, any of the K2 first-type candidate cells belongs to the K1 first-type target cells.

In one embodiment, a target cell of the K1 first-type target cells is the same as a candidate cell of the K2 first-type candidate cells.

In one embodiment, a target cell of the K1 first-type target cells is different from any candidate cell of the K2 first-type candidate cells.

In one embodiment, the K2 first-type candidate cells are a subset of the K1 first-type target cells.

In one embodiment, the K2 first-type candidate cells are the same as the K1 first-type target cells.

In one embodiment, for the first candidate cell set #1, the K2 first-type candidate cells comprise the first-type target cell #i_1 and the first target cell.

In one embodiment, for the first candidate cell set #2, the K2 first-type candidate cells comprise the first-type target cell #i_2.

In one embodiment, when the first candidate cell set comprises the first target cell, the second condition is fulfilled.

In one embodiment, when the first candidate cell set does not comprise the first target cell, the second condition is unfulfilled.

Embodiment 11A

Figure 11A:
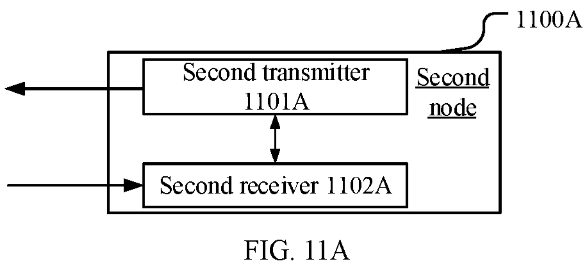
FIG. 11A illustrates a structure block diagram of a processing device in a second node according to one embodiment of the present disclosure.

Embodiment 11A illustrates a structure block diagram of a processing device in a second node according to one embodiment of the present disclosure; as shown in FIG. 11A. In FIG. 11A, a second node's processing device 1100A comprises a second transmitter 1101A and a second receiver 1102A.

The second receiver 1102A receives a second signaling; when a first cell is in a first state, does not receive a first message on a first target cell as a response to a first condition being fulfilled; when the first cell is in a second state, receives a first message on the first target cell as a response to the first condition being fulfilled.

The second transmitter 1101A transmits a second message on the first target cell when the first cell is in the second state, the first message being used to trigger the second message.

In Embodiment 11A, a first signaling comprises a first configuration and a first condition for the first target cell, the first target cell being a cell other than a first cell and a second cell; it is determined through channel measurement that the first target cell fulfills the first condition; when the first cell is in the first state, as a response to the first condition being fulfilled, the first sub-configuration is applied to the first target cell; when the first cell is in the second state, as a response to the first condition being fulfilled, the first configuration is applied to the first target cell and a first timer is started; as a response to reception of the second message, the first timer is stopped; the first signaling comprises an RRC reconfiguration message; the first configuration and the first condition are associated with the first target cell; the first configuration comprises the first sub-configuration; the second signaling is used to indicate the first target cell; the first message is used for a random-access procedure.

In one embodiment, a transmitter of the first signaling comprises a maintenance base station for the second cell.

In one embodiment, a transmitter of the first signaling comprises a maintenance base station for the first cell.

In one subembodiment, a maintenance base station for the first cell is the same as a maintenance base station for the first target cell.

In one subembodiment, a maintenance base station for the first cell is different from a maintenance base station for the first target cell.

In one embodiment, a receiver of the first signaling comprises a transmitter of the first message.

In one embodiment, a receiver of the first signaling comprises a UE.

In one embodiment, upon a transition from the first state to the second state of the first target cell, a second sub-configuration is applied to the first target cell, the first configuration comprising the second sub-configuration.

In one embodiment, the second receiver 1102A receives the first message on the first target cell upon a transition from the first state to the second state of the first target cell; the second transmitter 1101A transmits a second message as a response to reception of the first message; herein, application of the first sub-configuration does not comprise the random-access procedure, while application of the second sub-configuration comprises the random-access procedure.

In one embodiment, when the first cell is in the first state, as a response to a beginning of application of the first sub-configuration, a first timer is started; and as a response to completing the application of the first sub-configuration, the first timer is suspended; upon a transition from the first state to the second state of the first target cell, the first timer is resumed.

In one embodiment, upon a transition from the first state to the second state of the first target cell, the first timer is started.

In one embodiment, the third signaling is used to determine a transition of a given cell between the first state and the second state.

In one embodiment, a transmitter of the third signaling comprises a maintenance base station for the second cell.

In one embodiment, a transmitter of the third signaling comprises a maintenance base station for the first cell.

In one subembodiment, a maintenance base station for the first cell is the same as a maintenance base station for the first target cell.

In one subembodiment, a maintenance base station for the first cell is different from a maintenance base station for the first target cell.

In one embodiment, a receiver of the third signaling comprises a transmitter of the first message.

In one embodiment, a receiver of the third signaling comprises a UE.

In one embodiment, the first signaling comprises an expiration value of the first timer.

In one embodiment, the second transmitter 1101A comprises the antenna 420, the transmitter 418, the multi-antenna transmitting processor 471, and the transmitting processor 416, the controller/processor 475 and the memory 476 in FIG. 4 of the present disclosure.

In one embodiment, the second transmitter 1101A comprises the antenna 420, the transmitter 418, the multi-antenna transmitting processor 471, and the transmitting processor 416 in FIG. 4 of the present disclosure.

In one embodiment, the second transmitter 1101A comprises the antenna 420, the transmitter 418 and the transmitting processor 416 in FIG. 4 of the present disclosure.

In one embodiment, the second receiver 1102A comprises the antenna 420, the receiver 418, the multi-antenna receiving processor 472, and the receiving processor 470, the controller/processor 475, and the memory 476 in FIG. 4 of the present disclosure.

In one embodiment, the second receiver 1102A comprises the antenna 420, the receiver 418, the multi-antenna receiving processor 472, and the receiving processor 470 in FIG. 4 of the present disclosure.

In one embodiment, the second receiver 1102A comprises the antenna 420, the receiver 418 and the receiving processor 470 in FIG. 4 of the present disclosure.

Embodiment 11B

Figure 11B:
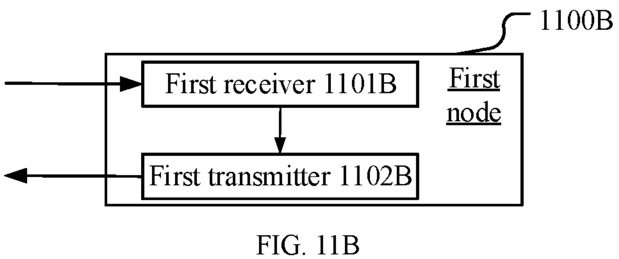
FIG. 11B illustrates a structure block diagram of a processing device in a first node according to one embodiment of the present disclosure.

Embodiment 11B illustrates a structure block diagram of a processing device in a first node according to one embodiment of the present disclosure; as shown in FIG. 11B. In FIG. 11B, a first node's processing device 1100B comprises a first receiver 1101B and a first transmitter 1102B.

The first receiver 1101B receives a first signaling, the first signaling comprising a first configuration and a first condition for a first target cell; when a first cell is in a first state, the first condition and a second condition both being fulfilled is used to determine an application of the first configuration to the first target cell; when the first cell is in a second state, the first condition being fulfilled is used to determine an application of the first configuration to the first target cell.

The first transmitter 1102B, when the first cell is in the first state, as a response to fulfillment of both the first condition and the second condition, drops transmitting a first message on the first target cell; when the first cell is in the second state, as a response to fulfillment of the first condition, transmits a first message on the first target cell.

The first receiver 1101B, when the first cell is in the second state, receives a second message on the first target cell, the first message being used to trigger the second message.

In Embodiment 11B, the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the first receiver 1101B determines a transition of the first target cell from the first state to the second state; the first transmitter 1102B, as a response, transmits the first message on the first target cell; and the first receiver 1101B receives a second message upon transmission of the first message.

In one embodiment, the first transmitter 1102B, as a response to completing the application of the first configuration, transmits a second signaling; herein, the second signaling is used to indicate the first target cell.

In one embodiment, the first signaling comprises a first field, the first field indicating that the first configuration being enabled is applied in the first state to determine that the second condition is fulfilled.

In one embodiment, the first receiver 1101B receives a third signaling; herein, the third signaling indicates a first candidate cell, the first target cell and the first candidate cell being the same is used to determine that the first configuration being enabled is applied in the first state; when the first target cell is the same as the first candidate cell, the second condition is fulfilled, when the first target cell is different from the first candidate cell, the second condition is not fulfilled.

In one embodiment, the first receiver 1101B, when the first cell is in the first state, at least one of the first condition or the second condition being unfulfilled is used to determine that the first configuration is not applied to the first target cell.

In one embodiment, the first receiver 1101B comprises the antenna 452, the receiver 454, the multi-antenna receiving processor 458, the receiving processor 456, and the controller/processor 459, the memory 460 and the data source 467 in FIG. 4 of the present disclosure.

In one embodiment, the first receiver 1101B comprises the antenna 452, the receiver 454, the multi-antenna receiving processor 458, and the receiving processor 456 in FIG. 4 of the present disclosure.

In one embodiment, the first receiver 1101B comprises the antenna 452, the receiver 454 and the receiving processor 456 in FIG. 4 of the present disclosure.

In one embodiment, the first transmitter 1102B comprises the antenna 452, the transmitter 454, the multi-antenna transmitting processor 457, the transmitting processor 468, and the controller/processor 459, the memory 460 and the data source 467 in FIG. 4 of the present disclosure.

In one embodiment, the first transmitter 1102B comprises the antenna 452, the transmitter 454, the multi-antenna transmitting processor 457, and the transmitting processor 468 in FIG. 4 of the present disclosure.

In one embodiment, the first transmitter 1102B comprises the antenna 452, the transmitter 454 and the transmitting processor 468 in FIG. 4 of the present disclosure.

Embodiment 12

Figure 12:
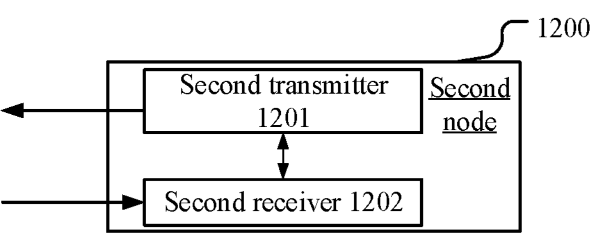
FIG. 12 illustrates a structure block diagram of a processing device in a second node according to one embodiment of the present disclosure.

Embodiment 12 illustrates a structure block diagram of a processing device in a second node according to one embodiment of the present disclosure; as shown in FIG. 12. In FIG. 12, a second node's processing device 1200 comprises a second transmitter 1201 and a second receiver 1202.

The second receiver 1202, when a first cell is in a first state, a first condition and a second condition both being fulfilled is used to determine an application of a first configuration to a first target cell, as a response to fulfillment of both the first condition and the second condition, a first message is not received on the first target cell; when the first cell is in a second state, the first condition being fulfilled is used to determine an application of the first configuration to the first target cell, as a response to fulfillment of the first condition, a first message is received on the first target cell.

The second transmitter 1201; when the first cell is in the second state, a second message is transmitted on the first target cell, the first message being used to trigger the second message.

In Embodiment 12, a first signaling comprises the first configuration and the first condition for the first target cell; the first signaling comprises an RRC reconfiguration message; the first configuration comprises RRC reconfiguration, and the first condition is related to channel measurement; the first target cell is a cell other than the first cell and the second cell, the second cell being in RRC_Connected state; the first state comprises a dormancy state, while the second state does not comprise the dormancy state; the first message is used for a random-access procedure.

In one embodiment, the first signaling is transmitted by a maintenance base station for the first cell or a maintenance base station for the second cell.

In one embodiment, the second receiver 1202 receives the first message on the first target cell as a response to a transition from the first state to the second state of the first target cell; the second transmitter 1201, as a response to reception of the first message, transmits a second message.

In one embodiment, the second receiver 1202, as a response to completing the application of the first configuration, receives a second signaling; herein, the second signaling is used to indicate the first target cell.

In one embodiment, the first signaling comprises a first field, the first field indicating that the first configuration being enabled is applied in the first state to determine that the second condition is fulfilled.

In one embodiment, a third signaling is used to indicate a first candidate cell, the first target cell and the first candidate cell being the same is used to determine that the first configuration being enabled is applied in the first state; when the first target cell is the same as the first candidate cell, the second condition is fulfilled, when the first target cell is different from the first candidate cell, the second condition is not fulfilled.

In one embodiment, a transmitter of the third signaling comprises the second node.

In one embodiment, a transmitter of the third signaling comprises a maintenance base station for the first cell or a maintenance base station for the second cell.

In one embodiment, a receiver of the third signaling comprises the first node in the present disclosure.

In one embodiment, when the first cell is in the first state, at least one of the first condition or the second condition being unfulfilled is used to determine that the first configuration is not applied to the first target cell.

In one embodiment, the second transmitter 1201 comprises the antenna 420, the transmitter 418, the multi-antenna transmitting processor 471, and the transmitting processor 416, the controller/processor 475 and the memory 476 in FIG. 4 of the present disclosure.

In one embodiment, the second transmitter 1201 comprises the antenna 420, the transmitter 418, the multi-antenna transmitting processor 471, and the transmitting processor 416 in FIG. 4 of the present disclosure.

In one embodiment, the second transmitter 1201 comprises the antenna 420, the transmitter 418 and the transmitting processor 416 in FIG. 4 of the present disclosure.

In one embodiment, the second receiver 1202 comprises the antenna 420, the receiver 418, the multi-antenna receiving processor 472, and the receiving processor 470, the controller/processor 475, and the memory 476 in FIG. 4 of the present disclosure.

In one embodiment, the second receiver 1202 comprises the antenna 420, the receiver 418, the multi-antenna receiving processor 472, and the receiving processor 470 in FIG. 4 of the present disclosure.

In one embodiment, the second receiver 1202 comprises the antenna 420, the receiver 418 and the receiving processor 470 in FIG. 4 of the present disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE), comprising:

a receiver configured to receive one or more a-radio resource control (RRC) reconfiguration messages including a first configuration and a first condition for a first target cell, the first target cell being a cell other than a first cell and a second cell, wherein:

the UE is configured to, on a condition that the first condition is met and the first cell is in a first state, apply a first sub-configuration for the first target cell, and the UE is configured to, on a condition that the first condition is met and the first cell is in a second state, apply the first configuration for the first target cell and start a first timer; and a transmitter configured to:

transmit an RRC reconfiguration complete message, on a condition that the first condition is met and the first cell is in the first state, refrain from transmitting a first random access procedure message on the first target cell, and on a condition that the first condition is met and the first cell is in the second state, transmit the first random access procedure message on the first target cell, wherein the receiver is configured to receive a second random access procedure message on the first target cell on a condition that the first cell is in the second state, and wherein the UE is configured to stop the first timer.

2. The UE according to claim 1, wherein:

the UE is configured to apply a second sub-configuration for the first target cell on a condition that the first target cell transitions from the first state to the second state, wherein the first configuration includes the second sub-configuration.

3. The UE according to claim 2, wherein:

the transmitter is configured to transmit the first random access procedure message on the first target cell on a condition that the first target cell transitions from the first state to the second state, the receiver is configured to receive the second random access procedure message on a condition that the first random access procedure message is transmitted, and the first sub-configuration does not include performing a random-access procedure, the second sub-configuration includes performing the random-access procedure.

4. The UE according to claim 1, wherein:

the UE is configured to start the first timer in response to a beginning of an application of the first sub-configuration when the first cell is in the first state, suspend the first timer in response to completing the application of the first sub-configuration and resume the first timer upon a transition from the first state to the second state of the first target cell.

5. The UE according to claim 1, wherein:

the UE is configured to start the first timer on a condition that the first target cell transitions from the first state to the second state.

6. The UE according to claim 1, wherein:

the receiver is configured to receive a message that indicates a transition of a cell between the first state and the second state.

7. The UE according to claim 6, wherein the message includes a first indication that is used to determine that the first cell is in the first state.

8. The UE according to claim 6, wherein the UE is configured to determine that the first condition is met based on channel measurement.

9. The UE according to claim 1, wherein the one or more RRC reconfiguration messages include an expiration value of the first timer.

10. The UE according to claim 1, wherein the first configuration includes a T304 field and a rach-ConfigDedicated field.

11. The UE according to claim 1, wherein the first cell is a primary secondary cell group (SCG) cell (PSCell), the second cell is a primary cell (PCell), and the first cell is in the first state when an SCG including the PSCell is in the first state.

12. The UE according to claim 1, wherein the first target cell is indicated by the one or more RRC reconfiguration messages or the first target cell is determined according to a measurement report.

13. The UE according to claim 1, wherein on a condition that the first cell is in the first state, the UE does not listen over a physical downlink control channel (PDCCH) for a cell, does not report channel state information (CSI) of the cell, does not perform random access in the cell, does not transmit an uplink shared channel (UL-SCH) in the cell, and does not transmit a physical uplink control channel (PUCCH) in the cell.

14. The UE according to claim 1, wherein applying the first sub-configuration includes performing DL synchronizing.

15. A base station, comprising:

a transmitter configured to transmit one or more a-radio resource control (RRC) reconfiguration messages including a first configuration and a first condition for a first target cell, the first target cell being a cell other than a first cell and a second cell, wherein:

on a condition that the first condition is met and the first cell is in a first state, a first sub-configuration is applied for the first target cell, and on a condition that the first condition is met and the first cell is in a second state, the first configuration is applied for the first target cell and a first timer is started; and a receiver configured to:

receive an RRC reconfiguration complete message, on a condition that the first condition is met and the first cell is in the first state, not receive a first random access procedure message on the first target cell, and on a condition that the first condition is met and the first cell is in the second state, receive the first random access procedure message on the first target cell, wherein the transmitter is configured to transmit a second random access procedure message on the first target cell on a condition that the first cell is in the second state, wherein the first timer is stopped.

16. The base station according to claim 15, wherein on a condition that the first target cell transitions from the first state to the second state, a second sub-configuration is applied to the first target cell, wherein the first configuration comprises the second sub-configuration.

17. The base station according to claim 16, wherein:

the receiver is configured to receive the first random access procedure message on the first target cell on a condition that the first target cell transitions from the first state to the second state, the transmitter is configured to transmit the second random access procedure message in response to reception of the first random access procedure message, and application of the first sub-configuration does not comprise a random-access procedure, and application of the second sub-configuration comprises the random-access procedure.

18. The base station according to claim 15, wherein when the first cell is in the first state, as a response to a beginning application of the first sub-configuration, the first timer is started, as a response to completing the application of the first sub-configuration, the first timer is suspended, and upon a transition from the first state to the second state of the first target cell, the first timer is resumed.

19. The base station according to claim 15, wherein a third message is used to determine a transition of a cell between the first state and the second state.

20. A method, comprising:

receiving one or more radio resource control (RRC) reconfiguration messages including a first configuration and a first condition for a first target cell, the first target cell being a cell other than a first cell and a second cell;

in response to the first condition being met and the first cell is being in a first state, applying a first sub-configuration for the first target cell;

in response to the first condition being met and the first cell is being in a second state, applying the first configuration for the first target cell and starting a first timer;

transmitting an RRC reconfiguration complete message;

in response to the first condition being met and the first cell being in the first state, refraining from transmitting a first random access procedure message on the first target cell; and in response to the first condition being met and the first cell being in the second state, transmitting the first random access procedure message on the first target cell; and receiving a second random access procedure message on the first target cell in response to the first cell being in the second state, and stopping the first timer.

* * * * *